(12) United States Patent
Su et al.

(10) Patent No.: US 8,676,891 B2
(45) Date of Patent: *Mar. 18, 2014

(54) VISIBILITY INSPECTOR IN SOCIAL NETWORKS

(75) Inventors: Ray Jiunn-An Su, Sunnyvale, CA (US); Jonathan Terleski, Mountain View, CA (US); Joseph Smarr, Half Moon Bay, CA (US); Shimrit Ben-Yair, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/164,507

(22) Filed: Jun. 20, 2011

(65) Prior Publication Data

US 2012/0110076 A1    May 3, 2012

Related U.S. Application Data

(60) Provisional application No. 61/408,732, filed on Nov. 1, 2010, provisional application No. 61/408,811, filed on Nov. 1, 2010.

(51) Int. Cl.
*G06F 15/16*    (2006.01)

(52) U.S. Cl.
USPC .......................................... 709/204; 705/319

(58) Field of Classification Search
None
See application file for complete search history.

(56) References Cited

U.S. PATENT DOCUMENTS

| | | | |
|---|---|---|---|
| 7,117,254 B2 * | 10/2006 | Lunt et al. ..................... | 709/218 |
| 7,167,910 B2 * | 1/2007 | Farnham et al. .............. | 709/223 |
| 7,467,212 B2 | 12/2008 | Adams et al. | |
| 7,478,078 B2 * | 1/2009 | Lunt et al. .............................. | 1/1 |
| 7,594,258 B2 * | 9/2009 | Mao et al. .......................... | 726/9 |
| 7,680,882 B2 | 3/2010 | Tiu et al. | |
| 7,818,394 B1 | 10/2010 | Lawler et al. | |
| 7,832,003 B2 * | 11/2010 | Kelly et al. ..................... | 726/18 |
| 7,886,024 B2 | 2/2011 | Kelly et al. | |
| 7,941,329 B2 | 5/2011 | Kenedy et al. | |
| 7,945,653 B2 * | 5/2011 | Zuckerberg et al. .......... | 709/223 |
| 7,966,194 B2 * | 6/2011 | Iyer .................................. | 705/1.1 |
| 7,970,657 B2 | 6/2011 | Morgenstern | |

(Continued)

FOREIGN PATENT DOCUMENTS

| | | |
|---|---|---|
| WO | WO2012061318 A1 | 5/2012 |
| WO | WO2012061327 A3 | 8/2012 |

OTHER PUBLICATIONS

Authorized Officer Lee W. Young, International Search Report and Written Opinion for Application No. PCT/US11/58650, mailed Mar. 16, 2012 (14 pages).

(Continued)

*Primary Examiner* — Ninos Donabed
(74) *Attorney, Agent, or Firm* — Fish & Richardson P.C.

(57) ABSTRACT

Methods, systems, and apparatus, including computer programs encoded on a computer storage medium, for transmitting a content data set to a computing device for displaying digital content to an author user, the author user having authored the digital content, receiving user input from the author user, the user input corresponding to the digital content, and, in response to receiving the user input, transmitting first data and second data to the computing device for display to the author user, the first data comprising a number of contacts that are able to access the digital content and the second data indicating one or more relationships between the author user and the contacts.

13 Claims, 34 Drawing Sheets

(56) References Cited

U.S. PATENT DOCUMENTS

| | | | |
|---|---|---|---|
| 8,000,726 B2 | 8/2011 | Altman et al. | |
| 8,010,458 B2* | 8/2011 | Galbreath et al. | 705/319 |
| 8,010,622 B2* | 8/2011 | Dolan | 709/217 |
| 8,028,905 B2* | 10/2011 | Holberg | 235/383 |
| 8,031,170 B2 | 10/2011 | Brown et al. | |
| 8,050,690 B2* | 11/2011 | Neeraj | 455/456.1 |
| 8,065,173 B2* | 11/2011 | Abu-Hakima et al. | 705/7.11 |
| 8,099,424 B2* | 1/2012 | Kenedy et al. | 707/759 |
| 8,108,377 B2* | 1/2012 | Jiang et al. | 707/705 |
| 8,150,844 B2* | 4/2012 | Redstone et al. | 707/724 |
| 8,166,120 B2* | 4/2012 | Kunz et al. | 709/206 |
| 8,230,046 B2* | 7/2012 | Jiang | 709/219 |
| 8,244,848 B1 | 8/2012 | Narayanan et al. | |
| 8,352,859 B2* | 1/2013 | Zuckerberg et al. | 715/273 |
| 8,423,392 B2* | 4/2013 | Moxley et al. | 705/7.14 |
| 2003/0217056 A1* | 11/2003 | Allen et al. | 707/7 |
| 2005/0198131 A1 | 9/2005 | Appelman et al. | |
| 2006/0004601 A1* | 1/2006 | Marks | 705/1 |
| 2006/0021009 A1* | 1/2006 | Lunt | 726/4 |
| 2006/0173963 A1 | 8/2006 | Roseway et al. | |
| 2006/0174340 A1* | 8/2006 | Santos et al. | 726/21 |
| 2006/0252547 A1* | 11/2006 | Mizrahi et al. | 463/42 |
| 2006/0294192 A1* | 12/2006 | Mao et al. | 709/213 |
| 2007/0200713 A1 | 8/2007 | Weber et al. | |
| 2007/0201086 A1 | 8/2007 | Kim et al. | |
| 2007/0219794 A1* | 9/2007 | Park et al. | 704/246 |
| 2007/0233736 A1* | 10/2007 | Xiong et al. | 707/104.1 |
| 2007/0260587 A1* | 11/2007 | Mohan | 707/3 |
| 2007/0288563 A1* | 12/2007 | Karkanias | 709/204 |
| 2008/0066080 A1 | 3/2008 | Campbell | |
| 2008/0132252 A1* | 6/2008 | Altman et al. | 455/457 |
| 2008/0160490 A1* | 7/2008 | Gomes et al. | 434/350 |
| 2008/0227063 A1 | 9/2008 | Kenedy et al. | |
| 2008/0228043 A1 | 9/2008 | Kenedy et al. | |
| 2008/0228531 A1* | 9/2008 | Kenedy et al. | 705/4 |
| 2008/0228735 A1* | 9/2008 | Kenedy et al. | 707/3 |
| 2008/0235242 A1 | 9/2008 | Swanburg et al. | |
| 2008/0235592 A1 | 9/2008 | Trauth | |
| 2008/0263053 A1* | 10/2008 | Hull | 707/10 |
| 2008/0302867 A1* | 12/2008 | Holberg | 235/375 |
| 2008/0307511 A1 | 12/2008 | Ahtisaari | |
| 2009/0018903 A1* | 1/2009 | Iyer | 705/14 |
| 2009/0019374 A1 | 1/2009 | Logan et al. | |
| 2009/0024615 A1* | 1/2009 | Pedro et al. | 707/5 |
| 2009/0024910 A1* | 1/2009 | Kamat et al. | 715/204 |
| 2009/0119173 A1 | 5/2009 | Parsons et al. | |
| 2009/0125521 A1 | 5/2009 | Petty | |
| 2009/0144392 A1 | 6/2009 | Wang et al. | |
| 2009/0177385 A1 | 7/2009 | Matas et al. | |
| 2009/0209286 A1* | 8/2009 | Bentley et al. | 455/556.1 |
| 2009/0248516 A1* | 10/2009 | Gross | 705/14 |
| 2009/0248635 A1* | 10/2009 | Gross | 707/3 |
| 2009/0271409 A1* | 10/2009 | Ghosh | 707/9 |
| 2009/0323555 A1 | 12/2009 | Lancaster et al. | |
| 2009/0327885 A1 | 12/2009 | Aoki et al. | |
| 2010/0014649 A1* | 1/2010 | Codignotto | 379/93.24 |
| 2010/0049852 A1 | 2/2010 | Whitnah et al. | |
| 2010/0057754 A1 | 3/2010 | Moudy et al. | |
| 2010/0077484 A1 | 3/2010 | Paretti et al. | |
| 2010/0145742 A1 | 6/2010 | Carey et al. | |
| 2010/0146054 A1 | 6/2010 | Armstrong et al. | |
| 2010/0151842 A1 | 6/2010 | De | |
| 2010/0180211 A1 | 7/2010 | Boyd | |
| 2010/0198648 A1* | 8/2010 | Bank et al. | 705/9 |
| 2010/0203909 A1* | 8/2010 | Oldach | 455/466 |
| 2010/0223250 A1* | 9/2010 | Guha | 707/706 |
| 2010/0227594 A1 | 9/2010 | De | |
| 2010/0241962 A1 | 9/2010 | Peterson et al. | |
| 2010/0250685 A1* | 9/2010 | Kunz et al. | 709/206 |
| 2010/0251177 A1 | 9/2010 | Geppert et al. | |
| 2010/0287281 A1* | 11/2010 | Tirpak | 709/226 |
| 2010/0306773 A1 | 12/2010 | Lee et al. | |
| 2010/0318571 A1* | 12/2010 | Pearlman et al. | 707/784 |
| 2011/0004922 A1* | 1/2011 | Bono et al. | 726/4 |
| 2011/0035264 A1 | 2/2011 | Zaloom | |
| 2011/0046980 A1* | 2/2011 | Metzler et al. | 705/3 |
| 2011/0047169 A1* | 2/2011 | Leighton et al. | 707/756 |
| 2011/0083101 A1 | 4/2011 | Sharon et al. | |
| 2011/0154223 A1* | 6/2011 | Whitnah et al. | 715/753 |
| 2011/0184780 A1 | 7/2011 | Alderson et al. | |
| 2011/0191246 A1 | 8/2011 | Brandstetter et al. | |
| 2011/0202864 A1 | 8/2011 | Hirsch et al. | |
| 2011/0202968 A1* | 8/2011 | Nurmi | 726/1 |
| 2011/0258192 A1* | 10/2011 | Yao et al. | 707/737 |
| 2011/0270709 A1 | 11/2011 | Lewis et al. | |
| 2011/0275047 A1* | 11/2011 | Gomes et al. | 434/350 |
| 2012/0036216 A1* | 2/2012 | Aaltonen et al. | 709/217 |
| 2012/0060106 A1* | 3/2012 | Moxley et al. | 715/758 |
| 2012/0096352 A1* | 4/2012 | Maor et al. | 715/706 |
| 2012/0109836 A1 | 5/2012 | Chen et al. | |
| 2012/0110064 A1 | 5/2012 | Chen et al. | |
| 2012/0110464 A1 | 5/2012 | Chen et al. | |
| 2012/0110474 A1 | 5/2012 | Chen et al. | |
| 2012/0150901 A1 | 6/2012 | Johnson et al. | |

OTHER PUBLICATIONS

Authorized Officer Lee. W. Young, International Search Report and Written Opinion for Application No. PCT/US2011/058668, mailed May 18, 2012 (15 pages).

International Preliminary Report on Patentability in International Application No. PCT/US2011/058650, mailed May 16, 2013, 9 pages.

Authorized Officer Simin Baharlou, International Preliminary Report on Patentability for Application No. PCT/US2011/058668, mailed May 16, 2013, 11 pages.

Danah M. Boyd et al., "Social Network Sites: Definition, History and Scholarship," Journal of Computer-Mediated Communication, vol. 13, Issue 1, Oct. 2007, pp. 210-230.

Nathan Eagle et al., "Social Serendipity: Proximity Sensing and Cueing," MIT Media Laboratory Technical Note 580, May 2004, 18 pages.

Ralph Gross et al., "Information Revelation and Privacy in Online Social Networks," Proceeding of the 2005 ACM Workshop on Privacy in the Electronic Society (WPES'05), Nov. 7, 2005, pp. 71-80.

Junichiro Mori et al., "Real-world Oriented Information Sharing Using Social Networks," Proceedings of the 2005 International ACM SIGGROUP Conference on Supporting Group Work (GROUP 05), Nov. 6-9, 2005, pp. 81-84.

Andrew Leonard, "You are who you know," Salon Media Group, Inc., Jun. 15, 2004, 15 pages.

Jeffrey Heer et al., "Vizster: Visualizing Online Social Networks," IEEE Symposium on Information Visualization (INFOVIS 2005), Oct. 23-25, 2005, pp. 32-39.

Thomas Erickson et al., "Social Translucence: Using Minimalist Visualizations of Social Activity to Support Collective Interaction," Designing Information Spaces: The Social Navigation Approach (eds. K. Höök, D. Benyon, A Munroe), Springer-Verlag: London, 2003, pp. 17-41.

Ronald van Eijk et al., "We-centric, context-aware, adaptive mobile service bundles," Telematica Instituut, Freeband Frux D1.1, Nov. 30, 2004, 48 pages.

Marc Steen et al., "Development of we-centric, context-aware, adaptive mobile services requires empathy and dialogue," Freeband Frux, 2005, 4 pages.

Alice Emily Marwick, "Selling Your Self: Online Identity in the Age of a Commodified Internet," Thesis for degree of Master of Arts, University of Washington, 2005, 192 pages.

Tony Hammond et al., "Social Bookmarking Tools (I)," D-Lib Magazine, vol. 11, No. 4, Apr. 2005, 23 pages.

Stefan Decker et al., "The Social Semantic Desktop," DERI Technical Report May 2, 2004, DERI—Digital Enterprise Research Institute, May 2004, 7 pages.

* cited by examiner

FIG. 11C

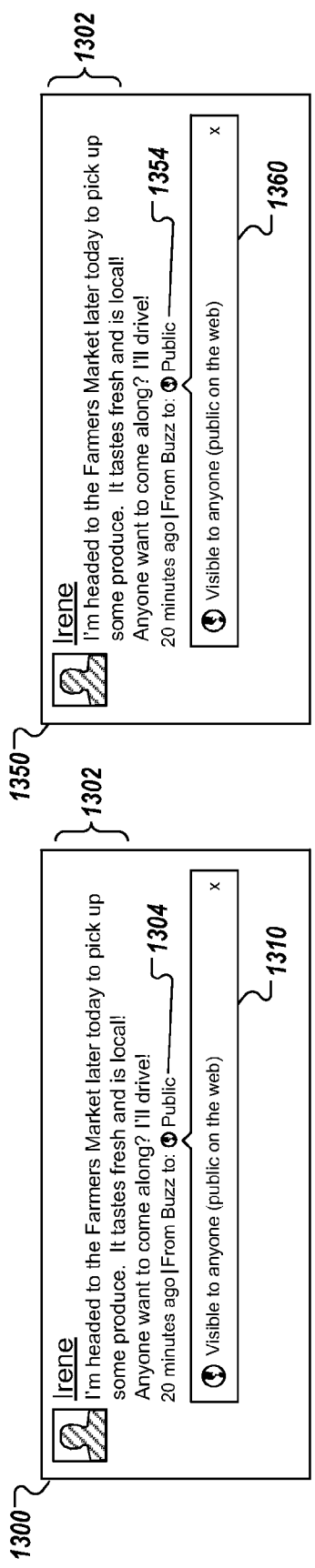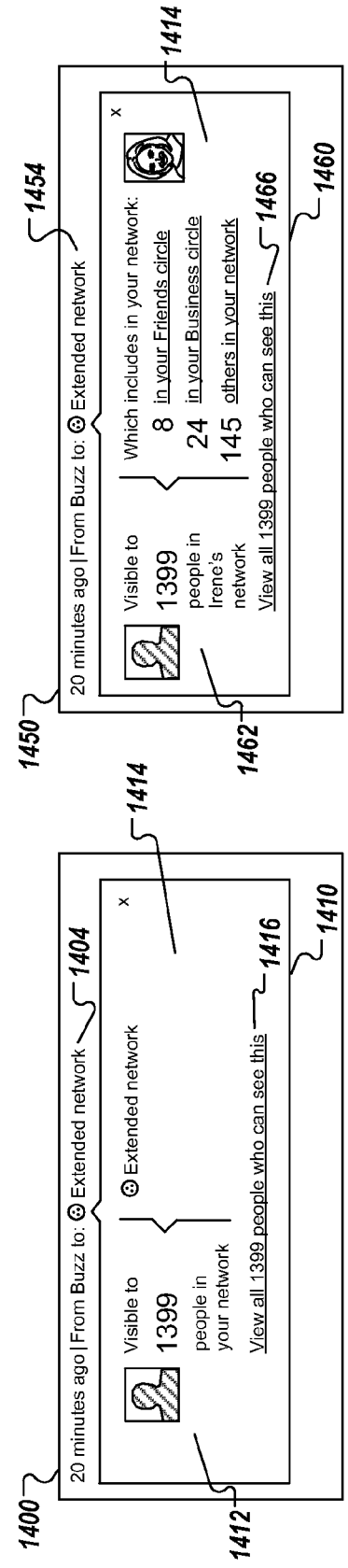
FIG. 13A
FIG. 13B
FIG. 14A
FIG. 14B

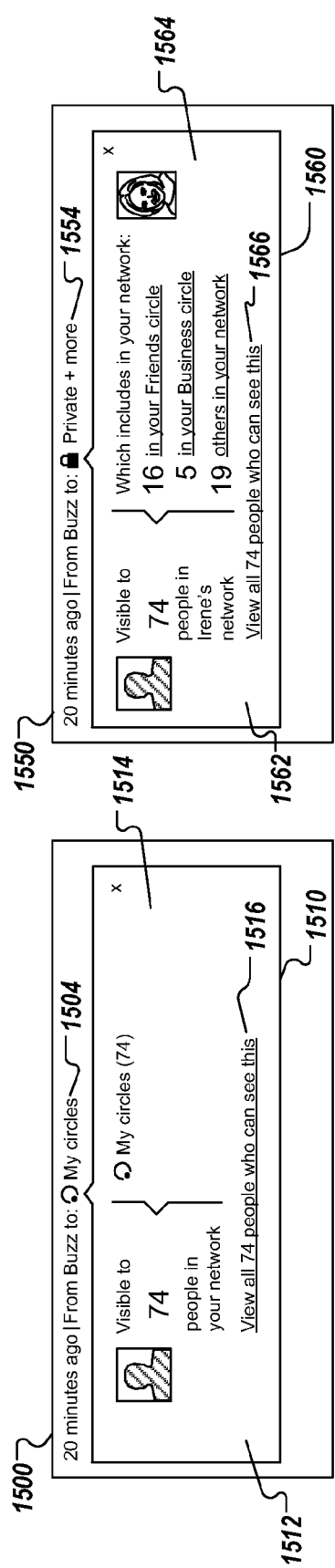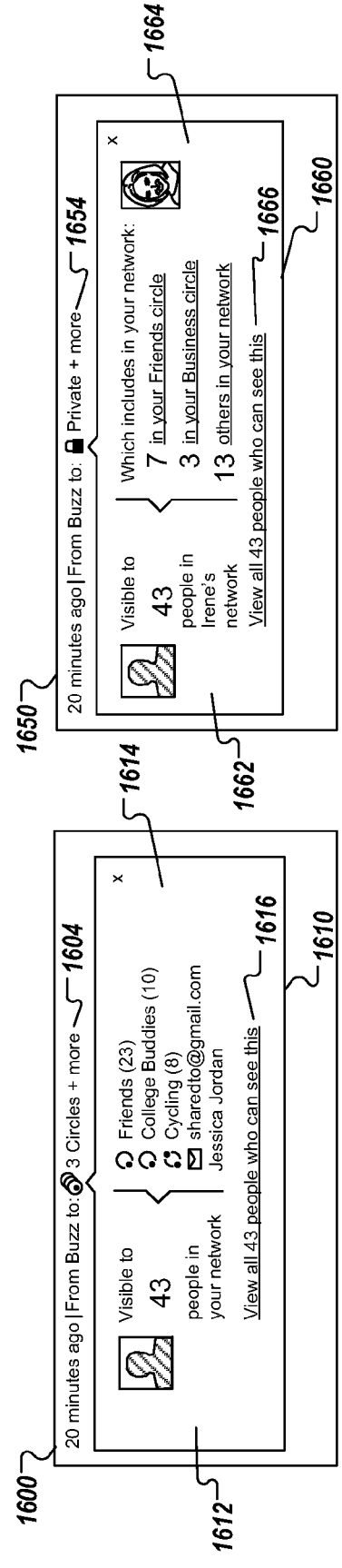

VISIBILITY INSPECTOR IN SOCIAL NETWORKS

CROSS-REFERENCE TO RELATED APPLICATIONS

This application claims the benefit of U.S. Prov. Pat. App. No. 61/408,732, filed Nov. 1, 2010, and U.S. Prov. Pat. App. No. 61/408,811, filed Nov. 1, 2010, the disclosures of which are expressly incorporated herein by reference in their entireties.

TECHNICAL FIELD

This specification generally relates to computer software systems and methods, in particular, systems and methods for the creation and maintenance of social networks in social networking applications.

BACKGROUND

Computers and mobile devices, such as cellular phones and personal digital assistants, have become increasingly interconnected due to the widespread availability of wired and wireless connections to communications networks such as the Internet. Even in the earliest days of the ARPANET, users took advantage of such interconnectivity to communicate with one another through early forms of email. As email grew in availability and popularity, email "lists" became a popular tool for broadcasting messages to predefined groups of recipients.

In the 1980's, Internet based "newsgroups" emerged in which users could read and respond to discussion threads revolving around a wide variety of predefined categories. Newsgroups are generally readable and updatable by anyone with the equipment to access them, since access to newsgroups is generally not restricted on a per-newsgroup or per-user basis. World wide web based discussion groups (i.e., also known as clubs) have also provided a way for groups of people to associate around a topic. Through the use of web server programming, the idea of discussion groups and discussion threads has been extended to provide users with the ability to subscribe to secured discussion forums that are, in some cases, moderated by other users.

Another variant of Internet based communication forums are the web-based "social network" applications, in which a number of users are able to find each others' accounts and voluntarily become "friends" or "followers" of each other's posted messages. Users generally post brief messages about their status, mood, activities, and such, and their friends and followers can read and optionally reply to those messages. As such, friends may stay abreast of each other's' activities as a tool for maintaining their social bonds.

SUMMARY

In general, innovative aspects of the subject matter described in this disclosure may be embodied in methods that include the actions of transmitting a content data set to a computing device for displaying digital content to an author user, the author user having authored the digital content, receiving user input from the author user, the user input corresponding to the digital content, and, in response to receiving the user input, transmitting first data and second data to the computing device for display to the author user, the first data comprising a number of contacts that are able to access the digital content and the second data indicating one or more relationships between the author user and the contacts.

Other implementations of this aspect include corresponding systems, apparatus, and computer programs, configured to perform the actions of the methods, encoded on computer storage devices.

These and other implementations may each optionally include one or more of the following features. For instance, the first data further includes a general classification of the contacts associated with the author user within a social networking service; the second data further includes one or more classifications of the contacts associated with the author user, each of the one or more classifications having been defined by the author user using a social networking service; at least one of the classifications includes a social circle defined by the author user; the second data includes a first sub-set and a second sub-set, the first sub-set corresponding to a first social circle and the second sub-set corresponding to a second social circle, the first and second social circles having been defined by the author user using a social networking service; the first sub-set indicates a first number of contacts associated with the first social circle and an identifier of the first social circle; the second sub-set indicates a first number of contacts associated with the second social circle and an identifier of the second social circle; the actions further include: receiving first user input, the first user input indicating creation of a first social circle, in response to receiving the first user input, providing one or more social networking contacts of a social network service for display to a user, the one or more social networking contacts including social networking contacts associated with the author user, receiving second user input, the second user input indicating a selection of the one or more social networking contacts to define a first group of contacts and a second group of contacts, and generating the first social circle, the first group of contacts populating the first social circle, wherein one of the second data corresponds to the first social circle; the first data further includes an image associated with the author user; the actions further include: receiving second user input from the author user, the second user input corresponding to the second data, and, in response to receiving the second user input, transmitting additional data to the computing device, the additional data providing detailed information regarding one or more of the contacts associated with the author user; and the content includes a post of the author user to a social networking service.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 6B depicts a screen-shot of an example about page for a personal social circle.

FIG. 6C depicts a screen-shot of an example photos page for a personal social circle.

FIG. 7A depicts a screen-shot of an example stream page for a shared social circle.

FIGS. 11A-11C depict screen-shots of an example stream page for a user of a social networking service.

FIGS. 13A-17B depict example screen-shots of a visibility inspector for posting to a social networking service.

Like reference numbers represent corresponding parts throughout.

DETAILED DESCRIPTION

Figure 1:
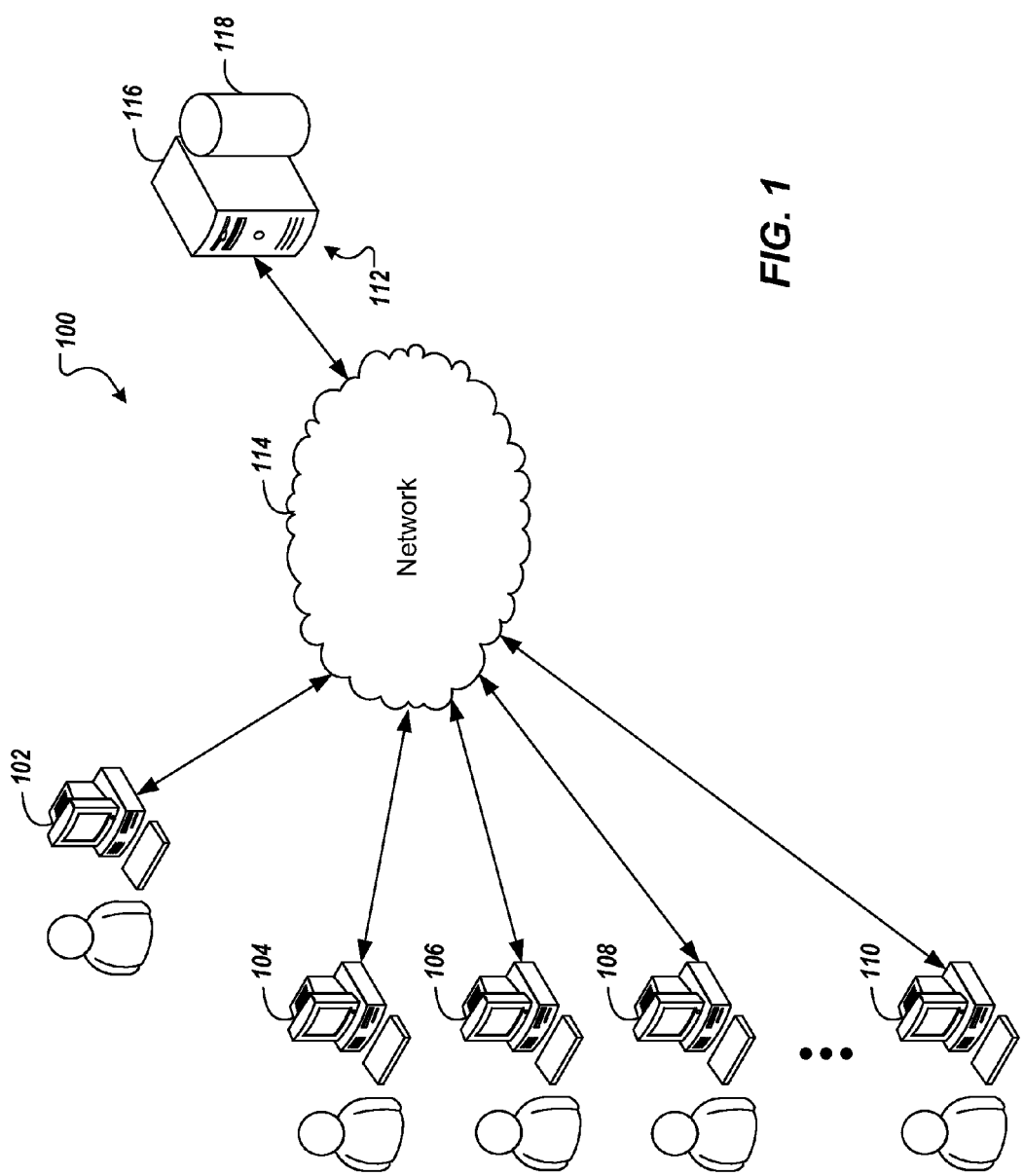
FIG. 1 is a diagram of an example network architecture.

In general, social circles are categories to which a user can assign their social networking contacts and better control the distribution and visibility of social networking posts. In accordance with the present disclosure, a social circle is provided as a data set defining a collection of contacts that are associated with one another in a computer-implemented social networking service. Generally, a social circle can be described from the perspective of an individual that is the center of a particular collection of socially interconnected people, or from the aggregate perspective of a collection of socially interconnected people. A social circle can have narrowly defined boundaries, all of the members of the social circle may be familiar with one another, and permission may be required for a member to join a social circle. In accordance with the present disclosure, a user of the social networking service can define a social circle, and the social circle, as a data set defining a collection of contacts, may reflect a real-life social circle of the user. That is, a social circle can reflect real-life social interactions between persons that the user may directly or indirectly associate with.

Large numbers of people have embraced the use of electronic social networking services as tools for building and maintaining networks of personal, familial, academic, professional, and other interpersonal relationships. These networks can grow and overlap in ways that may give rise to new issues. One of the concerns among users of traditional social networking services is that posts that are relevant or intended for consumption by one subgroup of the user's contacts may be irrelevant, uninteresting, or even embarrassing or offensive when read by other contacts. For example, a user's contact list may include friends, coworkers, and family, and there may be some overlap among those groups (e.g., a coworker who is also considered to be a friend, a family member who is also a coworker).

In cases where the user were to simply post a message to all contacts using a traditional social networking service, some contacts may see posts that could be irrelevant, or embarrassing to the user, if viewed by a particular sub-group of contacts. For example, a post about a technical nuance of the user's job may be interesting to coworkers, but uninteresting to family. As such, the uninterested contacts may begin to ignore the user's posts, or even remove the user as a contact to reduce the number of uninteresting posts displayed. In a more serious example, the user may post a status of "running late for work," which may be harmless if read by the user's friends, but may be personally or professionally damaging if read by coworkers (i.e., boss) or family (i.e., mom). As such, the user of a traditional social networking service may simply choose to self censor, not post anything and/or restrict the people maintained as contacts within the social networking service. These options can be associated with their own drawbacks. In the case of self-censorship, the user and some contacts may be less freely able to exchange information and take full advantage of the social networking service. In the case of restricting contacts, the user may be forced to narrow the focus of the electronic social network to a selected category of contacts (e.g., to include only family, or only coworkers), which again restricts the user's ability to interact with other online contacts and take full advantage of the social networking service.

Though the creation and use of social circles, the user can organize and categorize social networking contacts into various different groupings that can be used to control the visibility and access those contacts have to digital content distributed by the user. Example digital content can include textual postings, digital pictures, videos, audio files, hyperlinks (e.g., uniform resource indicators, URIs), and/or other digital content associated with the user's social networking profile. Returning to an earlier example, the user could post an update about the aforementioned technical nuance to only a "coworker" circle, and spare other contacts from seeing information that is irrelevant to them. Furthermore, social circles can be used to give users insight into the potential visibility of digital content distributions before they occur. As will be discussed below, the user may view a breakdown of the contacts in the user's various circles that would receive digital content distributed by the user.

FIG. 1 is a diagram of an example network architecture 100. The network architecture 100 includes a number of client devices 102-110 communicably connected to a server system 112 by a network 114. The server system 112 includes one or more processing devices 116 and one or more data store 118. The processing device 116 executes computer instructions (e.g., social network computer program code) stored in the data store 118 to perform functions of a social network server.

Users of the client devices 102-110 access the server system 112 to participate in a social networking service. For example, the client devices 102-110 can execute web browser applications that can be used to access the social networking service. In another example, the client devices 102-110 can execute software applications that are specific to the social network (e.g., social networking "apps" running on smartphones).

Users interacting with the client devices 102-110 can participate in the social networking service provided by the server system 112 by distributing digital content, such as text comments (e.g., updates, announcements, replies), digital photos, videos, or other appropriate electronic information. In some implementations, information can be posted on a user's behalf by systems and/or services external to the social network or the server system 112. For example, the user may post a review of a movie to a movie review website, and with proper permissions that website may cross-post the review to the social network on the user's behalf. In another example, a software application executing on a mobile device, with proper permissions, may use global positioning system (GPS) capabilities to determine the user's location and automatically update the social network with his location (e.g., "At Home", "At Work", "In Brownsdale, Minn.").

Users interacting with the client device 102-110 can also use the social networking service provided by the server system 112 to define social circles to organize and categorize the user's relationships to other users of the social networking service. Examples of the creation and use of social circles are provided in the description of FIG. 2, and throughout the remainder of the present disclosure.

In some implementations, the client devices 102-110 can be computing devices such as laptop or desktop computers, smartphones, personal digital assistants, portable media players, tablet computers, or other appropriate computing devices that can be used to communicate with an electronic social network. In some implementations, the server system 112 can include one or more computing devices such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Figure 2:
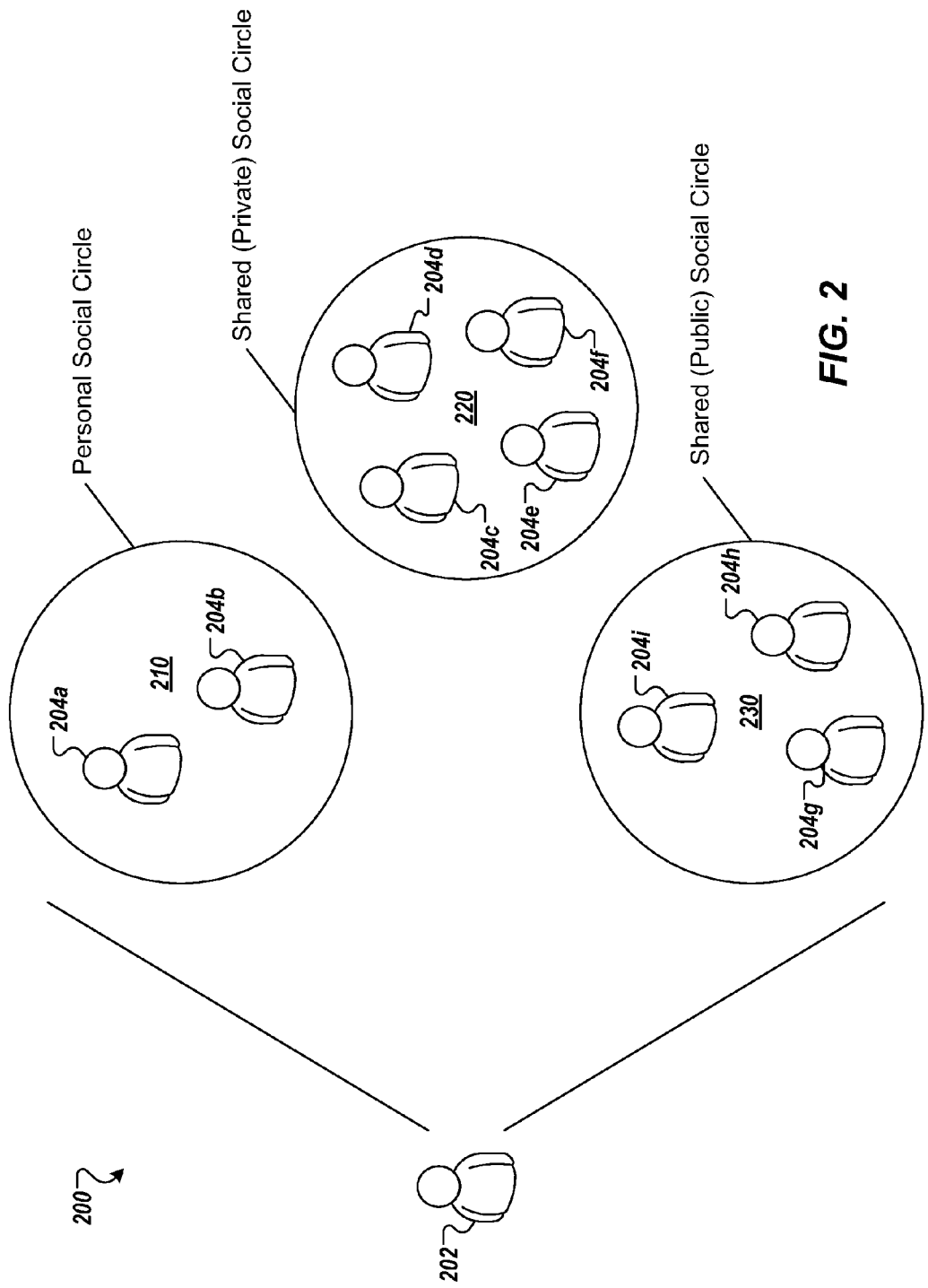
FIG. 2 is a diagram of an example social network including social circles.

FIG. 2 is a diagram of an example social network 200 including social circles. A user 202 is a member of a social network that supports the creation and use of social circles (e.g., the social network provided by the server device 112 of FIG. 1). In the present example, the user 202 has a number of contacts 204a-204i with which the user 202 can have some form of relationship (e.g., friends, coworkers, customers, teammates, clients, relatives, club members, classmates). The user 202 categorizes the contacts 204a-204i by assigning them to one or more social circles, such as a social circle 210, a social circle 220, and a social circle 230. A social circle 240, which has a number of contacts 242a-242c, is provided as a query-based social circle that can be automatically generated without input from the user 202. In some implementations, the social circle 240 can be generated based on information gathered from and has some commonality among the user 202 and the users 242a-242c (e.g., posts, uploaded photos, check-ins, volunteered location information).

The social circle 210 is a personal social circle. In some implementations, personal social circles are groupings created by and may be known only to the user 202 (e.g., the contacts 204a, 204b may receive no indication that they are in the user's 202 personal social circle 210). In some implementations, personal social circles are groupings created by the user 202 and may be known to the user 202 as well as the contacts (e.g., contacts 204a, 204b) that are members of the social circle (e.g., the contacts 204a, 204b receive an indication that they have been added to the personal social circle 210).

In some implementations, personal social circles may be used to organize and categorize the contacts 204a-204i in ways that are relevant to the user 202. In some implementations, the user 202 may use personal social circles to organize contacts in order to discretely target which of his contacts 204a-204h will see certain postings or have access to particular information. For example, the user 202 may be planning a surprise party for a small group of friends. As such, the user can organize contacts into "Surprise Party Attendees" and "Surprise Party Honorees" personal social circles. By doing so, the user 202 may better target selected postings to the friends attending and/or helping to plan the surprise party (i.e., Surprise Party Attendees), while targeting selected postings to friends that are to be honored at the surprise party (i.e., Surprise Party Honorees) to maintain the integrity of the surprise.

The social circle 220 is a shared private social circle, which may also be referred to simply as a shared circle. In general, shared private social circles are social circles that the user 202 creates and invites contacts to voluntarily join. Contacts that accept the invitation become members of the shared private social circle. Members of a shared private social circle can see information posted to that circle by the user 202 and can post information to be shared with other members of the shared private social circle. For example, the user 202 may tend to post a large number of jokes to the social network. However, while some of the contacts 204a-204i may find the jokes to be entertaining, others may find them to be simply annoying. Realizing this, the user 202 may create a "jokes" shared private social circle and invite some or all of the contacts 204a-204i to join. With the "jokes" social circle in place, the user 202 may post witticisms to the "jokes" circle, and only those contacts who have accepted the invitation are able to see the user's 202 comicality. Similarly, members of the shared private social circle are able to post messages to the circle, and those posts are visible to other members of that circle.

The social circle 230 is a shared public circle. In general, shared public circles are social circles that the user 202 creates, and invites contacts to voluntarily join. Further, the existence of a shared public circle is publicly available such that other users of the social networking service (e.g., not necessarily just the user's 202 contacts 204a-204i) may request to join the public social circle. Members of shared public circles may post information to, and see updates posted by, other members of the same public shared circle. In some implementations, public shares circles may be "fan" or "group" circles (e.g., circles dedicated to a particular place, event, product, movie, celebrity, sports team, company, concept, philosophy, organization, support network). For example, the user 202 may create a shared public circle for his band, and fans of his act may join the circle to discuss upcoming shows, download MP3s of the band's music, or post videos from recent concerts. In another example, the user 202 may create a shared public circle for alumni of his high school graduating class, which his former classmates may find and join in order to stay in touch with one another and post pictures from their school days. Once a shared public circle is created, in some implementations the user 202 can invite people to join the circle. In some implementations, nonmembers of the circle can request membership in the shared public circle, and membership in a shared public circle may be automatic upon request, or may require the user's 202 approval to become members of the shared public circle.

In some implementations, one or more default social circles can be provided or suggested to a user when the user subscribes to a social networking service. For example, "Friends," "Family," and "Coworkers" social circles can automatically be provided in a user's profile upon the user subscribing to the particular social networking service. Other social circles can automatically be provided including, for example, an "Acquaintances" social circle and/or a "Just Following" social circle. In some implementations, the automatically created or circles can include personal social circles. Although default social circles can be automatically provided, it may be left to the user to actually populate the default social circles with contacts. For example, each of the default social circles may initially be empty of contacts, and the user populates each of the default social circles as discussed in further detail herein.

In some implementations, one or more default social circles can be automatically generated based on the user's profile information. For example, the user's profile may include demographic data (e.g., age), job data and/or interests data (e.g., sports, hobbies). Through data mining techniques (e.g., clustering social circle creations over a threshold number of users), a provider of the social networking service may determine that users within a particular demographic typically create one or more particular types of social circles. By categorizing a user within a particular demographic, the provider of the social networking service can suggest or automatically generate one or more particular default social circles. For example, if a particular user falls within a demographic that corresponds to a high school student, a default "School Friends" social circle may be suggested to or automatically created for the user. As another example, if a particular user falls within a demographic that corresponds to a college student, a default "College Friends" social circle may be suggested to or automatically created for the user. Social circles can also be suggested or created based on interest data provided in a user's profile. For example, if a particular user's interests include skiing, a default "Ski Buddies" social circle may be suggested to or automatically created for the user.

In some implementations, one or more social circles and/or one or more contacts to add to a social circle can be suggested to the user based on data associated with the user. The data can indicate a likelihood of the user having a social connection to particular contacts. In some examples, email data associated with the user can be processed to suggest one or more social circles to the user and/or contacts to add to a social circle. For example, email data associated with a user can indicate that the user frequently emails a contact that has the same surname as the user. Recognizing this, the social networking service can suggest that the user add the contact as a contact within the social networking service (i.e., if the contact is not already a contact within the social networking service) and/or to add the contact to a Family social circle. As another example, email data associated with a user can indicate that the user frequently emails a contact in a business context. Recognizing this, the social networking service can suggest that the user add the contact as a contact within the social networking service (i.e., if the contact is not already a contact within the social networking service) and/or to add the contact to a Coworkers social circle and/or suggest that the user create a Professional Contacts social circle to add the contact to.

In some implementations, a user can create an event and can transmit an invitation to one or more contacts requesting that each of the one or more contacts attend the event. Example events can include in-person events and virtual events. Example in-person events can include a wedding, a birthday party, a concert, a dinner, a movie, a theater performance and/or any social gathering of people. Example virtual events can include a teleconference, a video conference and/or any timed communication of people using electronic devices. In some implementations, a distribution interface, discussed in further detail herein, can be provided to invite event attendees. The user can provide user input to the distribution interface, in manners discussed herein, to specify which contacts and/or social circles are to be invited to the event.

In some implementations, a social circle can be generated based on an event. In some examples, and based on data provided in the invitation and the contacts, to which the invitation is sent, one or more social circles corresponding to the event can be generated. In this manner, the user and/or contacts that become members of the social circle can distribute digital content corresponding to the event using the social circle. For example, an event can include a concert and the user can invite one or more contacts to attend the concert. A concert social circle can be suggested to the user and can include the one or more contacts as members of the concert social circle. The user and the one or more contacts can distribute digital content to one another using the concert social circle. For example, before the concert, the user and the one or more contacts can coordinate when and where to meet to at the concert and/or share images, videos and/or audio of the particular artists performing at the concert. As another example, after the concert, the user and the one or more contacts can distribute images and/or videos captured while attending the concert and/or can share stories about occurrences at the concert.

As discussed herein, posts can be distributed to contacts within the social networking service including one or more social circles, such that they are exclusively viewable by the indicated contacts and/or contacts within one or more indicated social circles. For example, and as discussed in further detail below with regard to FIGS. 11A and 11B, a user of the social networking service can generate a post and indicate one or more social circles for distribution of the post. In some examples, a user distributing a post can define a distribution that includes a plurality of social circles, such that the post is simultaneously distributed to members of the social circles. In some implementations, an auto-complete component enables the user to type in part of the name of a social circle and/or individual contact to specify to which social circles and/or individual contacts the post content is to be distributed.

In some implementations, the auto-complete functionality can be based on a contact ranking. For example, contacts and/or social circles can include an associated ranking score. Contacts having a higher ranking score are ranked higher than contacts having a lower ranking score. In some examples, auto-complete functionality can identify one or more contacts and/or one or more social circles based on text input into a distribution interface of a content sharing interface, discussed in further detail below. The one or more contacts and/or one or more social circles can be listed in rank order based on the ranking scores. For example, the text input can include the letter "f" and the auto-complete functionality can identify the contacts "Farley" and "Frank" as contacts of the user, to which digital content can be distributed. The contact "Farley" can have a ranking score that is lower than a ranking score of the contact "Frank." The contacts can be displayed to the user for selection in rank order based on the ranking score. Consequently, and continuing with the instant example, the contact "Frank" can be listed higher on a list of contacts displayed to the user than the contact "Farley." In this manner, although the contact "Farley" could be listed first on an alphabetical basis, the contact "Frank" is instead listed first based on the ranking scores. As another example, the text input can include the letter "f" and the auto-complete functionality can identify the social circles "Family" and "Friends" as social circles defined by the user, to which digital content can be distributed. The social circle "Family" can have a ranking score that is lower than a ranking score of the social circle "Friends." The social circles can be displayed to the user for selection in rank order based on the ranking score. Consequently, and continuing with the instant example, the social circle "Friends" can be listed higher on a list of contacts displayed to the user than the social circle "Family." In this manner, although the social circle "Family" could be listed first on an alphabetical basis, the social circle "Friends" is instead listed first based on the ranking scores.

In some implementations, the ranking scores can be based on a popularity of contacts and/or social circles. For example, a contact that the user often shares digital content with may have a ranking score that is higher than a ranking score of a contact that the user rarely shares digital content with. Continuing with the example provided above, the contact "Frank" may receive digital content from the user more often than the contact "Farley." As another example, a social circle that is more often used to define distribution of digital content may have a higher ranking score than a ranking score of a social circle that is less often used to define distribution of digital content. Continuing with the example provided above, the social circle "Friends" may be used more often to define distribution of digital content by the user than the social circle "Family" (i.e., the user distributes content to the Friends social circle than the Family social circle).

In some implementations, the ranking scores can be based on a social vicinity of the user to the respective contacts. For example, a ranking score of a contact that is a direct contact of the user may be higher than a ranking score of a contact that is an indirect contact of the user. Continuing with the example provided above, the contact "Frank" can be a direct contact of the user (e.g., a friend) while the contact "Farley" is an indirect contact of the user (e.g., a friend of a friend).

In some implementations, the ranking scores can be based on a frequency of interaction via emails between the user and each respective contact. For example, the user can directly email each contact using an email service and a ranking score can be generated for each contact based on the email interaction. In some examples, the ranking score can be determined based on a number of emails sent from the user to a particular contact. In some examples, the ranking score can be determined based on a number of emails sent from the user to a particular contact over a particular time period. In this manner, frequency of email contact (i.e., number of emails per time period) is considered in the ranking score. In some examples, the ranking score can be determined based on the number of emails sent from the user to the particular contact and the number of emails sent from the particular contact to the user. In some implementations, each ranking score can be provided by an email service to the social networking service.

Continuing with the example provided above, the contact "Frank" can be in frequent email communication with the user, while the contact "Farley" is in less frequent email communication with the user. A ranking score corresponding to Frank and a ranking score corresponding to Farley can be provided to the underlying social networking service from an email service. Accordingly, text input to a content sharing interface can include the letter "f" and the auto-complete functionality can identify the contacts "Farley" and "Frank" as contacts of the user, to which digital content can be distributed. The contacts can be displayed to the user for selection in rank order based on the ranking score. Consequently, and continuing with the instant example, the contact "Frank" can be listed higher on a list of contacts displayed to the user than the contact "Farley."

In some examples, a character can be provided to the server as it is input by the user and the server can process the character, and any previously provided characters, to provide output for presentation to the user. For example, auto-correct functionality discussed herein can include character data being transmitted to the server as it is input by the user to the content sharing interface. In response, the server can generate output including one or more contact names and/or social circles that correspond to the input character data for presentation back to the user in a list of contact names and/or social circles, from which the user can select a particular contact and/or social circle.

During a post write-time, a post data set is transmitted from the user's client computing device (e.g., client device 102 of FIG. 1) to a distribution hub, which can be provided at a server (e.g., server system 112 of FIG. 1). The post data set includes a plurality of data. In some implementations, the post data set includes post content data (e.g., text, uniform resource indicator (URI)), timestamp data (e.g., a timestamp indicating the time that the post was generated), distribution data (e.g., contacts and/or one or more social circles), and identification (ID) data (e.g., an ID assigned to the post data set upon generation of the post). In some implementations, the distribution data is processed to provide an access control list (ACL) that specifies which contacts within the social networking system are granted access to the post content. In some implementations, the distribution hub determines end points the post data set is to be distributed to based on the ACL. More specifically, the set of contacts that care about the post and/or that are allowed access to the post is determined based on the ACL and the ID of the post is written to a per user/view index at the distribution hub. When fetching posts to distribute to a user, the user/view index is accessed and the IDs of the various posts that the user is allowed to view are determined. The post data sets are retrieved from a data store (e.g., data store 118 of FIG. 1) and are transmitted to a client device associated with the requesting user.

FIGS. 3A-3H depict screen-shots 300 of an example graphical user interface for creating and maintaining social circles. In the screen-shots 300, a social graph editor user interface (UI) 301 is shown. In some implementations, the UI 301 can be an interface presented by a purpose made social networking application, while in some implementations the UI 301 can be one or more web pages of a social networking website displayed in a general purpose web browser.

The UI 301 includes a number of choices presented in a menu bar 305. In the present example, the "Social Network" choice has been selected by a user. This selection causes a web-based social networking application to be executed and a social network menu 310 to be displayed. The social network menu 310 includes a profile indicator 312 in which information such as a user name 314 and a user image 316 associated with the currently logged in user are displayed.

The social network menu 310 also displays, among other items, a circles submenu 318. The circles submenu 318, when selected (e.g., as represented by the highlighting of the submenu's title), causes a social circle display 320 to be presented. The social circle display 320 includes a number of social circles 322*a*-322*e* that are graphical representations of various social circles that the user has created or has permission to edit. Each of the social circles 322*a*-322*e* displays information about the social circle it represents. For example, the social circle 322*c* displays a name 324*a*, a count 324*b* of the number of contacts associated with the social circle, and an indication of what kind of social circle (e.g., personal, private shared, public shared) that the social circle 322*c* is.

The social circle display 320 also includes a contact display 326. The contact display 326 provides a graphical interface for viewing, selecting, and organizing items in the user's contact lists. A collection of contact icons 328a-328i represents the contacts or other entities (e.g., organizations, places, or other items) socially networked with the particular user. In some implementations, the icons can be digital photos of the contacts they represent (e.g., the icons 328a, 328d), arbitrary images (e.g., the icons 328b, 328g), or placeholders (e.g., when the contact has no image associated with their account, such as the icon 328c). Contacts who are members of one or more of the user's social circles are identified by an indicator 330 superimposed upon the icons (e.g., the icons 328a, 328f, 328h). A scroll bar 329 is provided for the user to access additional contact icons that may not fit into the initial view.

A collection of filter buttons 332a-332d is provided to select subsets of the user's contacts. The "all people" filter button 332a, when selected, causes the contact display 326 to display the user's contacts with substantially no filtering. The "selected" filter button 332b, when selected, causes the contact display to display only the contacts that have been selected by the user. For example, the user may select multiple contacts while in an "all people" view, and then display only the selected contacts by pressing the "selected" filter button 332b. The "in circles" filter button 332c, when selected, causes the contact display 326 to display substantially only the contacts that are included in at least one social circle defined by the user. The "no circles" filter button 332d, when selected, causes the contact display 326 to display substantially only the contacts that is not in a social circle defined by the user. A search input box 324 is provided so the user can type in all or part of a name, and the resulting matches will appear in the contact display 326.

In some implementations, the contacts provided in the contact display 326 can include contacts that are established as electronic contacts (i.e., contacts the user communicates with via the Internet, among other communication channels) using the social networking service and/or contacts that are established as electronic contacts using one or more other services. In some examples, one or more contacts provided in the contact display 326 can each also be users of the social networking service. In some examples, one or more contacts provided in the contact display 326 might not be users of the social networking service, but may be contacts of the user through another service, such as an email service. In this manner, although a particular contact of the user might not be a user of the social networking service (i.e., a non-social networking contact), the user can still distribute digital content, or otherwise communicate with the non-social networking contact using the social networking service. For example, a non-social networking contact can be added to a social circle, such that digital content that is distributed using the social circle is also communicated to the non-social networking contact (e.g., via email).

A sorting selector 338 provides selections that the user may choose to alter the way the user's contacts are displayed in the contact display 326. For example, a "frequently contacted" selection may be chosen to sort the user's contacts according to how often the user communicates with them (e.g., by tracking numbers or lengths of social circle posts, email, instant messages, phone calls). In another example, a "number of circles" selection may be chosen to sort the user's contacts according to how many circles the contact shares with the user.

The social circle display 320 also includes a collection of social circle filter buttons 340a-340d. The "all circles" button 340a, when selected, causes the social circle display 320 to display substantially all the social circles that the user is able to administer. The "personal" button 340b, when selected, causes the social circle display 320 to display substantially only the user's personal circles. The "shared" button 340c, when selected, causes the social circle display 320 to display substantially only the user's shared private circles. The "shared-public" button 340d, when selected, causes the social circle display 320 to display only the user's shared public circles.

A content sharing interface 306 is also provided in the UI 301. The content sharing interface 306 can be present across multiple web-based applications, such that a user can enter and publish a post from any of the multiple web-based applications, without having to go back to the social networking application to author and publish a post. For example, and as noted above, the content sharing interface 306 is provided in the UI 301 of the social networking application. The user, however, may switch to work in another application. For example, the user may select "Mail" from the menu bar 305, upon which selection, a web-based email application is executed. A UI of the web-based email application (not shown) will also include the content sharing interface 306, such that the user can still post to the social networking service, even though the user is not directly working in the social networking application.

Figure 3A:
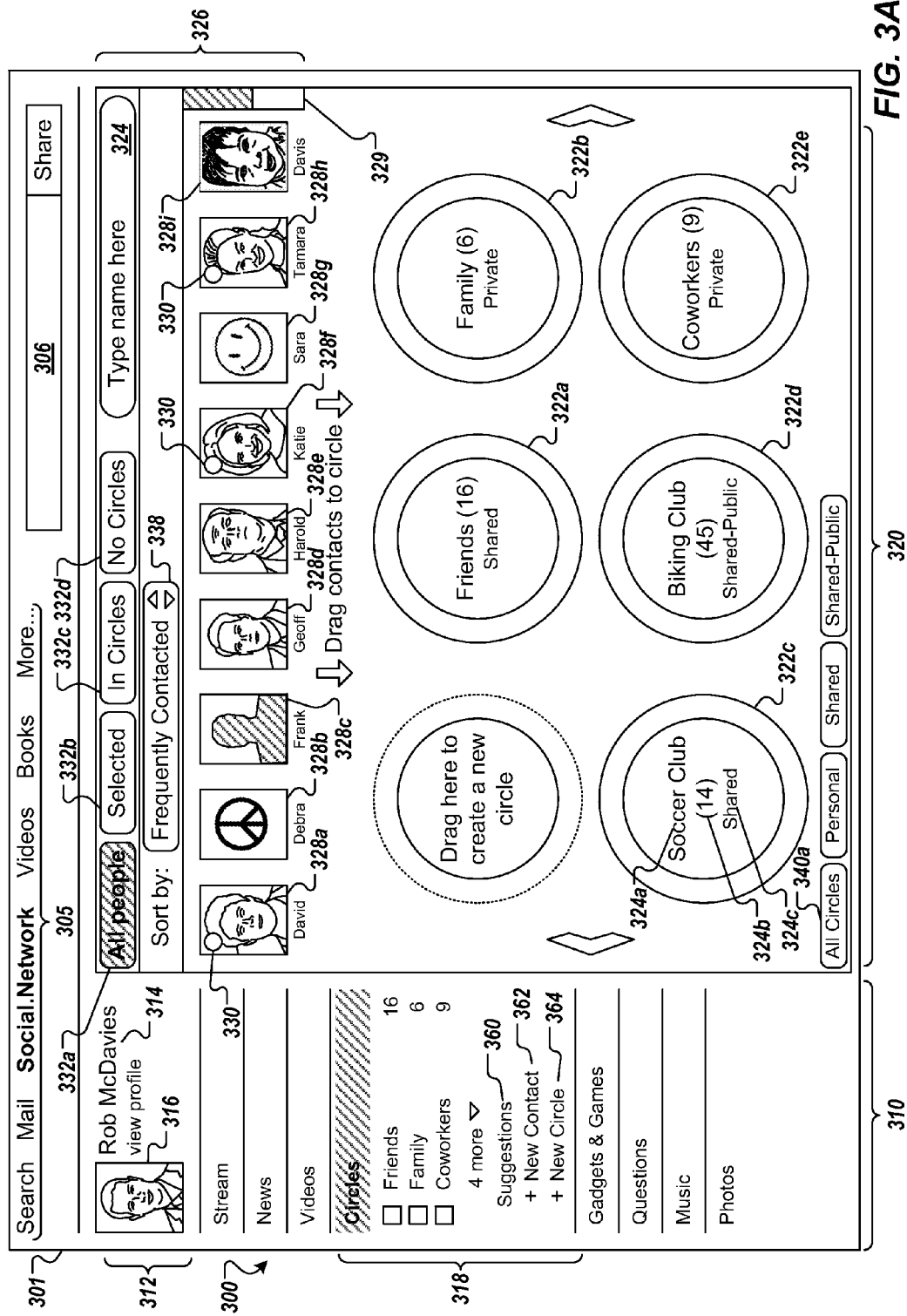
FIGS. 3A-3H depict screen-shots of an example graphical user interface for creating and maintaining social circles.
Figure 3B:
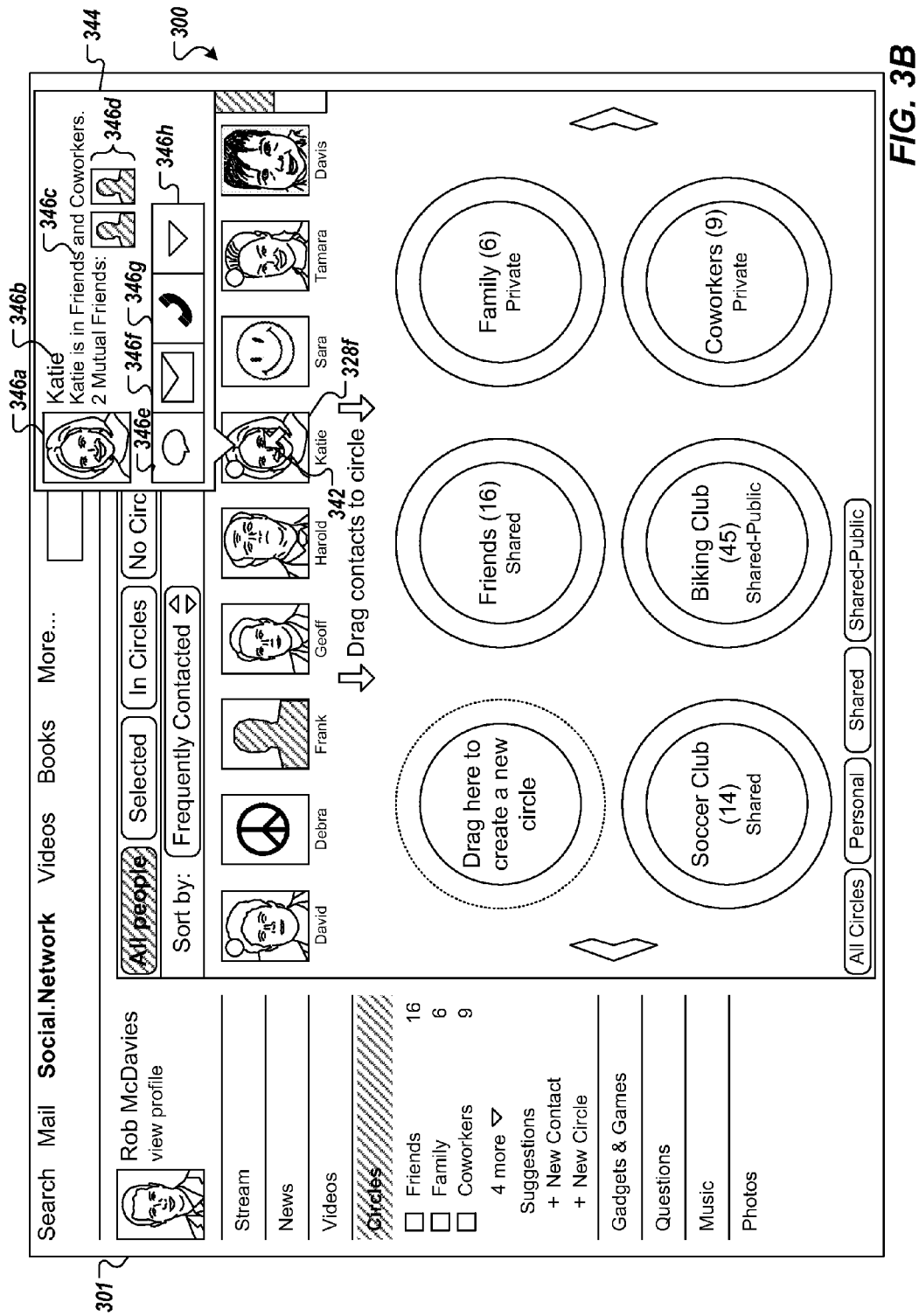

Referring now to FIG. 3B, the UI 301 is shown wherein the user is "hovering" (e.g., pausing or clicking) a pointer 342 over the contact icon 328f. In response to the hovering, a contact dialog 344 is presented. In general, the contact dialog 344 displays details about, and ways to interact with, a selected contact. The contact dialog 344 includes a contact image 346a and a contact name 346b.

A social circle summary 346c displays a summary of which of the user's social circles the contact is in. In the illustrated example, the circle summary 346c indicates that "Katie is in Friends and Coworkers." In some implementations, the social circle summary may provide other information. For example, contacts that are in a larger number of the user's social circles may be displayed with a social circle summary 436c such as "Katie is in eight of your circles." A mutual friends display 346d is provided to display a count of the number of people who are included in both the user's and the selected contact's friend or contact lists as well as a display of some or all of the contact images associated with the mutual friends.

A chat button 346e, when selected, initiates a chat (e.g., instant messenger) session with the selected contact. An email button 346f, when selected, initiates an email message addressed to the selected contact. A phone button 346g, when selected, initiates a telephone or other form of voice chat with the selected contact. A "more" button 346h, when selected, causes additional selections for interacting with the selected contact to be displayed. For example, the additional selections can include buttons that map or provide navigation directions to the selected client's location, and buttons that provide the user with functions or edit or delete the selected contact's information.

Figure 3C:
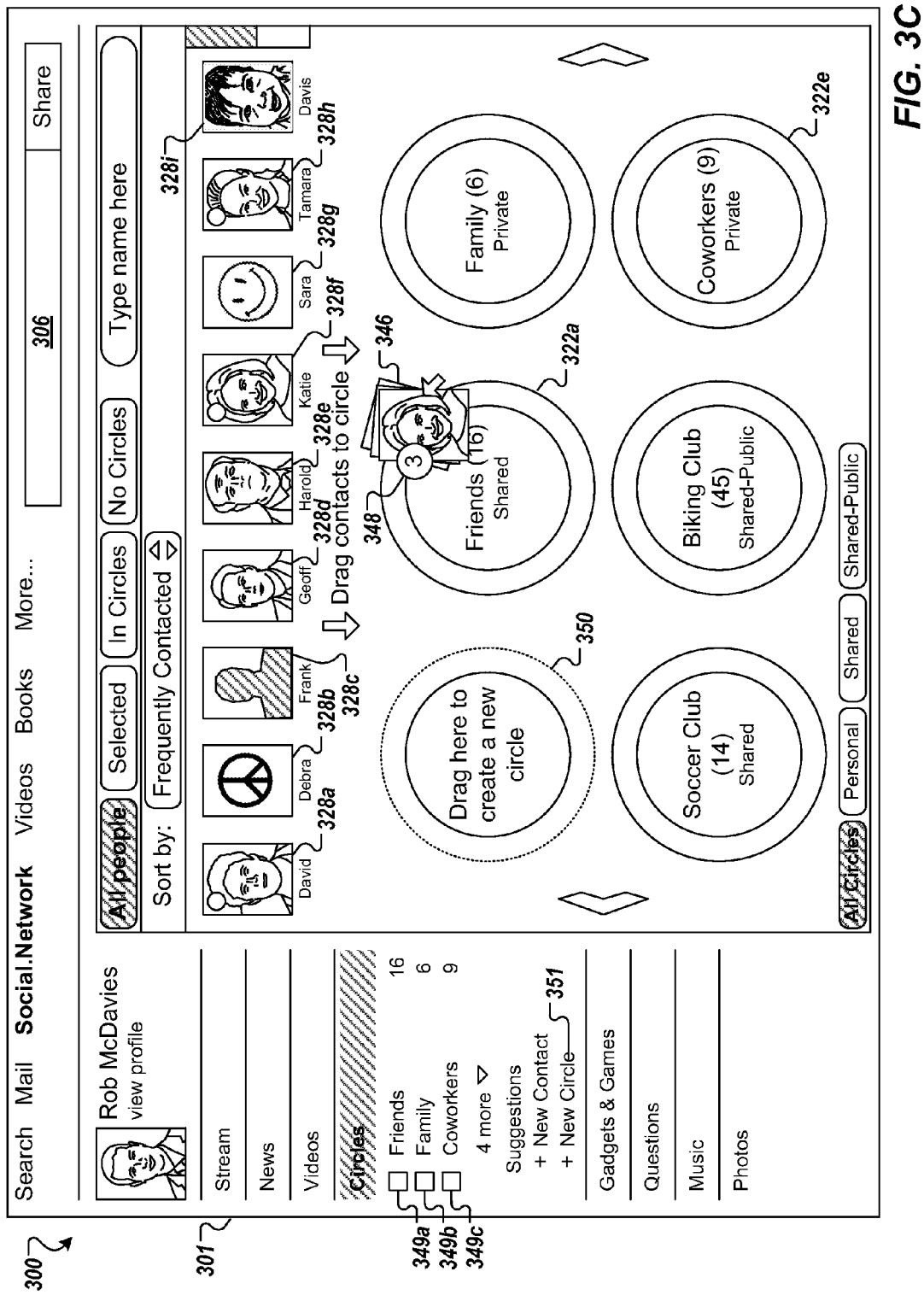

Referring now to FIG. 3C, the UI 301 is shown wherein the user is adding a collection of selected contacts to the "friends" social circle 322a. In some implementations, the user can select one or more contact icons 328a-328i by clicking, so-called shift clicking, lassoing, rubber-banding, or by performing other actions within the UI 301 to select one or more of the contact icons 328a-328i. The user then "drags" the selected contacts to a target social circle, which in this example is the "friends" social circle 322a.

The selected contacts are represented by a selected contacts indicator 346. In the depicted example, the selected contacts indicator 346 appears as a stack of the selected contacts' contact icons 328a-328i. For example, the selected contacts include the contact "Katie," and her contact icon 328f appears in the stack of the contacts indicator 346. A count indicator 348 is superimposed onto the contacts indicator 346 to display the number of contacts in the selected group.

The selected contacts indicator 346 may be "dragged" (e.g., moved) and "dropped" (e.g., released) onto a social circle to add the selected contacts to the selected social circle. In the illustrated example, the user appears to be dragging the selected contacts to make them members of the "friends" shared private circle 322a.

The user is also able to add contacts to a circle by selecting one or more of the contact icons 328a-328i, and then selecting one or more of a collection of circle selectors 349a-349c. For example, the user can click the contact icon 328a and then click the "coworkers" circle selector 349c to add "David" to the "coworkers" social circle 322e.

The selected contacts indicator 346 can also be dragged and dropped onto a new circle region 350. By dropping the selected contacts indicator 346 onto the new circle region 350, a process for creating a new social circle of which the selected contacts will become members is initiated. In some implementations, a menu can be provided to enable the user to create a new circle. The creation of new social circles will be discussed in additional detail with reference to FIGS. 4A-4C and 5A-5D.

In some implementations, the user may drag the selected contacts indicator to an open space outside of the social circles 322a-322e or the new circle region 350. For example, the user may select a number of contacts for addition to a circle, but then change his mind and wish to cancel the action. In some implementations, the user may drop the selected contacts indicator 346 onto an open space to cancel the action. In some implementations, a visual indication may accompany the cancelling action. For example, when the user drops the selected contacts indicator 346 in empty space, the stack of contact icons within the selected contacts indicator 346 may be animated to give the appearance that each contact icon in the stack is "flying" back to its corresponding contact icon 328a-328i.

Figure 3D:
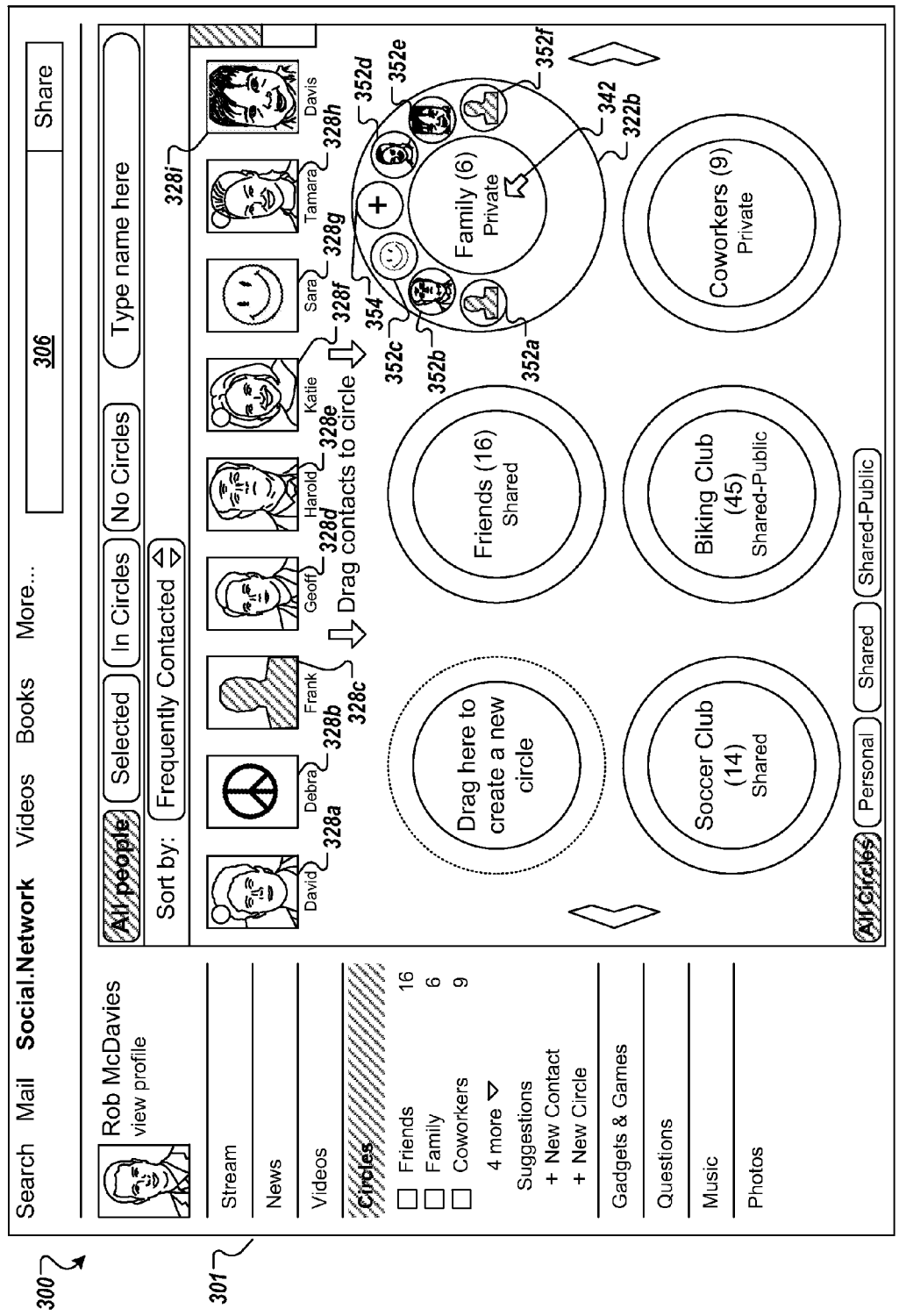

Referring now to FIG. 3D, the UI 301 is shown wherein the user is hovering the pointer 342 over the "family" social circle 322b. In general, the user may hover the pointer 342 over one of the social circles 322a-322e, and in response the selected social circle may alter its appearance to indicate some or all of the contacts who are members of the selected social circle.

In the present example, the user is hovering the pointer 342 over the "family" social circle 322b. In response, the appearance of the social circle 322b is modified to display a number of member icons 352a-352f to provide a visual representation of the contact icons (e.g., contact icons 328e, 328g, 328h, 352e) for contacts included in the social circle 322b. The modified social circle 322b also includes an add icon 354. The add icon, when selected, initiates a process for adding more contacts to the associated social circle 322b. For example, clicking the icon 354 can cause a dialog box or other user interface to appear, with which the user can interact to add contacts to the social circle 322b.

Figure 3E:
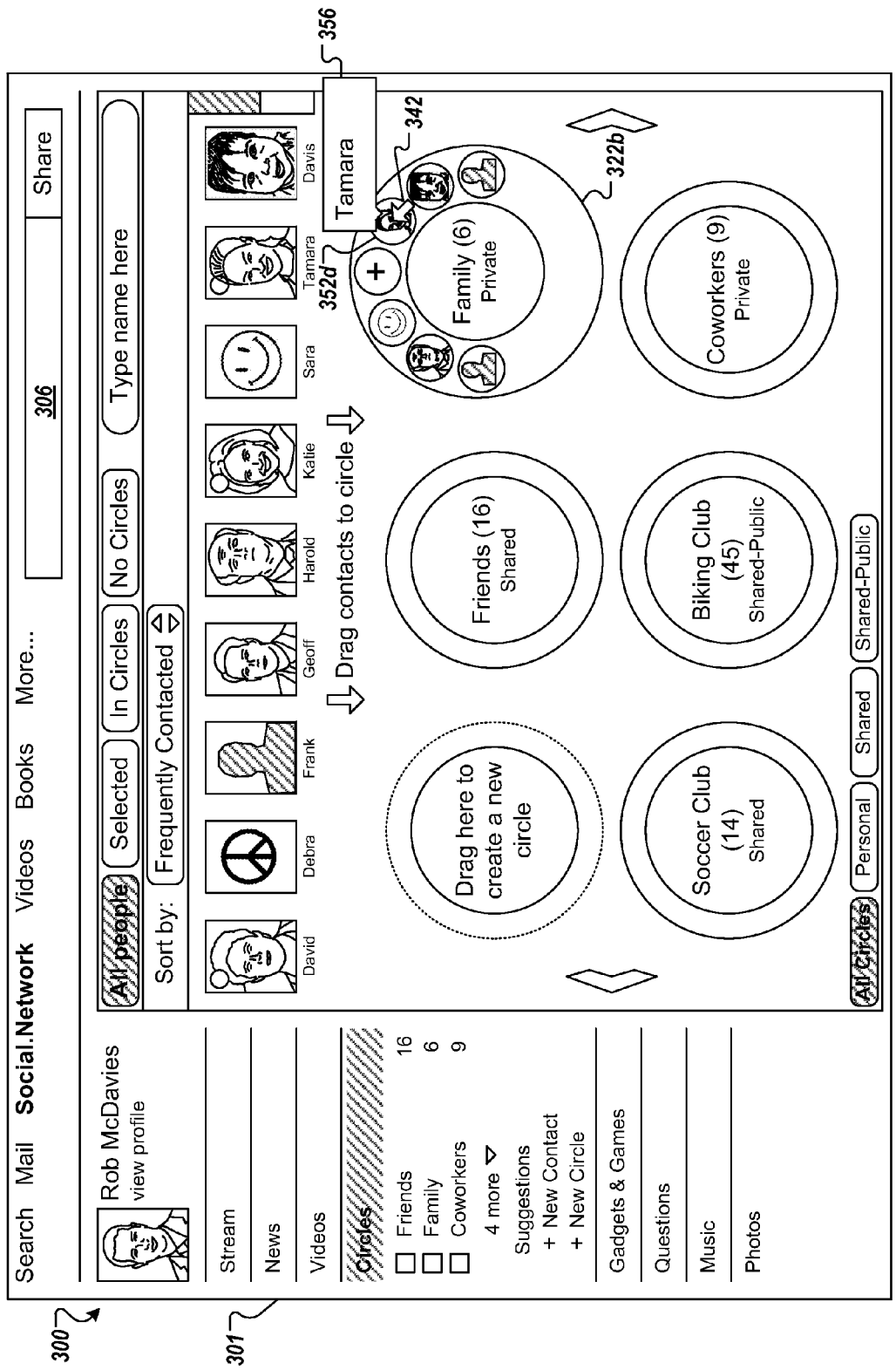

Referring now to FIG. 3E, the UI 301 is shown wherein the user is hovering the pointer 342 over the member icon 352d of the social circle 322b. In response, a member dialog 356 is presented to display information about the selected member of the social circle. In the present example, the dialog 356 displays the name of the selected member (e.g., "Tamara").

Figure 3F:
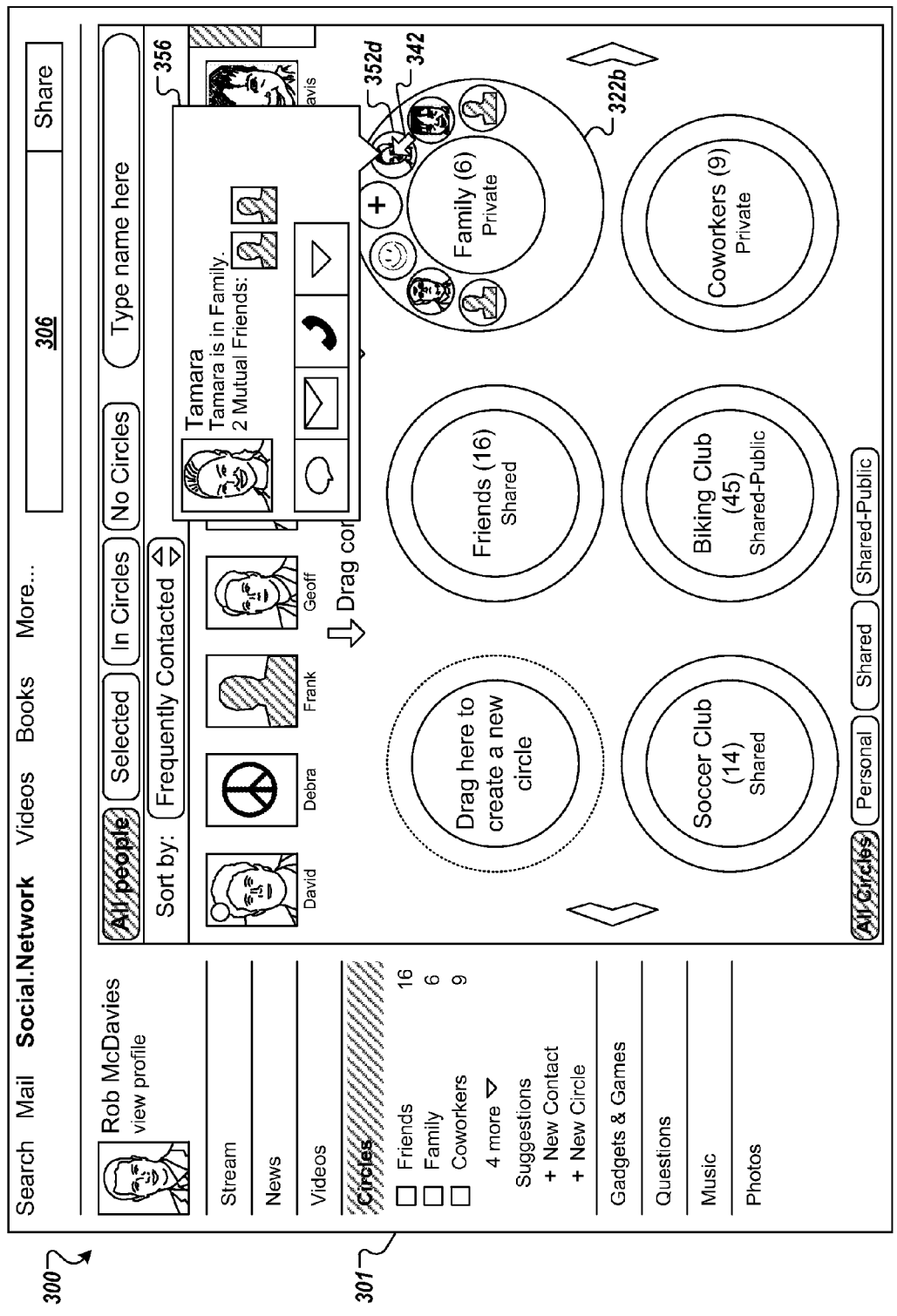

Referring now to FIG. 3F, the UI 301 is shown wherein a member dialog 356 is displayed to provide information about, and tools to interact with, the member represented by the member icon 352d. In some implementations, the member dialog 356 is substantially similar in appearance and function to the contact dialog 344 described previously. In some implementations, the member dialog 356 may be presented in response to the user clicking or otherwise selecting the member icon 352d. In some implementations, the member dialog 356 may be presented in response to an extended hover operation. For example, the user may hover the pointer 342 over the member icon 352d and in response the dialog 356 of FIG. 3E may be initially presented. In examples where the user continues to hover the pointer 342 over the member icon 352d, the dialog 356 may be replaced by the member dialog 356.

Figure 3G:
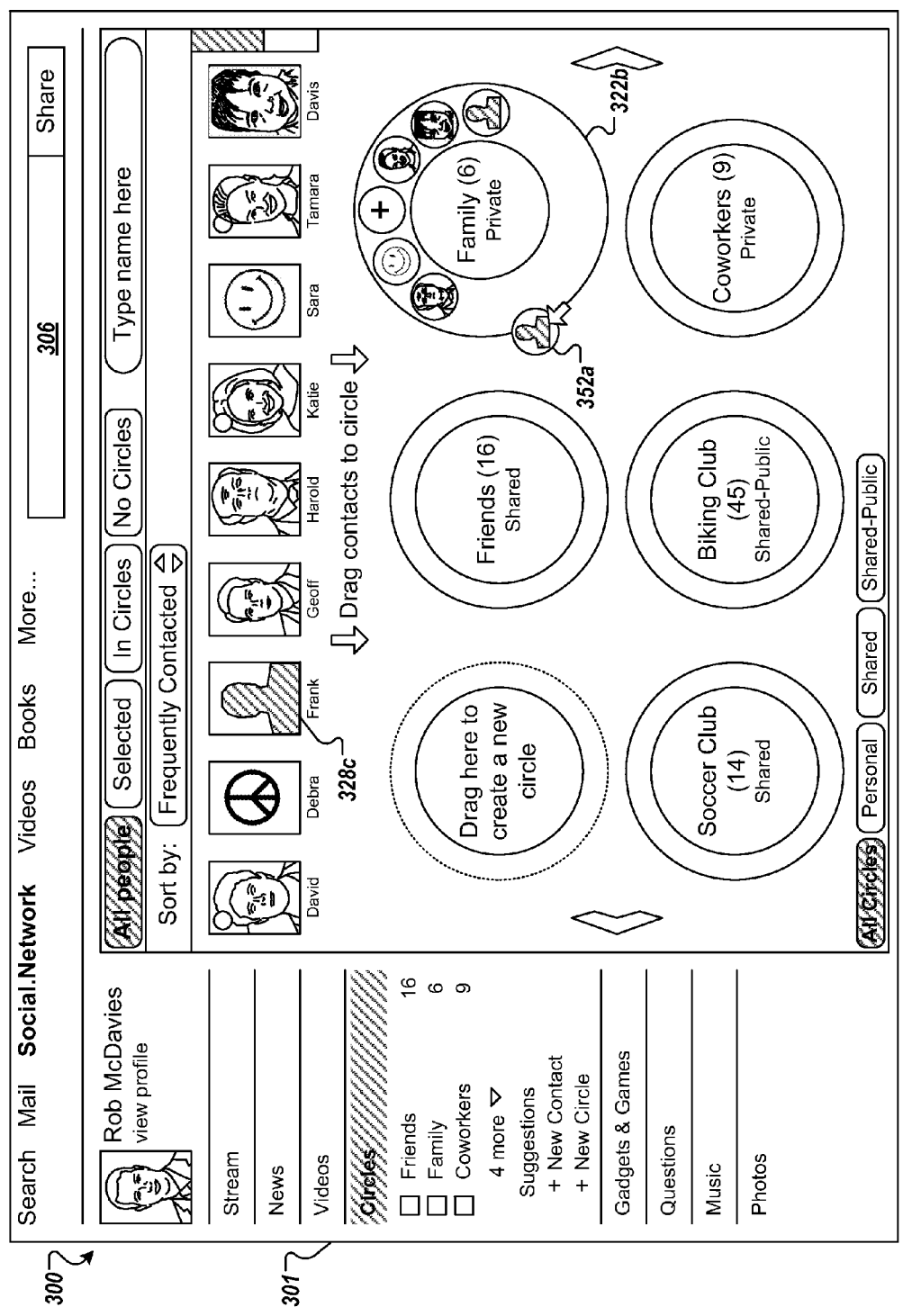

Referring now to FIG. 3G, the UI 301 is shown wherein the user is dragging the member icon 352a out of the social circle 322b. In general, the user can drag member icons out of social circles to end the selected contacts' memberships in the selected social circles. In the illustrated example, the member icon 352a is being dragged out of the social circle 322b. The user may then drop the member icon 352a onto another social circle to move the selected contact to that social circle, or the user may drop the member icon 352a into an empty space on the screen. In some implementations, when dropped onto empty space the member icon 352a may be animated to give the appearance that the member icon 352a is flying back to its corresponding contact icon 328c.

Figure 3H:
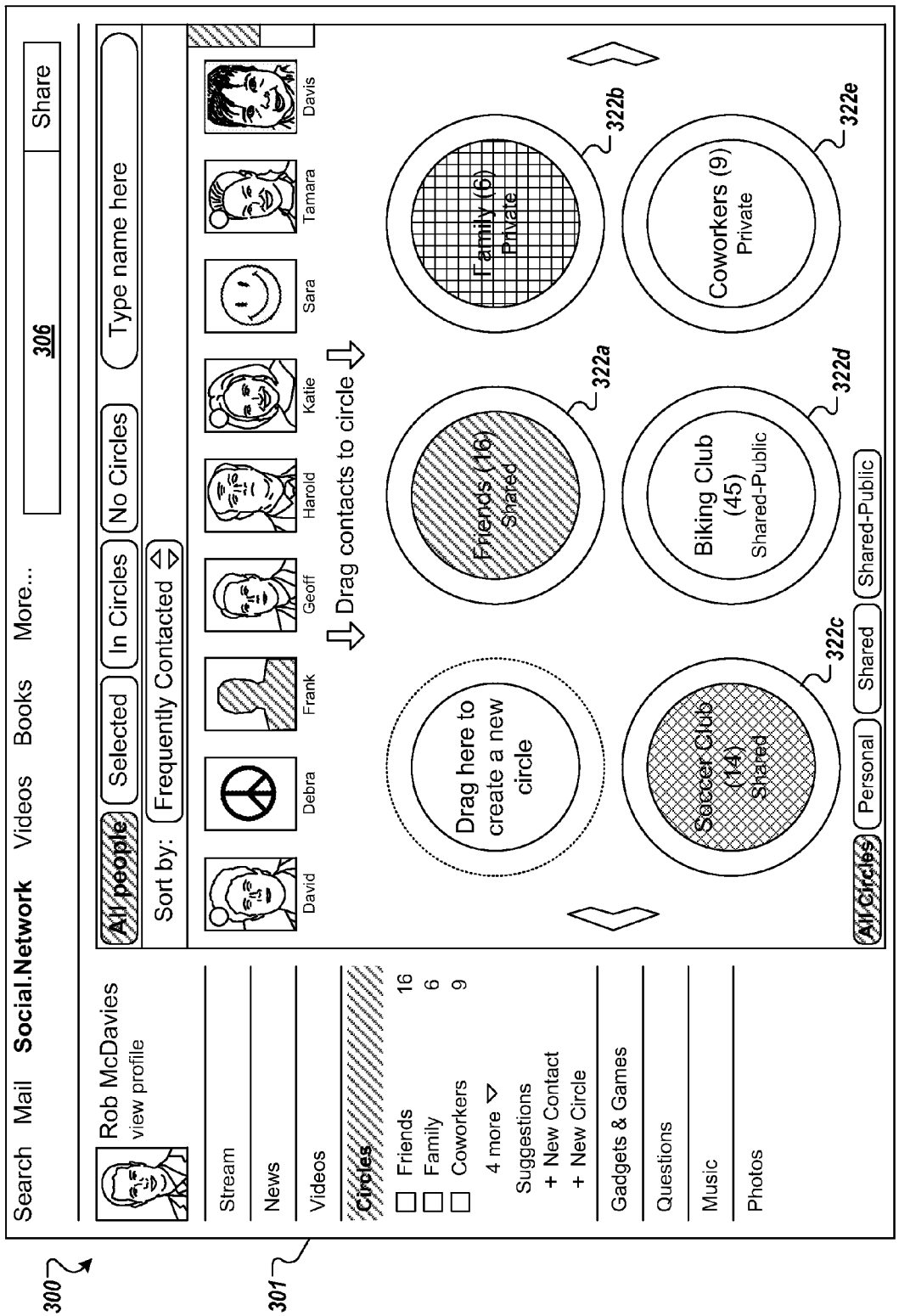

Referring now to FIG. 3H, the UI 301 is shown wherein some of the social circles 322a-322e are shown with modified appearances. In some implementations, the user can customize the appearance of the social circles 322a-322e with selected foreground and background colors and/or fill patterns, alternate fonts, animations, videos, or images. For example, the social circle 322a may have a custom blue background, the social circle 322b may display a digital photo as a background, and the social circle 322c may have a black and white crosshatch pattern. In this manner, a visual indicator is provided such that the user can rapidly identify and distinguish between the various social circles. In some implementations, the appearance of the social circles 322a-322e may be altered automatically. For example, social circles with a great deal of activity may be displayed with brighter colors than social circles that are experiencing less traffic. In another example, the social circles 322a-322e may automatically display member icons or recently posted digital photos as their backgrounds.

In some implementations, the pattern, color or background image of the social circle can be automatically generated based on the type of social circle. For example, a personal social circle can include a first color (e.g., red), a shared private social circle can include a second color (e.g., green) and a shared public social circle can include a third color (e.g., blue). In this manner, the user is provided with a graphical distinction between types of social circles to enable quick recognition of the types of social circles.

In some implementations, a type of the social circle can be changed after creation and/or use of the social circle. For example, a personal social circle can be changed to a shared private social circle or a shared public social circle. As another example, a shared private social circle can be changed to a personal social circle or a shared public social circle. As another example, a shared public social circle can be changed to a personal social circle or a shared private social circle. In some implementations, a graphical representation of a social circle can include an interface that enables the user to change the type of the social circle. As one example, the interface can include tick boxes that can be selected, or checked, to define the type of the social circle. As another example, the interface can include a drop-down menu that lists types of social circles.

With continued reference to FIGS. 3A-3H, a suggestions option 360 can be provided and can include a contacts suggestions menu item 362 and/or a social circles suggestions menu item 364 among other possible menu items. The contact suggestions menu item 362 can be selected by the user. In response, a list of potential contacts for inclusion in the user's social network established within the social networking service can be provided. In some examples, the potential contacts can include contacts associated with the user through an email service (e.g., contacts that the user emails outside of the social networking service). In some examples, the potential contacts can include contacts that the user is a contact of or follows in other social networking services. The social circles suggestions menu item 364 can be selected by the user. In response, a list of suggested social circles and/or graphical representations of suggested social circles can be provided.

Figure 4A:
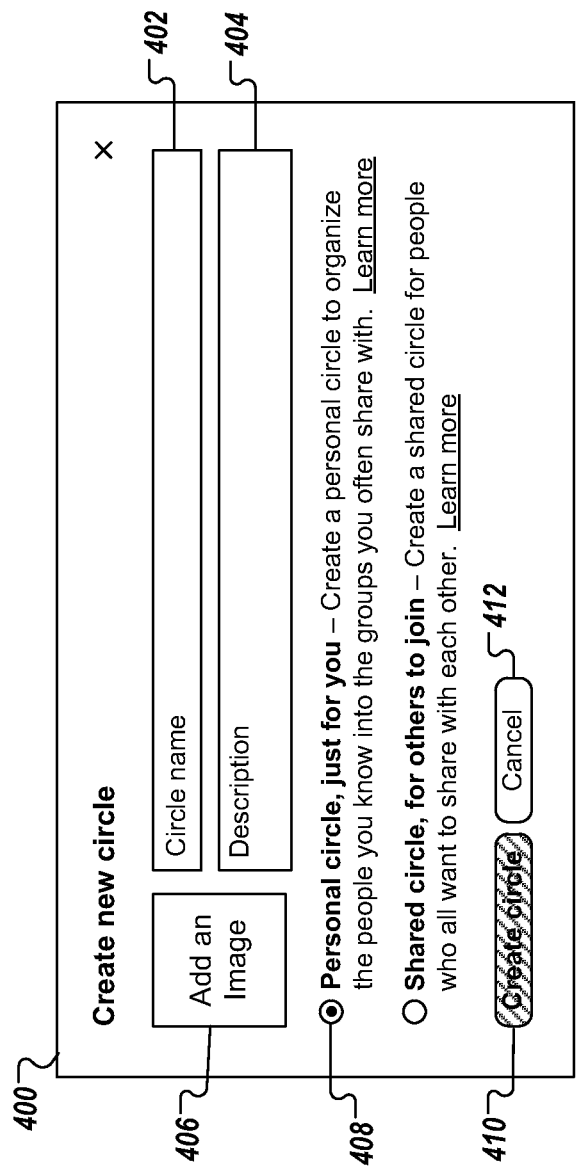
FIG. 4A depicts a screen-shot of an example dialog box for creating a personal social circle.

FIG. 4A depicts a screen-shot of an example dialog box 400 for creating a personal social circle. In some implementations, the dialog box 400 may be presented in response to the user dragging one or more contacts onto the new circle region 350, or clicks the "new circle" selector 351 of FIG. 3C. The dialog box 400 includes a name input box 402 and a description input box 404, wherein the user can enter a name and description, respectively, for the new social circle. An icon selector 406, when activated, provides the user with an interface to select an image to represent the social circle.

A selector 408 is provided for the user to select to indicate that the user wishes the new circle to be created as a personal circle. In general, a personal circle is used by and known only to the user, and may be used to categorize the user's contacts without the contacts necessarily knowing which personal circles they have been placed in. A "create circle" button 410, when activated, causes a new social circle to be created according to the information and selections chosen by the user. A cancel button 412, when activated, cancels the creation of a new social circle.

Figure 4B:
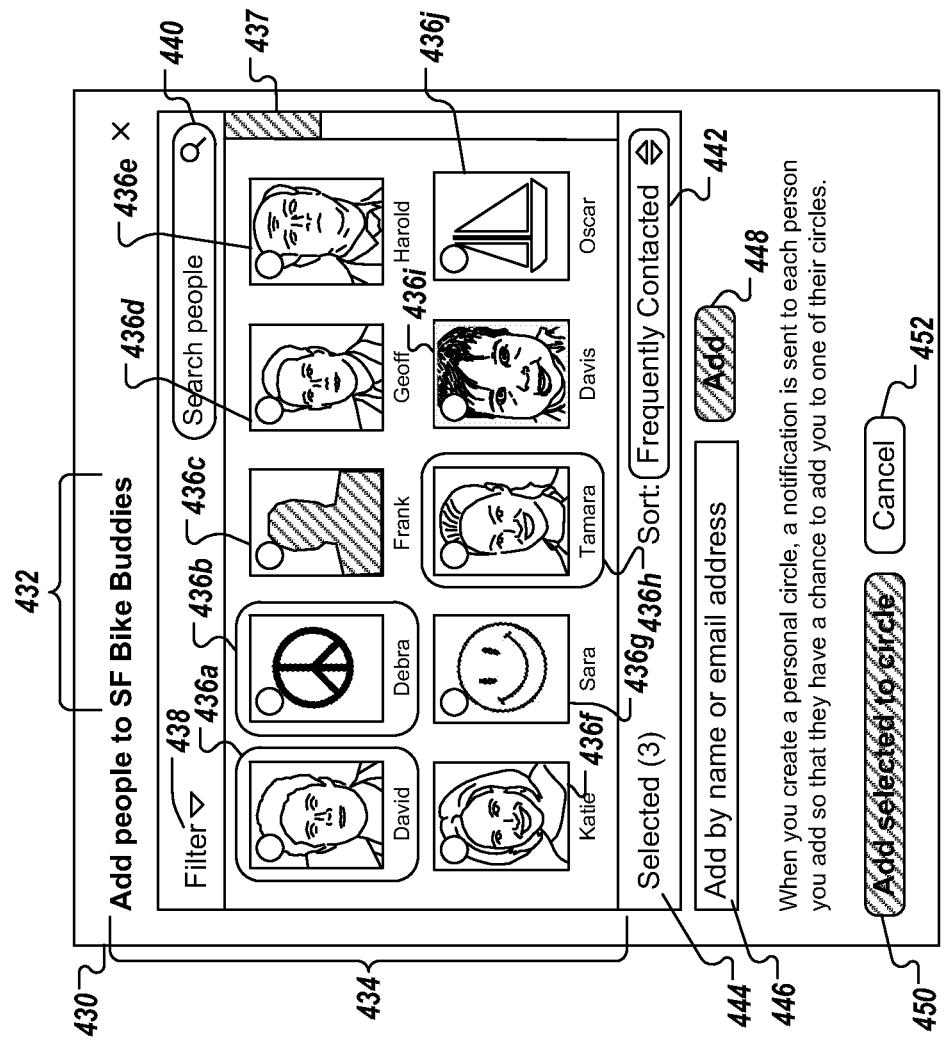
FIG. 4B depicts a screen-shot of an example dialog box for adding contacts to a personal social circle.

FIG. 4B depicts a screen-shot of an example dialog box 430 for adding contacts to a personal social circle. In some implementations, the dialog box 430 may be presented when the button 412 of FIG. 4A is clicked. The dialog box 430 displays a banner 432. In some implementations, the banner 432 may include the name of the new social circle as provided by the user in the name input box 402.

The dialog box 430 includes a contact selector 434 which displays a collection of contact icons 436a-436j. A scroll bar 437 is provided so the user is able to view additional contact icons that may not fit into the initial view. In the present example, the user has selected the contact icons 436a, 436b, and 436h. The contact selector 434 also includes a filter selector 438, a search input box 440, and a sorting selector 442. The filter selector 438, when selected, provides the user with options for filtering which of the user's contacts will appear as contact icons in the contact selector 434. For example, the user may wish to see only the contacts that do not currently belong to a social circle, or only the contacts that live in the same geographical region as the user. In some implementations, the search input box 440 is provided for the user to enter some or all of a contact's name, location, or other search term keyword that can be used to search a collection of contacts, and the contacts who best match the search term can appear in the contact selector 434. In some implementations, the sorting selector 442 may be substantially similar to the sorting selector 338 of FIG. 3A.

A count indicator 444 displays the number of contacts that are currently selected. In some implementations, the user can select contacts for inclusion in the new social circle by clicking on selected ones of the contact icons 436a-436j. In some implementations, one or more contacts may already be selected when the dialog 430 appears. Referring back to FIG. 3C, the user may have initiated the creation of a new social circle by dragging the selected contacts indicator 346 to the new circle region 350 or by clicking the "new circle" selector 351, and as such the dialog box 430 may appear with the contacts represented by the selected contacts indicator 436 already selected.

Referring again to FIG. 4B, the dialog box 430 also includes a contact input box 446. In some implementations, the user may use the contact input box 446 to type in information (e.g., name, email address, user ID) of a person who may not be a contact of the user. In response to activation of an add button 448, the information entered into the contact input box 446 to search for and select a person who is not currently a contact of the user to the newly created social circle. An "add to selected circle" button 450, when selected, adds the selected contacts to the newly created social circle. A cancel button 452 is provided to allow the user to cancel the addition of the selected contacts to the newly created social circle.

Figure 4C:
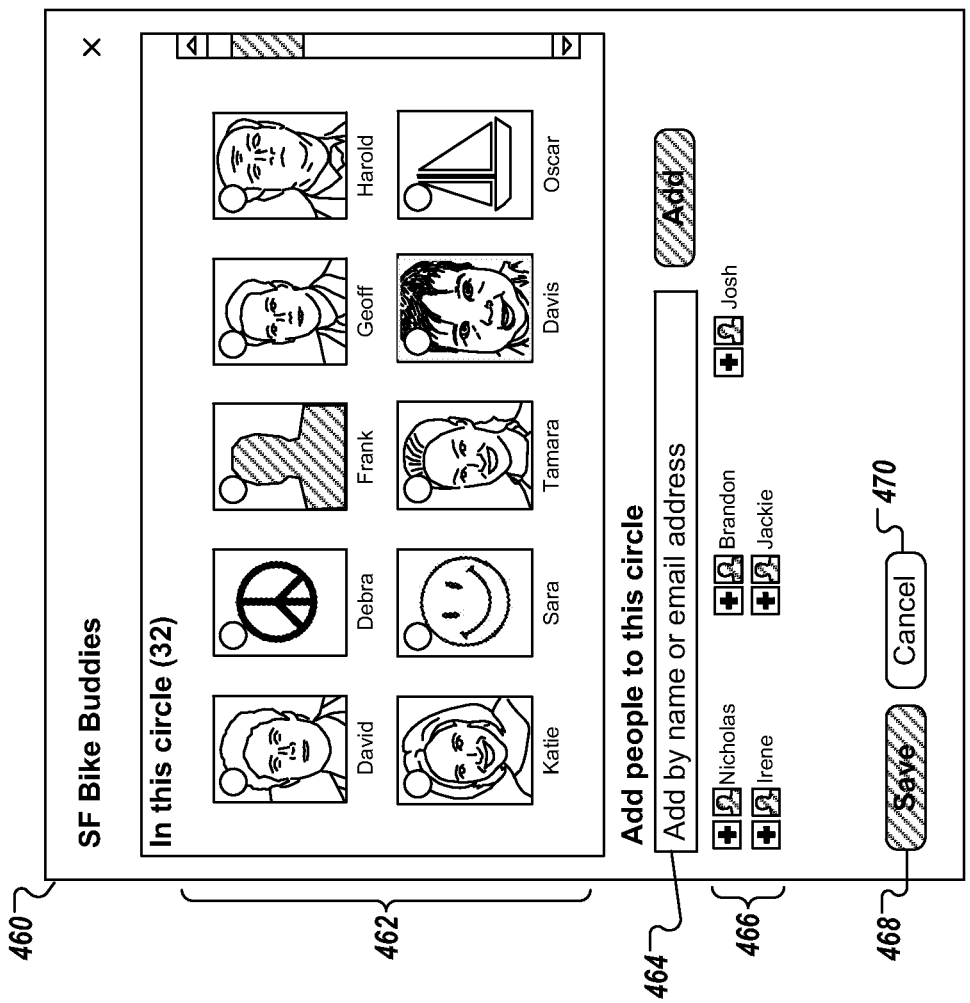
FIG. 4C depicts a screen-shot of an example dialog box for managing contacts in a personal social circle.

FIG. 4C depicts a screen-shot of an example view/edit dialog box 460 of an example social circle. In general, the view/edit dialog box 460 provides an interface that the user may interact with to view, add, remove, or otherwise alter the membership of the selected social circle. The view/edit dialog box 460 displays a collection of contact icons 462 that represent the contacts who are members of the selected social circle. A contact input box 464 is provided for the user to enter the names, email addresses, or other information that can be used to identify contacts for inclusion in the social circle.

The dialog box 460 includes a suggested contacts list 466. In some implementations, the suggested contacts list 466 may display contact icons representative of contacts who may be good candidates for inclusion in the selected social circle. For example, if the selected social circle includes a large number of contacts who are also in the user's "coworkers" circle, then additional members of the "coworkers" circle may be suggested for inclusion in the selected social circle as well. In some implementations, the user may click on items in the suggested contacts list 466 to add those contacts to the selected social circle. A save button 468, when selected, saves the current selection of contacts as members of the selected social circle. A cancel button 470, when selected, aborts the any changes made by the user in the dialog box 460.

Figure 4D:
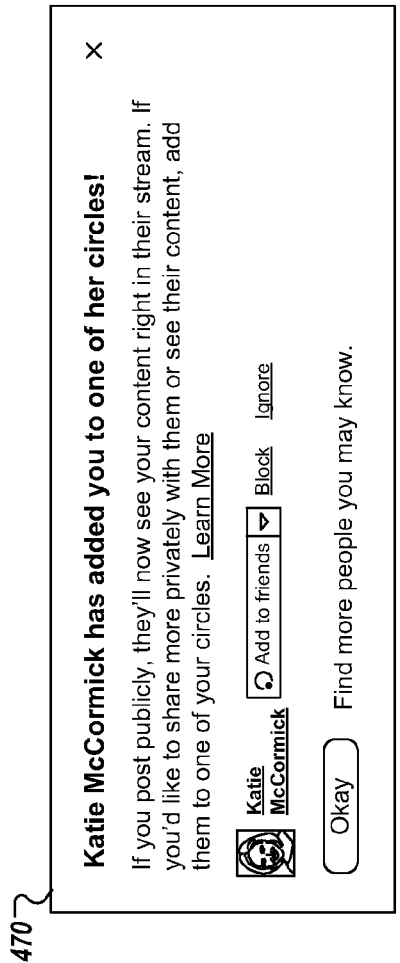
FIGS. 4D and 4E depict example screen-shots of respective alerts for notifying a user that they have been added to a social circle.
Figure 4E:
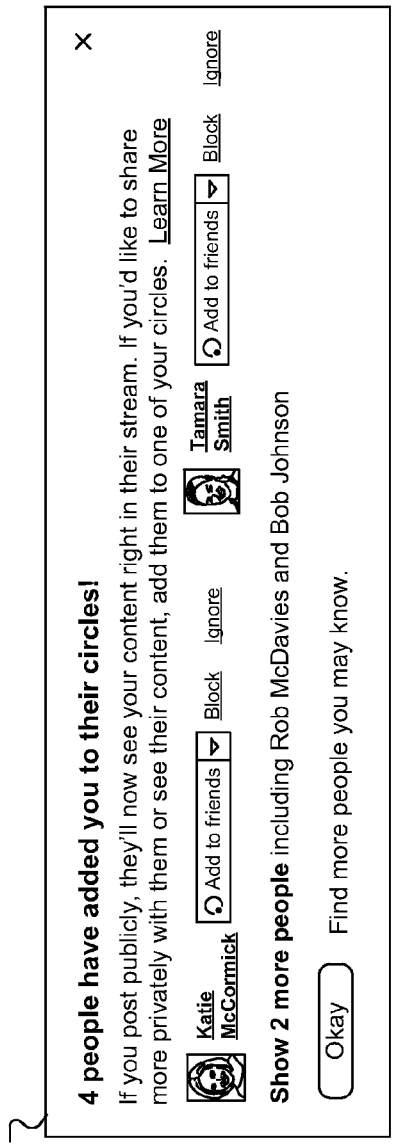

Referring now to FIGS. 4D and 4E, a user that is added to a personal social circle of one or more other users may be notified. In this manner, an asymmetrical relationship between users may be promoted, and users that may be unaware of social circles and their function in the social networking service may be informed. With particular reference to FIG. 4D, an example dialog box 470 is provided with an indication 472 that a particular user (e.g., Katie McCormick) has added the user to a social circle. A brief description 474 of the effect of being a member of another user's social circle is provided. Detailed information 476 is included to provide more detailed information on the particular user (e.g., Katie McCormick) that has added the user to a social circle. Within the detailed information 476, the user is presented with options to add the particular user (e.g., Katie McCormick) to their contacts, block the particular user and/or ignore the particular user.

With particular reference to FIG. 4E, an example dialog box 480 is provided with an indication 482 that a plurality of particular users (e.g., Katie McCormick, Tamara Smith, Rob McDavies and Bob Johnson) have added the user to respective social circles. A brief description 484 of the effect of being a member of another user's social circle is provided. Detailed information 486 is included to provide more detailed information on the particular users (e.g., Katie McCormick and Tamara Smith) that has added the user to a social circle. An information line 488 is also provided enabling the user to expand the detailed information 486 to include detailed information on other particular users that have added the user to respective social circles.

Figure 5A:
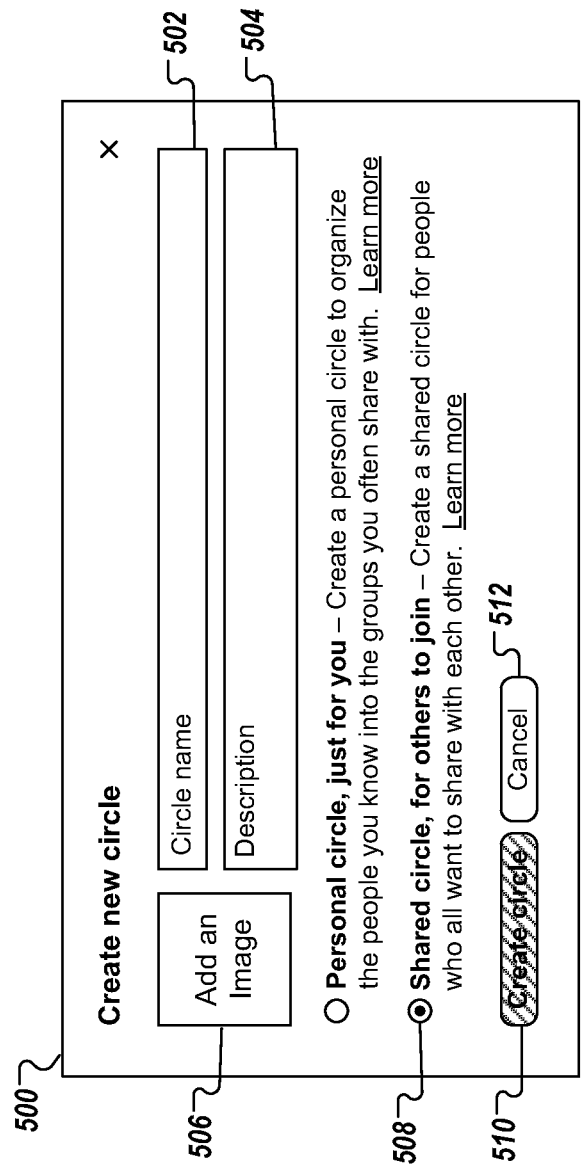
FIG. 5A depicts a screen-shot of an example dialog box for creating a shared social circle.

FIG. 5A depicts a screen-shot of an example dialog box 500 for creating a shared private social circle. In some implementations, the dialog box 500 may be presented when the user drags one or more contacts onto the new circle region 350, or clicks the "new circle" selector 351 of FIG. 3C. The dialog box 500 includes a name input box 502 and a description input box 504, wherein the user can enter a name and description, respectively, for the new social circle. An icon selector 506, when activated, provides the user with an interface to select an image to represent the social circle. In some implementations, the dialog box 500 can be the dialog box 400 of FIG. 4.

A selector 508 is provided for the user to select to indicate that the user wishes the new circle to be created as a shared private circle. In general, a shared private circle is created by the user, who then invites contacts to join the circle. As such, the contacts will know which shared private circles they have been opted to join. A "create circle" button 510, when activated, causes a new social circle to be created according to the information and selections chosen by the user. A cancel button 512, when activated, cancels the creation of a new social circle.

Figure 5B:
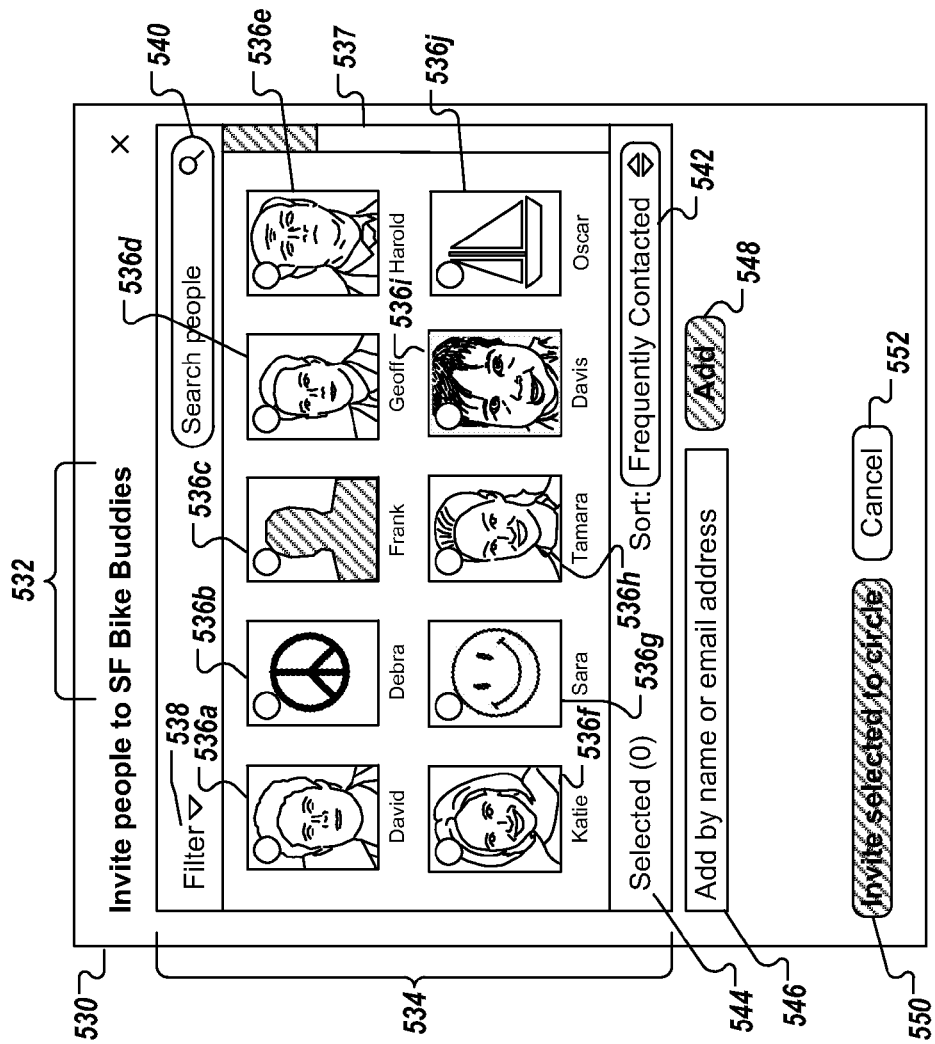
FIG. 5B depicts a screen-shot of an example dialog box for adding contacts to a shared social circle.

FIG. 5B depicts a screen-shot of an example dialog box 530 for adding contacts to a shared private social circle. In some implementations, the dialog box 530 may be presented when the button 512 of FIG. 5A is clicked. The dialog box 530 displays a banner 532. In some implementations, the banner 532 may include the name of the new social circle as provided by the user in the name input box 502.

The dialog box 530 includes a contact selector 534 which displays a collection of contact icons 536a-536j. A scroll bar 537 is provided so the user is able to view additional contact icons that may not fit into the initial view. The contact selector 534 also includes a filter selector 538, a search input box 540, and a sorting selector 542. The filter selector 538, when selected, provides the user with options for filtering which of the user's contacts will appear as contact icons in the contact selector 534. For example, the user may wish to see only the contacts that are already in a social circle. In some implementations, the search input box 540 is provided for the user to enter some or all of a contact's name, location, or other search term keyword that can be used to search a collection of contacts, and the contacts who best match the search term can appear in the contact selector 534. In some implementations, the sorting selector 542 may be substantially similar to the sorting selector 338 of FIG. 3A.

A count indicator 544 displays the number of contacts that are currently selected. In some implementations, the user can select contacts for inclusion in the new social circle by clicking on selected ones of the contact icons 536a-536j. In some implementations, one or more contacts may already be selected when the dialog 530 appears. Referring back to FIG. 3C, the user may have initiated the creation of a new social circle by dragging the selected contacts indicator 346 to the new circle region 350 or by clicking the "new circle" selector 351, and as such the dialog box 530 may appear with the contacts represented by the selected contacts indicator 536 already selected.

Referring again to FIG. 5B, the dialog box 530 also includes a contact input box 546. In some implementations, the user may use the contact input box 546 to type in information (e.g., name, email address, user ID) of a person who may not be a contact of the user. In response to activation of an add button 548, the information entered into the contact input box 546 to search for and select a person who is not currently a contact of the user to the newly created social circle. An "add to selected circle" button 550, when selected, adds the selected contacts to the newly created social circle. A cancel button 552 is provided to allow the user to cancel the addition of the selected contacts to the newly created social circle.

Figure 5C:
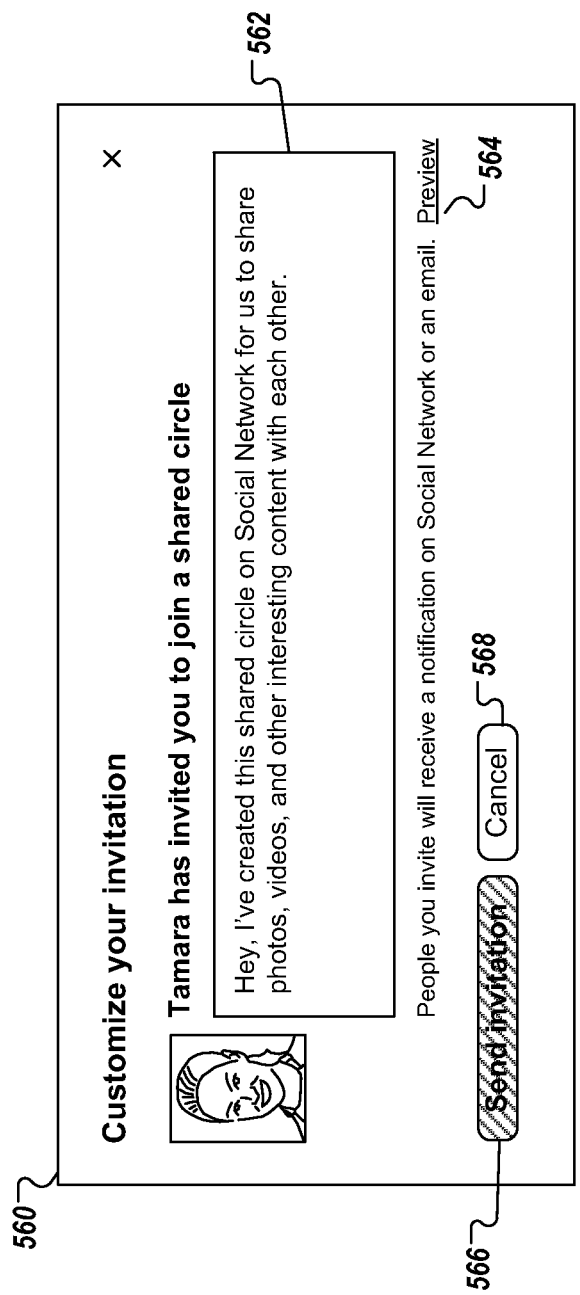
FIG. 5C depicts a screen-shot of an example dialog box for customizing an invitation to a shared social circle.

FIG. 5C depicts a screen-shot of an example invitation customization dialog box 560 of an example social circle. In general, the dialog box 560 provides the user with an interface for customizing the invitation that is sent to contacts that are being invited to join a shared private social circle.

The dialog box includes a text box 562, in which an invitation message is entered. In some implementations, the text box 562 may be pre-populated with a default message that the user may then modify if need be. A preview link 564, when selected, causes a preview of the invitation message to be shown as it would appear to an invited contact. A send button 566, when selected, causes the invitation or invitations to be sent to the selected contacts. A cancel button 568, when selected, aborts the invitation process.

Figure 5D:
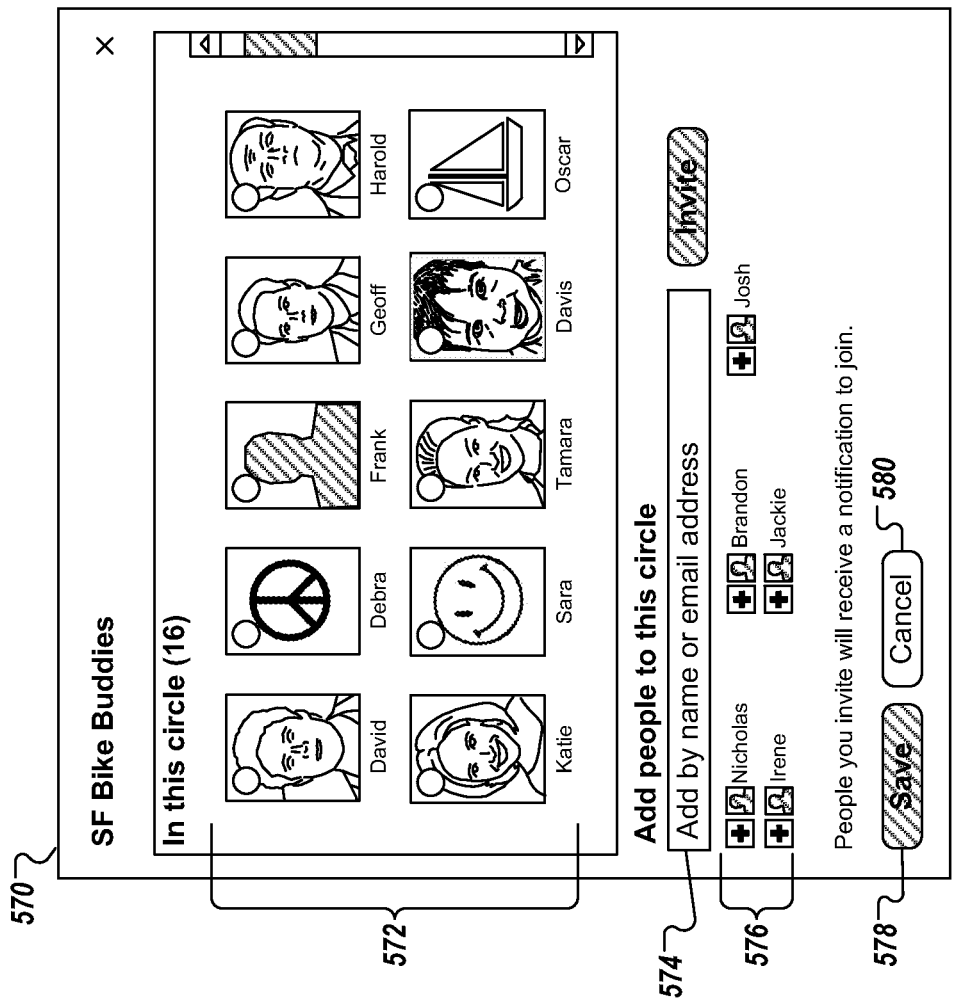
FIG. 5D depicts a screen-shot of an example dialog box for managing contacts in a shared social circle.

FIG. 5D depicts a screen-shot of an example dialog box 570 for managing contacts in a shared social circle. In general, the view/edit dialog box 570 provides an interface that the user may interact with to view, add, remove, or otherwise alter the membership of the selected social circle. In some implementations, the view/edit dialog box 570 may be substantially similar in appearance and function to the view/edit dialog box 460 of FIG. 4C. The view/edit dialog box 570 displays a collection of contact icons 572 that represent the contacts who are members of the selected social circle. A contact input box 574 is provided for the user to enter the names, email addresses, or other information that can be used to identify contacts for inclusion in the social circle.

The dialog box 570 includes a suggested contacts list 576. In some implementations, the suggested contacts list 576 may display contact icons representative of contacts who may be good candidates for inclusion in the selected social circle. For example, if the selected social circle includes a large number of contacts who are also in the user's "coworkers" circle, then additional members of the "coworkers" circle may be suggested for inclusion in the selected social circle as well. In some implementations, the user may click on items in the suggested contacts list 576 to add those contacts to the selected social circle. A save button 578, when selected, saves the current selection of contacts as members of the selected social circle. A cancel button 580, when selected, aborts the any changes made by the user in the dialog box 570.

Figure 6A:
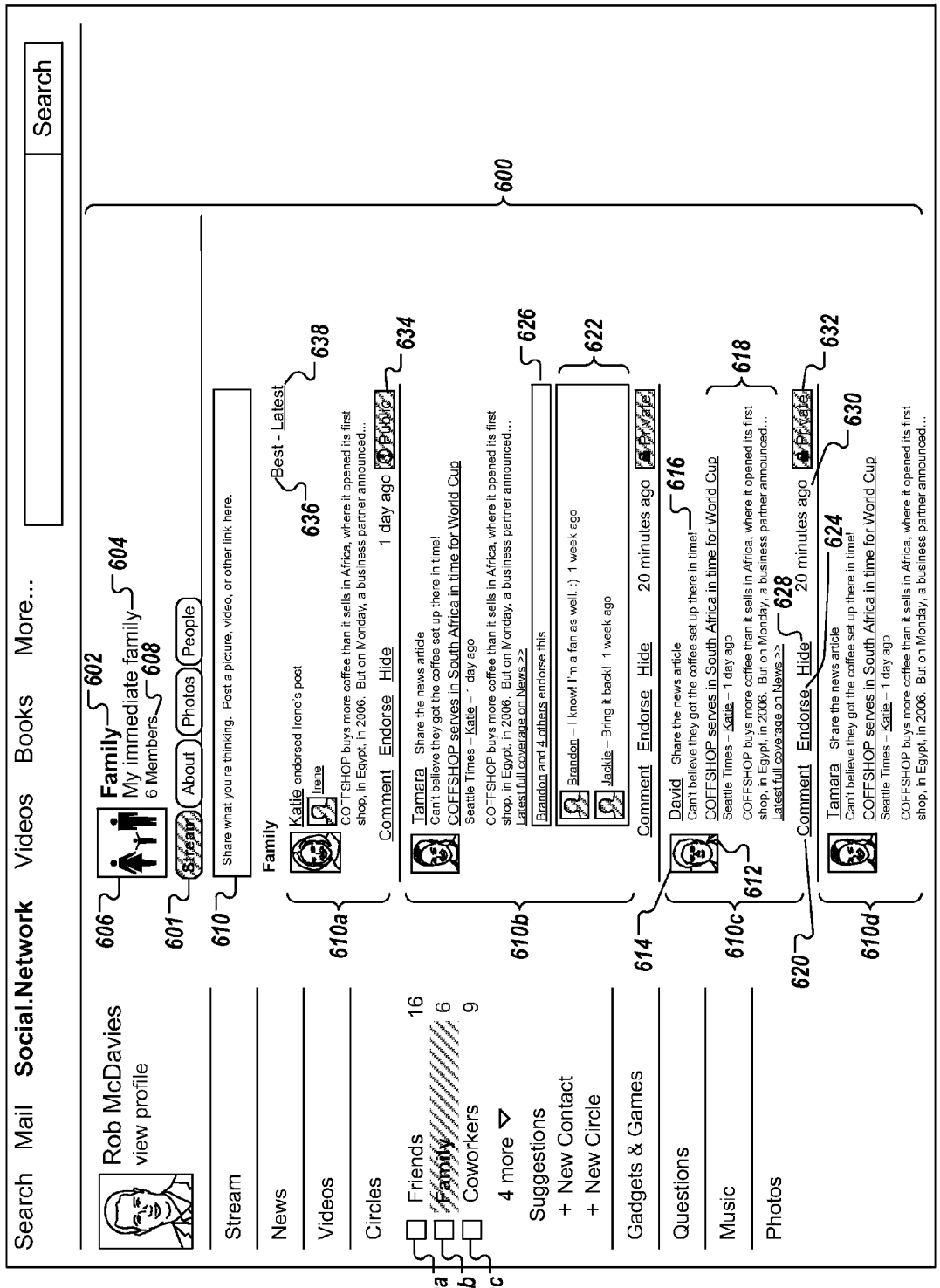
FIG. 6A depicts a screen-shot of an example stream page for a personal social circle.

FIG. 6A depicts a screen-shot of an example stream page 600 for a personal social circle. In general, the stream page 600 is displayed when the user selects one of the circle selectors 349a-349c and a stream tab 601 to show updates, comments, and other information that members of the selected social circle have posted. In the present example, the user has selected the "family" circle selector 349b.

The stream page 600 includes a name block 602 that displays the name of the selected social circle, a description block 604 that displays a description of the selected social circle, an image 606 associated with the selected social circle, and a count indicator 608 that displays the total number of members of the selected social circle. An input box 610 is provided in which the user can enter information that will appear to other members of the selected social circle as an update (e.g., a post) when the other members view their social networking streams. Note that in the present example, the "family" social circle is a personal circle known only to the user. In some implementations, posts made to a personal circle may be visible only to contacts that the user has included in the personal social circle (e.g., the contacts do not necessarily know that they have been targeted to receive a particular update).

The stream page 600 includes a number of posts 610a-610d. The posts 610a-610d include only the posts submitted by members of the selected social circle. The post 610c includes a contact icon 612 and a name banner 614 to display information about the person who made the post 610c. The post also includes a comment box 616 to display the contact's comments. In the example of the post 610c, the contact has commented on a web page, and a link section 618 is included to display at least a portion of the referenced web page. Readers of the post 610c can comment on the post 610c by selecting a comment link 620. In some implementations, clicking on the comment button can cause a comment box to be displayed, into which the user can enter comments or other information that will be displayed to other members of the social circle as a comment or reply to the post 610c. An example comment display 622 is shown that includes comments in response to the post 610b.

The post 610c also includes a "endorse" link 624, when selected, provides the user with a simple way to show an endorsement of, approval or agreement with a contact's comment or post. The user's "endorse" status is then visible to other members of the selected social circle. An example "endorse" display 626 is shown that includes a summary of the number of contacts to have shown approval of the post 610b.

A hide link 628, when selected, hides the associated post 610c and any comments, "endorses," or other information associated with the post 610c. For example, the post 610c may include content that the user finds useless or offensive, and the user can choose to hide the post 610c to avoid seeing such information. In some implementations, the user may be given various options for hiding information associated with the post 610c. For example, the user can be given options for hiding only the post 610c, or to hide all posts generated by a particular service on the posters behalf (e.g., awards or help requests generated by games), or to hide all posts from the contact who created the post 610c. An age indicator 630 displays how much time has elapsed since the post 610c was created.

A privacy indicator 632 is provided to display an indication of the visibility of the post 610c. In the illustrated example, the privacy indicator 632 indicates that the post 610c was posted to a shared private circle. A privacy indicator 634 indicates that the post 610a was posted publicly (e.g., not necessarily posted to any particular social circle). In some implementations, privacy indicators can also indicate that a post was made to a shared public circle (not shown).

The posts 610a-610d are sorted according to the user's selection of either a "best" sort selector 636 or a "latest" sort selector 638. In some implementations, selecting the "latest" sort selector 638 can cause the posts 610a-610d to be sorted by age (e.g., according to the ages indicated by the age indicator 630) or by the age of the most recent comment to a post (e.g., actively discussed posts will remain near the head of the list). In some implementations, selecting the "best" sort selector 636 can cause the posts 610a-610d to be sorted according to their quality, relevance, or other criteria. For example, posts can be ranked according to how often the user communicates with the poster, the number of "endorses" a post has received, how often an item linked to in the post is viewed, how closely the post aligns with topics of interest to the user, and combinations of these and/or other criteria that can be used to rank the quality of a post.

Figure 6B:
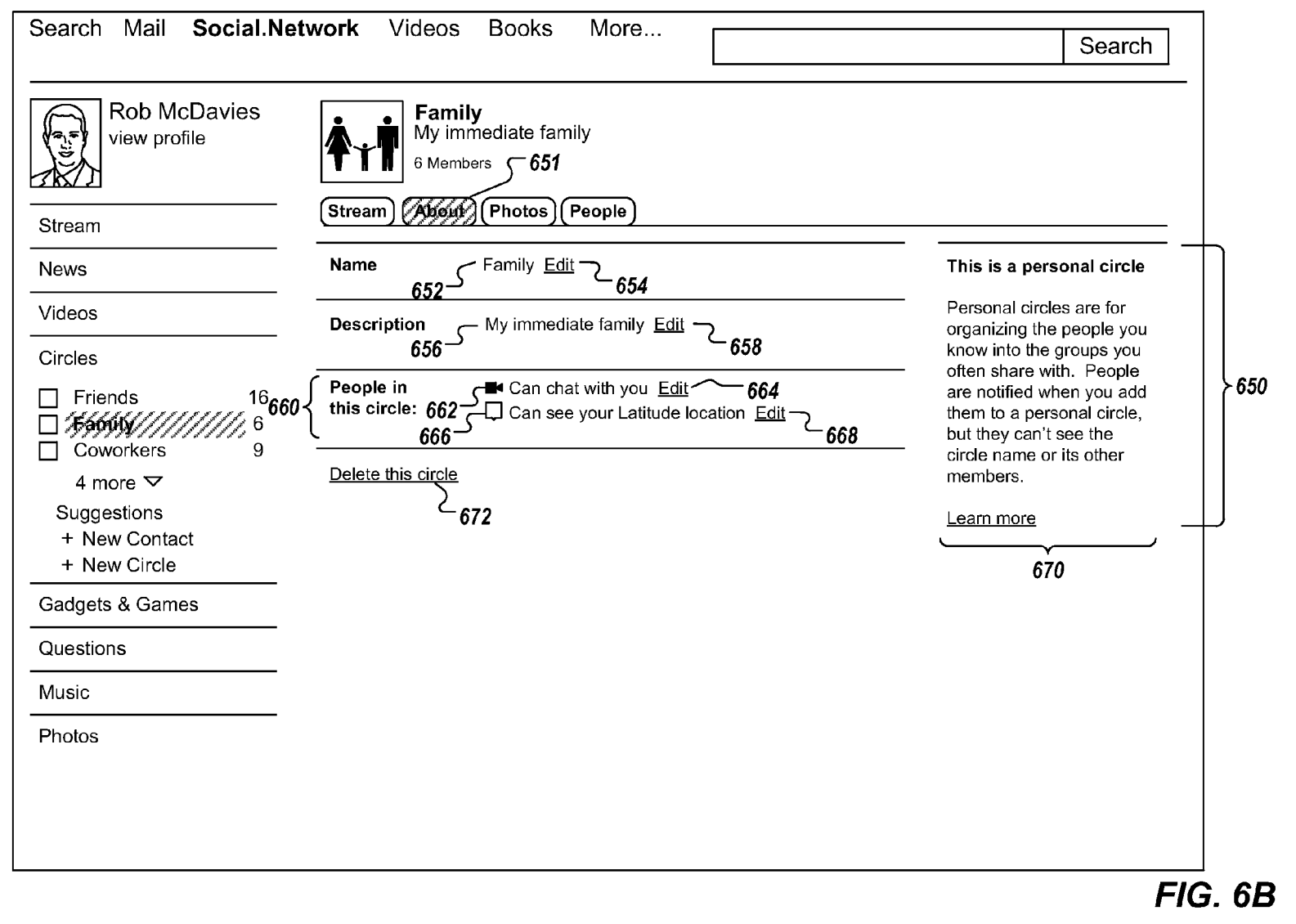

FIG. 6B depicts a screen-shot of an example about page 650 for a personal social circle. In general, the about page 650 is displayed when the "about" tab 651 is selected, and displays information about the selected social circle. A name banner 652 displays the name of the selected social circle, and selection of an edit link 654 displays an interface that the user can manipulate to edit the circle's name. A description banner 656 displays a description of the selected social circle, and selection of an edit link 658 displays an interface that the user can manipulate to edit the circle's description.

An interactivity options region 660 displays indications of the various ways in which members of the selected social circle can interact with the user. The interactivity options region 660 includes a chat indicator 662 to indicate that members of the selected circle can communicate with the user through a chat application (e.g., instant messenger client). An edit link 664 is provided that, when selected, provides the user with choices related to the availability of chat as a tool that members can use to contact the user. The interactivity options region 660 also includes a location visibility indicator 646 to indicate that members of the selected circle can determine the user's geographical location through a location sharing application (e.g., Google Latitude). An edit link 668 is provided that, when selected, provides the user with choices related how members of the selected circle can see the user's location (e.g., exact location, set location, city level location, no location).

The about page 650 includes a description region 670 that displays a general description of the type of social circle (e.g., personal, shared private, shared public) that the selected social circle is. A delete link 672, when selected, causes the selected social circle to be deleted.

Figure 6C:
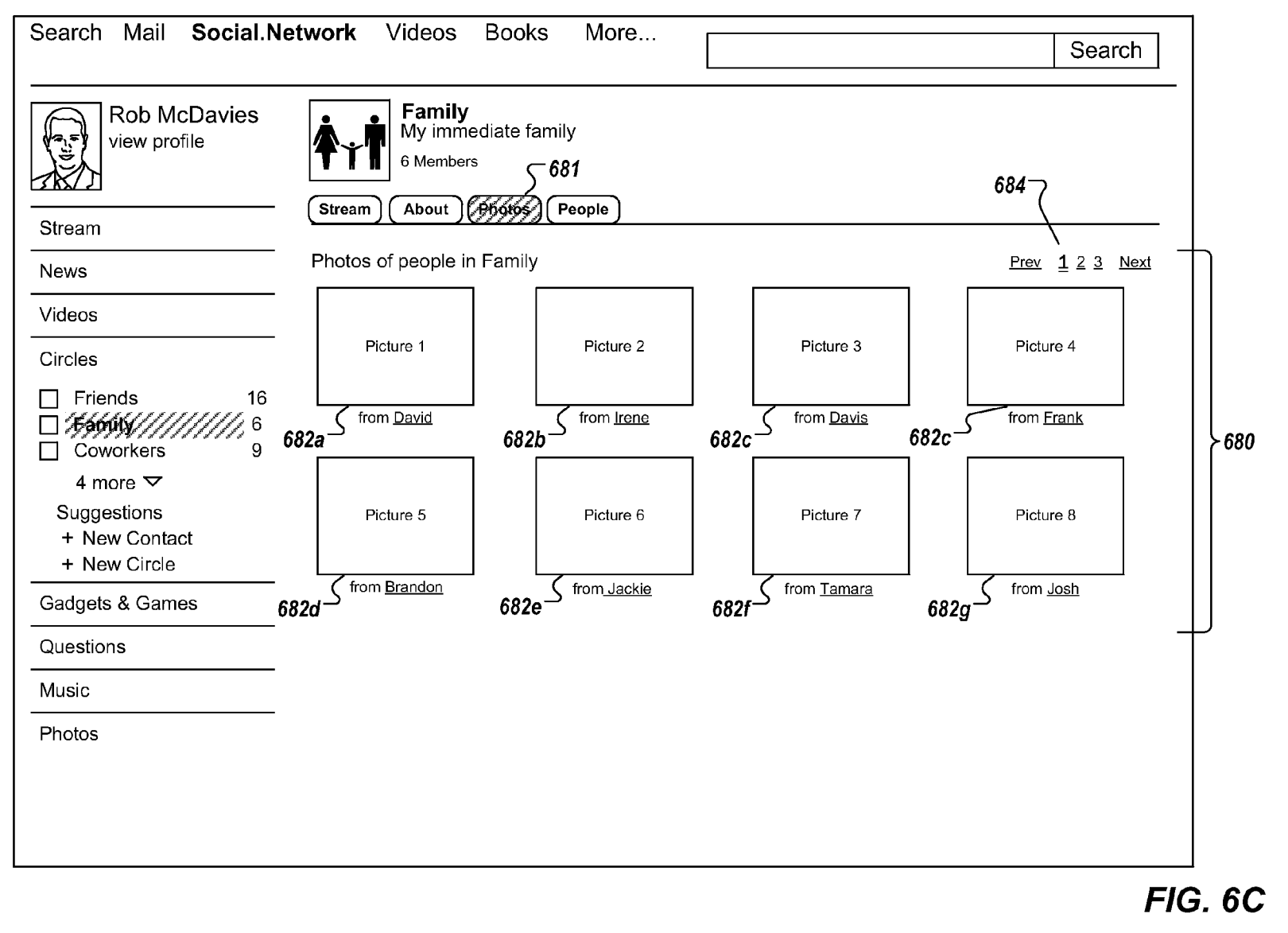

FIG. 6C depicts a screen-shot of an example photos page 680 for a personal social circle. The photos page 680 is shown when a photos tab 681 is selected by the user, and displays a collection of photos 682a-682g. Additional photos (not shown) are brought into view by selecting various portions of a navigation control 684. In some implementations, the photos 682a-682g can include photos posted by members of the selected social circle. In some implementations, the photos 682a-682g can include photos of members of the selected social circle.

Figure 6D:
FIG. 6D depicts a screen-shot of an example people page for a personal social circle.

FIG. 6D depicts a screen-shot of an example people page 690 for a personal social circle. The people page 690 is shown when a people tab 691 is selected by the user. In some implementations, the people page 690 includes a collection of controls and indicators that are substantially similar to those included in the view/edit dialog box 460 of FIG. 4C.

Figure 7A:
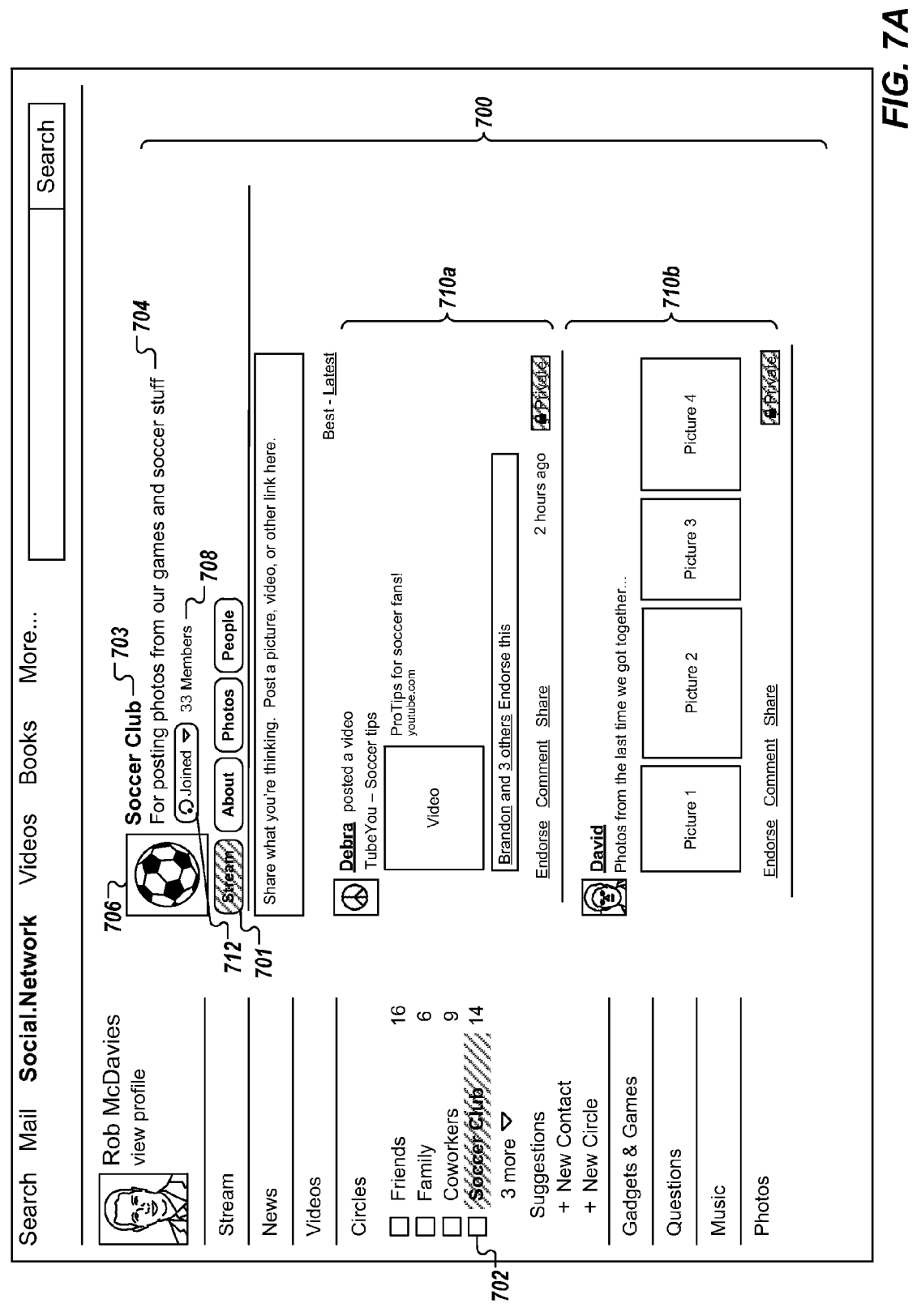

FIG. 7A depicts a screen-shot of an example stream page 700 for a private shared social circle. In general, the stream page 700 is displayed when the user selects one of the circle selectors and a stream tab 701 to show updates, comments, and other information that members of the selected social circle have posted. In the present example, the user has selected the "Soccer Club" circle selector 702.

The stream page 700, much like the stream page 600, includes a name block 703, a description block 704, an image 706, and a count indicator. An input box 710 is provided in which the user can enter information that will appear to other members of the selected social circle as an update (e.g., a post) when the other members view their social networking streams. The stream page 700 includes a number of posts 710a, 710b. The posts 710a, 710b include only the posts submitted by members of the selected social circle. The stream page also includes a membership status indicator 712. In some implementations, the status indicator 712 can indicate the user's membership status in the selected social circle (e.g., joined, invited, owner).

Note that in the present example, the "soccer club" social circle is a shared private circle wherein a user creates the circle and then invites other contacts to become members. In some implementations, posts made to a shared private circle may be visible only to contacts that have agreed to join the shared private social circle (e.g., the contacts will know that they will likely receive targeted updates).

Figure 7B:
FIG. 7B depicts a screen-shot of an example about page for a shared social circle.

FIG. 7B depicts a screen-shot of an example about page 750 for a shared private social circle. In some implementations, the about page 750 is substantially similar in appearance and function to the about page 650 of FIG. 6B. In general, the about page 750 is displayed when the "about" tab 751 is selected, and displays information about the selected social circle. A name banner 752 displays the name of the selected social circle, and selection of an edit link 754 displays an interface that the user can manipulate to edit the circle's name. A description banner 756 displays a description of the selected social circle, and selection of an edit link 758 displays an interface that the user can manipulate to edit the circle's description. An interactivity options region 760 displays indications of the various ways in which members of the selected social circle can interact with the user.

The about page 750 includes a description region 770 that displays a general description of the type of social circle (e.g., personal, shared private, shared public) that the selected social circle is. A delete link 772, when selected, causes the selected social circle to be deleted. A tab 781, when selected, shows a photos page that is substantially similar in appearance and function to the photos page 680 of FIG. 6C, and an about tab 791, when selected, shows an about page that is substantially similar in appearance and function to the about page 690 of FIG. 6D.

Figure 8:
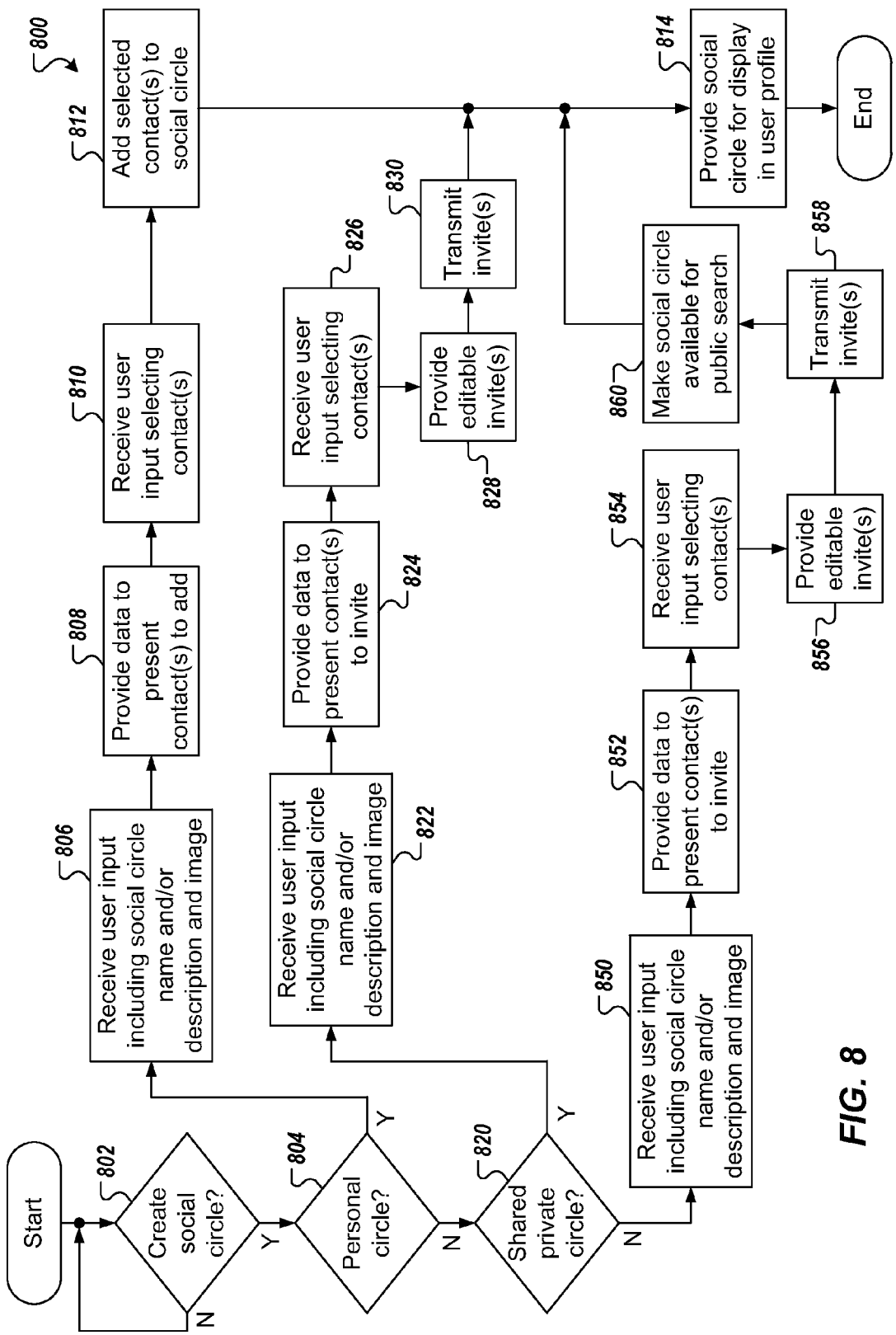
FIG. 8 is a flowchart illustrating an example process for creating a social circle using a social networking service.

FIG. 8 is a flowchart illustrating an example process 800 for creating a social circle using a social networking service. At step 802 a determination is made whether a social circle is to be created. For example, the user can indicate an initiate the creation of a social circle by dragging the selected contacts indicator 346 to the new circle region 350 or by clicking the new circle selector 351 of FIG. 3C. If, at step 802, it is determined that no circle is to be created, then the process 800 loops until such time that is circle is to be created.

At step 804, a determination is made whether the new social circle is to be a personal circle. For example, the user may click the selector 408 of FIG. 4A to indicate that a new circle is to be a personal social circle. If so, then at step 806 user input is received that includes the social circle's name and/or description and image. For example, the user may provide this information by entering it into the dialog box 400.

At step 808, data is provided to present one or more contacts to add to the new circle. For example, the dialog box 430 of FIG. 4B presents contacts that can be added to the circle. At step 810, user input is received for selecting one or more contacts that are to be added to the personal social circle. In the example of the dialog box 430 of FIG. 4B, the user has selected the contact icons 436a, 436b, and 436h.

At step 812, the selected contact(s) are added to the new circle, and at step 814 the social circle is provided for display in the user profile. For example, the new circle can appear in the social circles display 320 of FIG. 3A.

If, however, at step 804 a determination is made that the new social circle is not to be a personal circle, the process continues at step 820. At step 820, a determination is made whether the new social circle is to be a shared private circle. For example, the user may click the selector 508 of FIG. 5A to indicate that a new circle is to be a shared private social circle. If so, user input is received at step 822, the user input including the social circle's name and/or description and image. For example, the user may provide this information by entering it into the dialog box 500.

At step 824, data is provided to present people profiles to add to the new circle. For example, the dialog box 530 of FIG. 5B presents contacts who can be added to the circle. At step 826, user input is received for selecting one or more contacts that are to be added to the circle.

At step 828, editable invitations are provided to the user. For example, the invitation that is shown in the invitation customization dialog box 560 of FIG. 5C shows the user a prototype invitation to the new social circle. The user is able to accept the default invitation, or may edit it. At step 830, the invitations are transmitted to the contacts selected in step 826. For example, the invitations may be sent in response to the user clicking the send button 566.

If, however, at step 820 a determination is made that the new social circle is not to be a shared private circle (e.g., the new circle is to be a shared public circle), it is presumed that the new social circle will be a shared public circle and the process continues at step 850. At step 850, user input is received that includes the social circle's name and/or description and image.

At step 852, data is provided to present people profiles to add to the new circle. At step 854, user input is received for selecting one or more contacts that are to be added to the circle. At step 856, editable invitations are provided to the user. At step 858, the invitations are transmitted to the contacts selected in step 854.

At step 860, the new social circle is made available for public search. For example, a sports team can create a shared public circle as a social network in which their fans may associate. Once the social circle has been created, it can be made available for public search, and as such, additional fans may search for and discover the circle. The fans may then choose to join or request to join the circle. As members of the shared public circle, the fans may then associate with each other based on their shared interest in the sports team and possibly befriend each other thus expanding each fan's overall social network.

Figure 9:
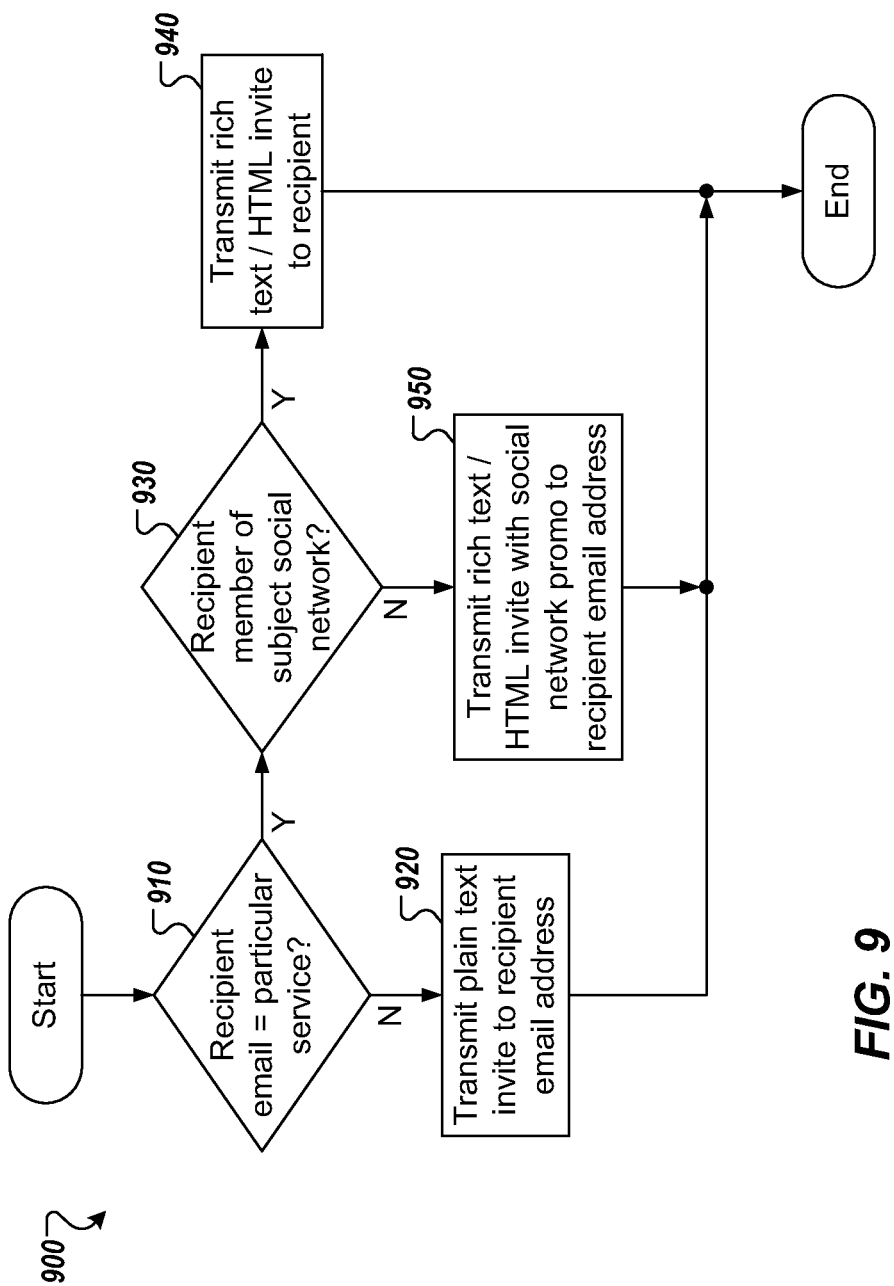
FIG. 9 is flowchart illustrating an example process for preparing and transmitting an invitation to a social circle.

FIG. 9 is flowchart illustrating an example process 900 for preparing and transmitting an invitation to a social circle. In some implementations, the process 900 may be performed when the user clicks the send button 566 of FIG. 5C.

At step 910 a determination is made as to whether the recipient's email address is associated with a particular email service. For example, the recipient may be a member of the social circle networking system, or the recipient may not be a member but is associated with an email address that is known to be capable of accepting rich (e.g., HTML layout) emails, or the recipient may be associated with an unknown email service or one that is known to be better served by plain text emails.

If at step 910, it is determined that the recipient is not associated with a particular service, a plain text email invitation is transmitted to the recipient's email address at step 920. In some implementations, since the recipient's email address is not associated with a known (e.g., particular) email service, no assumption may be made as to whether the service can process and/or present any emails other than plain text emails. For example, to better ensure that the recipient can actually read the message through his service, a plain text invitation is sent.

If, however, at step 910, it is determined that the recipient's email address is associated with a particular service, it is determined whether the recipient is a member of the subject social network at step 930. If the recipient is a member of the subject social networking service, a rich text (e.g., HTML formatted) invitation is transmitted to the recipient at step 940.

If, however, at step 930 it is determined that the recipient is not a member of the subject social networking service, a rich text (e.g., HTML formatted) invitation that includes promotional material regarding the subject social network is transmitted to the recipient at step 950. For example, in the case of step 950, the recipient may be encouraged to accept the invitation and join the social networking service by being given additional information about the social networking service itself.

Figure 10:
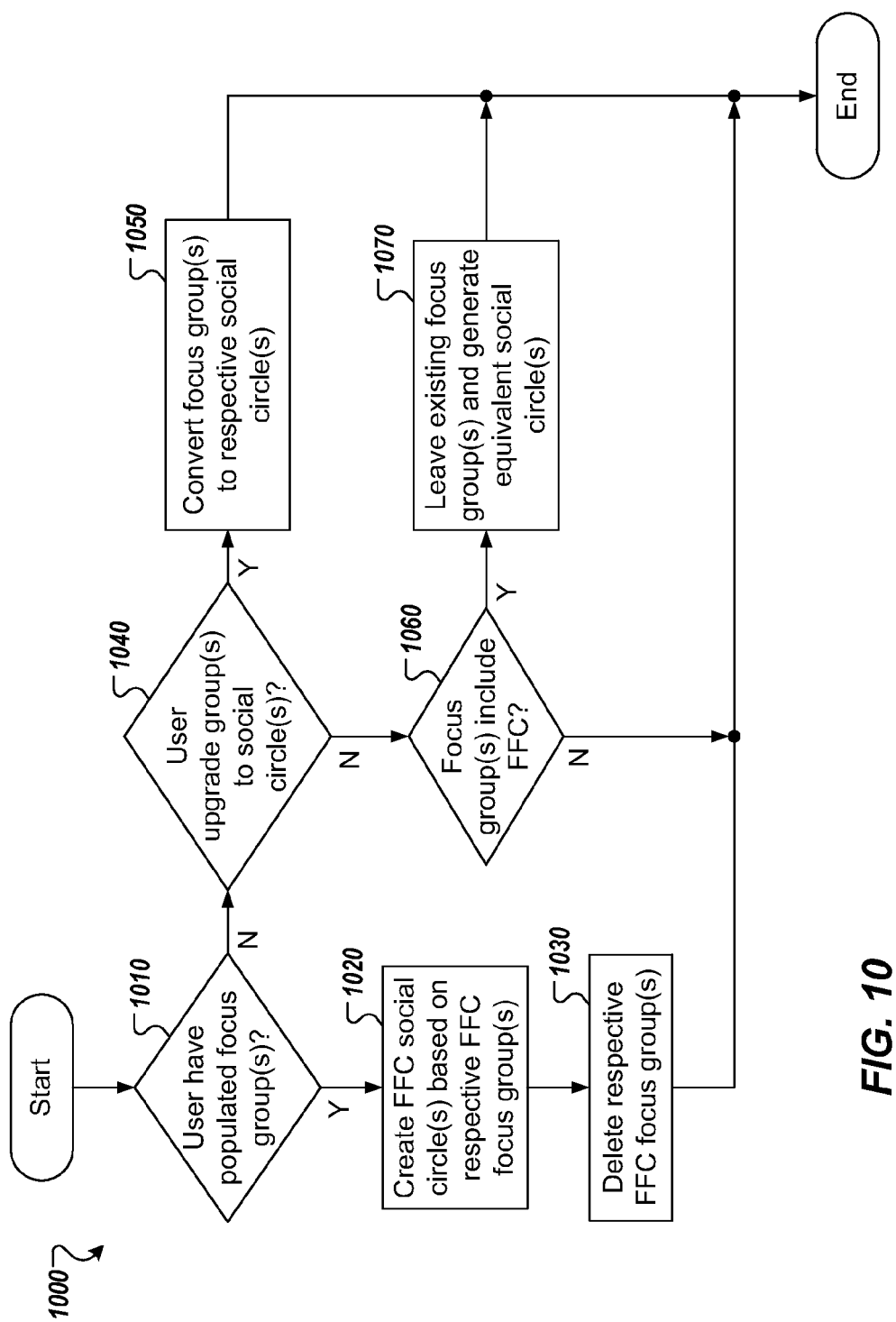
FIG. 10 is a flowchart illustrating an example process for generating a social circle from a legacy service.

FIG. 10 is a flowchart illustrating an example process 1000 for generating a social circle from a legacy service. In general, a networking services provider (e.g., network search provider, web hosting service, email hosting service, photo hosting service) may introduce a social circles as part of a social networking service in addition to services that are already offered, and users of the existing services (e.g., prior to the availability of the social circles) may have contacts, friends, followers, and the like, organized into focus groups. Three common examples of focus groups are "friends", "family", and "coworkers" (FFC). When the network services provider makes social circles available for use, the existing users may wish to upgrade their focus groups to become social circles complete with the contacts that were in their existing focus groups.

At step 1010, a determination is made as to whether a user has one or more populated focus groups. If so, new "friends", "family", and "coworkers" (FFC) social circles are created at step 1020 based on the user's respective existing FFC focus groups. At step 1030, the corresponding, legacy FFC focus groups are deleted.

However, if at step 1010, it is determined that the user has no populated focus groups, a determination is made at step 1040 as to whether the user wishes to upgrade focus groups to the social circles (e.g., replace his focus groups with social circles that are prepopulated with the contacts in his existing focus groups). If so, the focus group(s) are converted to respective social circles at step 1050. If not, a determination is made whether the focus groups include FFC focus groups at step 1060. If so, equivalent FFC social circles are created and the existing focus groups are left substantially unaltered at step 1070. If not, at step 1060, no action is taken with respect to focus groups or social circles.

Figure 11A:
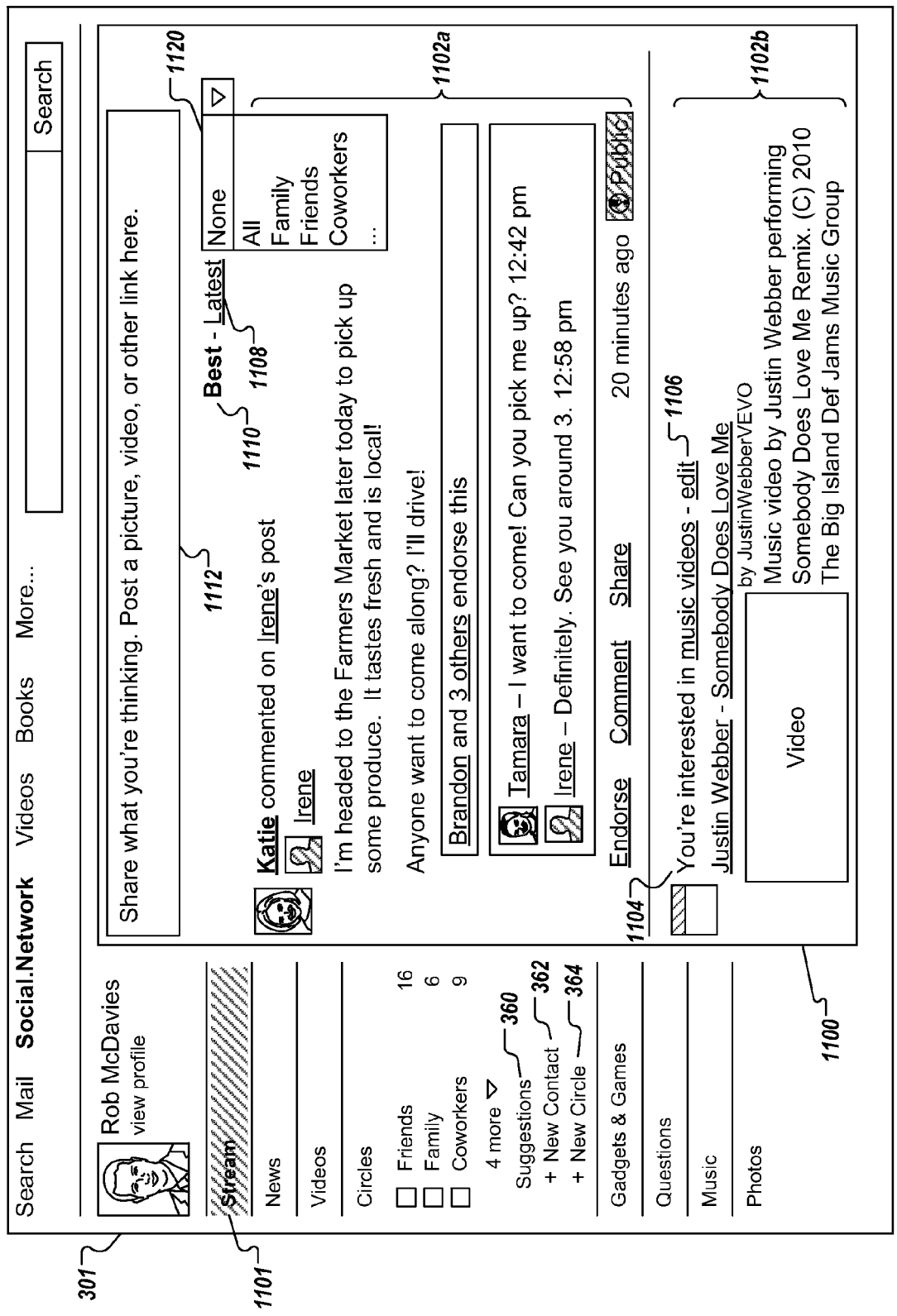
Figure 11C:
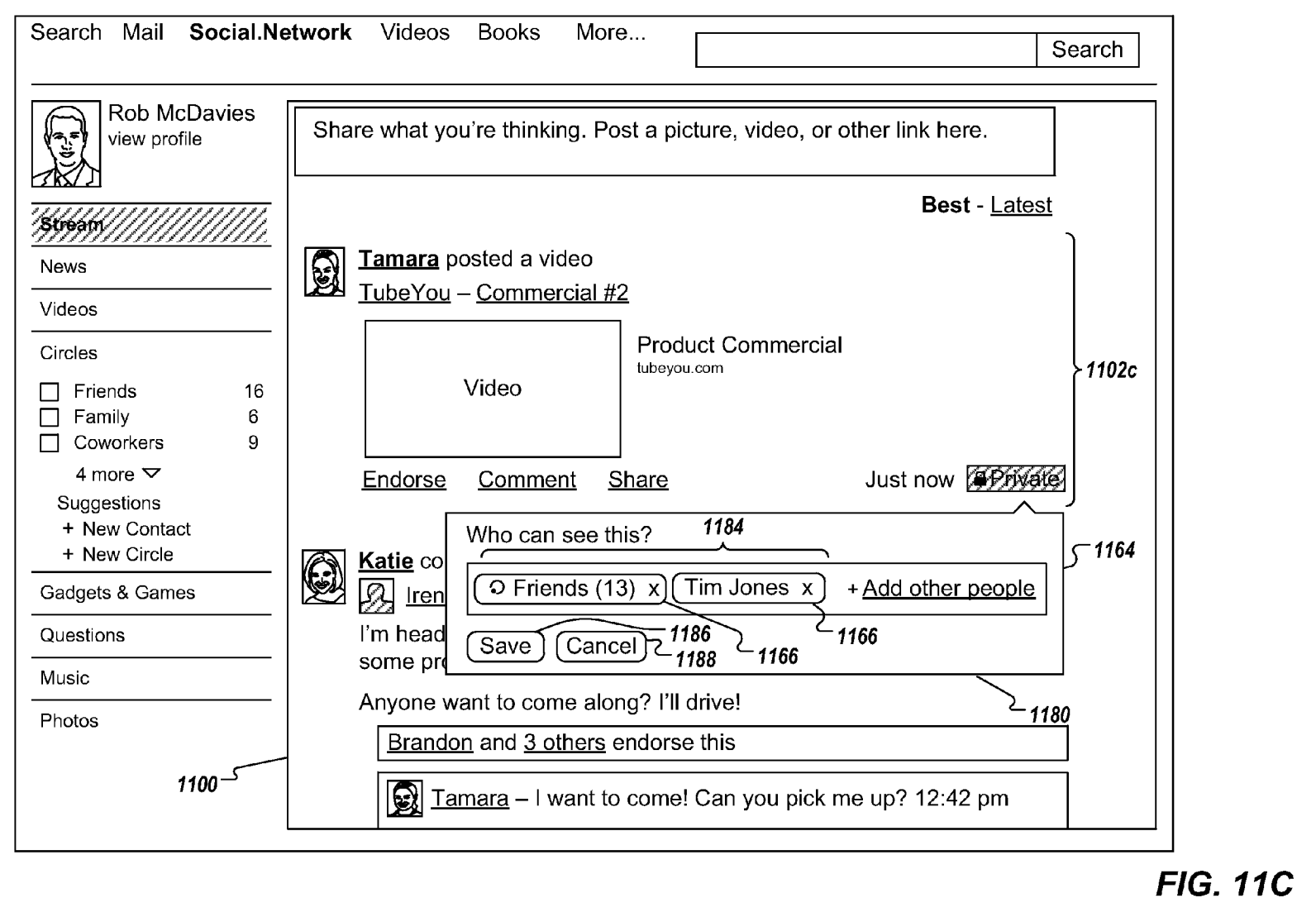

FIGS. 11A-11C depict screen-shots of an example stream page for a user of a social networking service. FIG. 11A depicts a screen-shot of an example all items stream page 1100. In some implementations, the all items stream page 1100 can be displayed when a user selects a stream selector 1101 in the UI 301. In general, the all items stream page 1100 displays a stream of updates, posts, and other such information posted by substantially any contact in substantially any of the user's social circles and social network.

The page 1100 includes a number of posts 1102a-1102b. In some implementations, the stream can include posts that are automatically generated based on the user's preferences and/or web history. For example, the post 1102b is a post that was generated and presented to the user based on the user's expressed interest in music videos. A banner 1104 explains to the user why the post 1102b was presented to him, and an edit link 1106 when selected presents an interface with which the user can interact to modify the criteria that are used to control the presentation of automatic posts.

A "latest" selector 1108, when selected, causes the posts 1102a-1102b to be arranged chronologically (e.g., arranged by length of time since they were posted). A "best" selector 1110, when selected, causes the posts 1102a-1102b to be arranged by quality. In some implementations, the quality of posts may be determined by the user's relationship to the author of the post, the reputation of the author, the number of other people who read, "liked", commented on, or shared the post, how well the subject matter of the post aligns with the user's preferences or interests, or other appropriate criteria that can be used to estimate a post's relevance to the user. In some implementations, a stream arranged according to the estimated relevancies of the posts it includes can be called a "perfect stream." The page 1100 also includes a content sharing interface 1112. The user can click on the content sharing interface 1112, indicating an intent to distribute digital content using the social networking service.

With continued reference to FIG. 11A, a social circles filter 1120 can be provided to filter the digital content displayed in the stream based on one or more social circles. In the depicted example, the social circles filter 1120 can be activated to display a list of social circles defined by the user (e.g., All, Family, Friends, Coworkers, etc.). The user can select a social circle to filter what digital content (e.g., posts) are displayed in the page 1100. For example, if the user selects "Family," only digital content that is distributed to the user from contacts that are members of the user's Family social circle are displayed in the page 1100. As another example, if the user selects "Friends," only digital content that is distributed to the user from contacts that are members of the user's Friends social circle are displayed in the page 1100.

In some implementations, the social circles filter can affect which suggested contacts and/or suggested social circles are presented to the user (e.g., when the user selects the suggested contacts menu item 362 or the suggested social circles menu item 364, as discussed above). For example, if the social circles filter is set to "All," any potential contacts are displayed to the user when the user selects the suggested contacts menu item 364. As another example, if the social circles filter is set to "Family," only those potential contacts that might also be family members of the user (e.g., potential contacts having the same surname) are displayed to the user. As another example, if the social circles filter is set to "Coworkers," only those potential contacts that might also be coworkers of the user (e.g., have a work email from the same domain) are displayed to the user.

FIG. 11B depicts a screen-shot of the example all items stream page 1100 showing a post region 1150, which expands from the content sharing interface 1112 when the user selects the content sharing interface 1112. The post region 1150 includes an input box 1152. A text region 1154 of the input box 1152 is provided. The user can enter text into the text region 1154 and/or provide other input for defining digital content that is to be distributed using the social networking service. In some examples, a link selector 1156, when selected, presents an interface that assists the user with entering a hyperlink to another web page (e.g., to share the page or comment on it). In some examples, a photo selector 1158, when selected, presents an interface that assists the user with adding a digital image to the post.

The post region 1150 includes a distribution interface 1160. In some implementations, the distribution interface 1160 provides an interface that lets the user determine the distribution of digital content (e.g., a post that the user is authoring). For example, the user may add or remove contacts, social circles, groups, or other identities from the sharing region to define distribution of the digital content (e.g., which contacts will see the post). In the depicted example, a friends circle icon 1162*a* and a family circle icon 1162*b* appear in the distribution interface 1160 to indicate that the digital content is intended to be shared with only contacts that are members of the user's friends and/or family social circles. In some implementations, icons that represent social circles or other groupings of contacts may be referred to as "chips." The icons 1162*a*, 1162*b* graphically represent a distribution for the post. In the depicted example, once the post is submitted by the user, the post is simultaneously distributed to members of the multiple social circles (i.e., family social circle, friend social circle) defined as the distribution.

In implementations of the present disclosure, a distribution for digital content can be defined based on one or more social circles. As used herein, a distribution can include a list of one or more contacts, to which digital content is to be distributed using the social networking service. In some examples, a distribution includes one sub-distribution (e.g., one social circle is identified for distribution of the digital content). In some examples, a distribution includes a plurality of sub-distributions. In the example of FIG. 11B, a distribution for digital content provided in the post region 1150 can be defined by the social circles and/or contacts identified in the distribution interface 1160. In the depicted example, a distribution is defined by a Friends social circle (graphically represented by the friends circle icon 1162*a*) and a Family social circle (graphically represented by the family circle icon 1162*b*). In this example, the distribution includes all of the contacts that are members of the Friends social circle and all of the contacts that are members of the Family social circle. The Friends social circle and the Family social circle can each be considered sub-distributions that define the overall distribution.

An add link 1164, when selected, presents an interface in which the user is able to select people and or circles to be added to the distribution interface 1160. Each of the icons 1162*a* and 1162*b* includes a remove button 1166 that removes the corresponding icon when the button 1166 is activated. Each of the icons 1162*a* and 1162*b* also includes a count indicator 1168 that displays the number of contacts in the corresponding circle. In some examples, the distribution interface 1160 includes auto-complete functionality discussed herein.

A selector 1170 provides the user with a way to indicate whether the post should be shared through email to people who are not members of the social network. For example, the user's family social circle may include contacts who have email addresses but who are not members of the social network (e.g., his grandmother receives email through a non-web capable cell phone, or through a fixed purpose email appliance that is incapable of giving her access to the social network). By toggling the selector 1170, the user can choose whether or not the post should be sent by email to those nonmembers. An example of a post that the user may not wish to send by email can be a link to a video, since the user's aforementioned grandmother may not be able to view the video on her non-web capable equipment. A count indicator 1172 displays the number of people who, from among the selections of social circles chosen by the user and displayed in the distribution interface 1160, are not members of the social network and would therefore receive an emailed version of the post if the user so chooses.

A post button 1174, when selected, causes the newly authored post to be published to the social network and made visible to substantially only those contacts that are members of the social circles chosen by the user and displayed in the distribution interface 1160. A close button 1176, when selected, cancels the authoring of a post and closes the post region 1150.

As discussed above, a user can provide user input to a text region of a content sharing interface. In some implementations, the user input can include one or more trigger characters, each trigger character extending the distribution (i.e., the resulting ACL) of the user-provided digital content. For example, a trigger character can indicate that characters immediately following the trigger character define a contact, to which the digital content of the particular post should be distributed to. In some implementations, this is in addition to contacts and/or social circles identified in an associated distribution interface. In some examples, a trigger character can include the "@" character and/or the "+" character. The trigger character is immediately followed by a contact name. The trigger character and the contact name of a particular contact indicate, within the text of the particular post, that the post is to be distributed to the particular contact in addition to any other contacts and/or social circles that are input using an associated distribution interface.

In one example, a user can input the text "@Frank" (or "+Frank") in a text region (e.g., text region 1154 of the content sharing interface 1112) as part of a textual post. For example, as part of a textual post, the user can input the text "@Frank and I are headed to Joe's Tavern to watch the playoffs" within a text region of a content sharing interface. The user can indicate that the textual post is to be distributed to a social circle (e.g., a Friends social circle) using a distribution interface associated with the content sharing interface (e.g., the distribution interface 1160 of the content sharing interface 1112). In response to the user sending the textual post for distribution using the social networking service (e.g., by clicking on a post button), an ACL is generated for the textual post, as discussed herein, and includes contacts of the user that are members of the social circle, as well as the contact Frank (who may or may not be a member of the social circle). Accordingly, the presence of the text "@Frank" in the text region results in distribution of the textual post to the contact Frank, even though the contact Frank might not be identified as part of the distribution defined using the distribution interface.

In some implementations, textual posts that include a trigger character can be distributed to contacts and can render with the trigger character absent. Continuing with the example above, the user can input the text "@Frank and I are headed to Joe's Tavern to watch the playoffs." Upon submitting the textual post, the post is distributed to the contact Frank, as well as any contacts and/or social circles defined using the distribution interface. When the contact Frank, and/or any other contacts that the post is distributed to, the post can be displayed as "Frank and I are headed to Joe's Tavern to watch the playoffs" with the "@" trigger character absent.

In some implementations, the contact name following the trigger character can be converted to hypertext and can provide a link to the contact's profile within the social networking service. Continuing with the example above, the user can input the text "@Frank and I are headed to Joe's Tavern to watch the playoffs." Upon submitting the textual post, the post is distributed to the contact Frank, as well as any contacts and/or social circles defined using the distribution interface. When the contact Frank, and/or any other contacts that the post is distributed to, the post can be displayed as "Frank and I are headed to Joe's Tavern to watch the playoffs" with the "@" trigger character absent and the text "Frank" having a hyperlink associated therewith. Action on the hyperlink (e.g., clicking on) can induce Frank's profile within the social networking service to be displayed to the user performing the action, subject to any privacy settings established by Frank.

In some implementations, text following a trigger character within a text region can be provided using auto-complete functionality discussed herein. Continuing with the example above, the user can initially type "@F" and, in response, a list of contact names can be presented to the user to select from to complete the contact name input. As also discussed herein, the contact names provided in the list of contact names can be in ranked order based on respective ranking scores.

In some examples, a server can analyze the submitted text and recognize the presence of a trigger character within the text. In response, the server can analyze the text immediately following the trigger character to identify a contact of the user that submitted the text and can add the contact to the ACL for distribution of the post. In some examples, a character can be provided to the server as it is input by the user and the server can process the character, and any previously provided characters, to provide output for presentation to the user. For example, auto-correct functionality discussed herein can include character data being transmitted to the server as it is input by the user to the content sharing interface. In response, the server can generate output including one or more contact names and/or social circles that correspond to the input character data for presentation back to the user in a list of contact names and/or social circles, from which the user can select a particular contact and/or social circle. In some implementations, the presence of a trigger character within the text region can trigger auto-complete functionality for selection of a contact name and/or social circle to immediately follow the trigger character.

FIG. 11C depicts a screen-shot of the example all items stream page 1100 showing a visibility preview 1180. In general, a visibility preview provides the user with information about which social circles and/or contacts are able to view a post. In the illustrated example, the user has published a post 1102c. By hovering, clicking, or otherwise selecting a privacy button 1182, the visibility preview 1180 may be brought into view.

The visibility preview 1180 includes a recipient list 1184 that displays icons representative of the contacts and social circles that have permission to view the post 1102c. In some implementations, the recipient list 1184 can initially include the contacts and social circles selected by the user in the distribution interface 1160 of FIG. 11B. Similar to the distribution interface 1160, the user is able to add and remove contacts and/or social circles by clicking the remove buttons 1166 and the add link 1164. A save button 1186, when selected, saves any changes made to the visibility of the post 1102c and closes the visibility preview 1180. A cancel button 1188, when selected, closes the visibility preview 1180 without saving changes.

Figure 12:
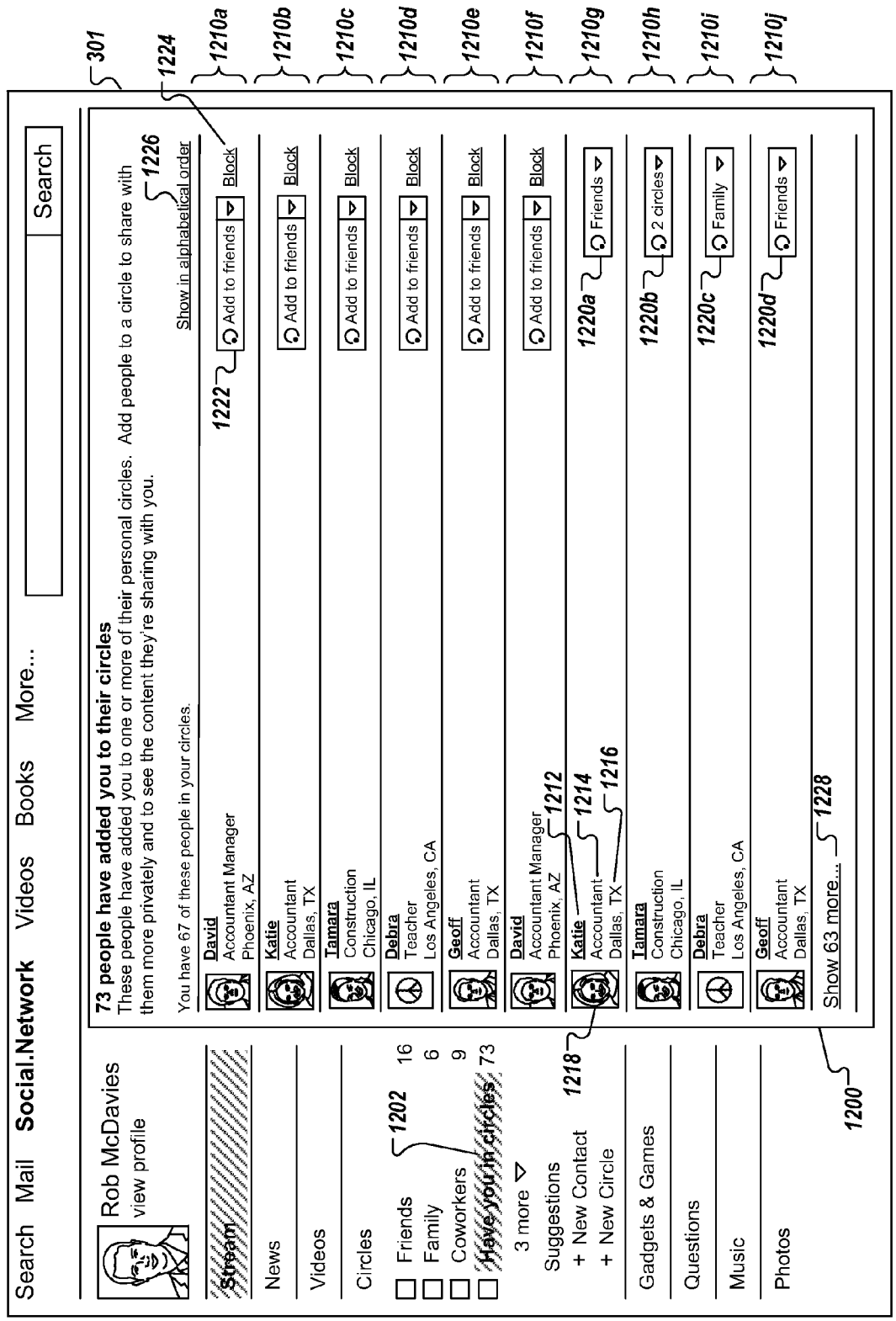
FIG. 12 depicts a screen-shot of an example social circle inclusion page.

FIG. 12 depicts a screen-shot of an example circle inclusion page 1200. In some implementations, the circle inclusion page 1200 can be displayed when a user selects a "in circles" selector 1202 in the UI 301. In general, the circle inclusion page provides the user with information that identifies contacts that have added the user to one or more of their personal social circles. In some implementations, the contacts that have added the user to a social circle can include direct contacts of the user and/or indirect contacts of the user. In this manner, the "in circles" selector 1202 provides an indication of whether a symmetric relationship (e.g., the contact and the user are following each other) or an asymmetric relationship (e.g., the contact is following the user, but the user is not following the contact) exists between a particular contact and the user. For example, the "in circles" selector 1202 can expose asymmetric social networking relationships to the user, such that the user can act (e.g., add a contact to a social circle) to establish a symmetric relationship.

The circle inclusion page 1200 includes a number of contact regions 1210a-1210j. Each of the contact regions 1210a-1210j corresponds to a contact that has included the user in one or more of their social circles. Each of the contact regions 1210a-1210j includes information identifying the corresponding contact, such as a contact name 1212, a contact occupation 1214, a contact location 1216, and a contact image 1218. A number of membership indicators 1220a-1220d are included in the contact regions 1210g-1210j that correspond to contacts who are in one or more of the users social circles. The membership indicators 1220a-1220d display information indicative of which or how many of the user's social circles the respective contact is in. In the illustrated example, the contact associated with the membership indicator 1220a is only in the user's "friends" circle, while the membership indicator 1220c indicates that the associated contact is only in the user's "family" social circle. In the example of the membership indicator 1220b, the indicator 1220b shows that the associated contact is in two of the user's social circles.

A number of "add to friends" buttons 1222 are included in the contact regions 1210a-1210f which correspond to contacts who have included the user in their private social circles, but who are not in any of the user's. By selecting the buttons 1222, the user adds the corresponding contact to one of his social circles. In some implementations, the user's "friends" circle may be the user's largest circle, encompassing substantially all of his contacts, and may therefore be used as a default target circle for the addition of new or otherwise previously uncategorized contacts. In some implementations, adding uncategorized contacts to at least one of the user's social circles can help the user share information with the contacts more privately and/or allow the user to see the content those contacts are sharing with the user. A block button 1224 is included in each of the contact regions 1210a-1210f, and when activated, blocks content from the particular contact from being distributed to the user.

A sort link 1226, when selected, causes the contact regions 1210a-1210j to be sorted according to selected criteria. For example, the contact regions 1210a-1210j can be sorted by circle membership status, alphabetical order, frequency of contact, or by other appropriate criteria that may be used to sort the contact regions 1210a-1210j. A more link 1228, when selected, causes the circle inclusion page 1200 to display additional contact regions that may not fit into the initial view.

In some implementations, a user of the social networking service can add another user of the social networking service as a contact, and, upon indicating that the other user is to be added as a contact, the user can be prompted to assign the other user to at least one social circle. In this manner, as users are added as contacts of a particular user, each user is categorized based on one or more social circles. For example, a first user can be added as a contact of a second user within the social networking service. User input can be received from the second user, the user input indicating a command to add the first user as a contact of the second user within the computer-implemented social networking service. In response to receiving the user input, the second user can be prompted to identify at least one social circle, to which the first user is to be assigned. User input can be received from the second user, the user input indicating an assignment of the first user as a member of one or more social circles, and the first user is assigned as a member of each of the one or more social circles in response to the user input. In some implementations, digital content can be received from the first user and can include a distribution indicating the second user as an intended recipient of the digital content. The digital content can be transmitted for display to the second user, such that second digital content is displayed on one or more pages, each page of the one or more pages corresponding to a social circle of the one or more social circles.

FIGS. 13A-17B depict example screen-shots of a visibility inspector for posting to a social networking service. Specifically, the visibility inspector informs a user of their potential exposure within a social network when replying or commenting on a post of another user in the social network. In this manner, a user can evaluate which contacts in a social network would see a potential post of the user and the user can cater the potential post in view of the known audience. In some examples, an author of a post defines a distribution for the post, which distribution includes a plurality of contacts, as discussed herein. A recipient of the post can view their potential exposure based on an overlap of contacts defined in the distribution. For example, one or more contacts provided in the distribution can also be contacts of the recipient. The visibility inspector can compare contacts of the distribution to contacts of the recipients, and can identify overlapping contacts (i.e., contacts that the author of the post and the recipient of the post have in common). For example, a list of contacts provided in the distribution can be compared to a list of contacts of each recipient (i.e., each recipient is also a contact in the distribution) to identify overlapping contacts on a per-recipient basis. In the context of the author, the visibility inspector can categorize the overlapping contacts based on one or more social circles defined by the author within the social networking service. In the context of the recipient, the visibility inspector can categorize the overlapping contacts based on one or more social circles defined by the recipient within the social networking service. The visibility inspector is described below by way of example. In general, the visibility inspector includes a user interface that displays information about which groups and/or individuals to which a particular post is visible.

FIG. 13A depicts a screen-shot 1300 of a post 1302 from the point of view of an author (e.g., Irene) of the post. FIG. 13B depicts a screen-shot 1350 of the post 1302 from the point of view of a non-author user viewing the post. With particular reference to FIG. 13A, the post 1302 has been posted in the social network and includes an information bar 1304 that displays information about the post. The information in the information bar 1304 includes the approximate time of the post was made (e.g., 20 minutes ago), through which application the post originated (e.g., authored by a user in a tangential application (e.g., Google Buzz) that feeds to the social networking service), and a privacy setting assigned to the post by the author. In the illustrated example, the privacy setting of the post 1302 is "public," and is visible to any user of the social networking service.

By clicking, hovering over, or otherwise selecting the information bar 1304, a visibility inspector window 1310 is presented to inform the author that the post 1302 is publicly visible to anyone. In some implementations, the visibility inspector window 1310 is presented as a pop-out window (e.g., a cartoon bubble) that provides additional detail about who is able to view the post 1302.

Referring now to FIG. 13B, the screen-shot 1350 of the post 1302 provides a visibility inspector window 1360 that is displayed to a non-author user that is viewing the post 1302. The post 1302 includes an information bar 1354 that displays information about the post, such as when the post was made, where the post originated, and a privacy setting assigned to the post by the author. In the illustrated example, the privacy setting of the post 1302 is "public," and is visible to any user of the social networking service.

By clicking, hovering over, or otherwise selecting the information bar 1354, the visibility inspector 1360 is presented to inform the reader that the post 1302 is publicly visible. In some implementations, the visibility inspector 1360 is presented as a pop-out window (e.g., a cartoon bubble) that provides additional detail about who is able to see the post 1302.

In the example of FIGS. 13A and 13B, the post 1302 is publicly visible. Consequently, the visibility inspector windows 1310, 1360 provide the same information to both the author of the post 1302 and a non-author user that is viewing the post 1302.

FIG. 14A depicts a screen-shot 1400 of a visibility inspector window 1410 from the point of view of an author (e.g., Irene) of a post. FIG. 14B depicts a screen-shot 1450 of a visibility inspector window 1460 from the point of view of a non-author user viewing the post. With particular reference to FIG. 14A, an information bar 1404 includes the approximate time of the post was made (e.g., 20 minutes ago), through which application the post originated (e.g., authored by a user in a tangential application (e.g., Google Buzz) that feeds to the social networking service), and a privacy setting assigned to the post by the author. In the illustrated example, the privacy setting of the post is "extended network," and is visible to any user that is a member of the author's (e.g., Irene's) "extended network" in the social networking service. In some implementations, the extended network includes contacts of in the social networking service that are contacts of the author.

By clicking, hovering over, or otherwise selecting the information bar 1404, the visibility inspector window 1410 is presented to inform the author that the post is visible to members of their extended network. In some implementations, the visibility inspector window 1410 is presented as a pop-out window (e.g., a cartoon bubble) that provides additional detail about who is able to see the post.

The visibility inspector window 1410 includes a tally region 1412 that displays information about the number of people in the author's social network. A breakdown region 1414 provides a breakdown of the contacts of the author's social network that can view the associated post. In the example of FIGS. 14A and 14B, the author's entire social network (i.e., "Extended Network") can view the post. A "view all" link 1416, when selected, causes a collection of all the individuals who can see the post to be displayed.

FIG. 14B depicts a screen-shot 1450 of the visibility inspector window 1460 from the non-author user's point of view. An information bar 1454 includes the approximate time of the post was made (e.g., 20 minutes ago), through which application the post originated (e.g., authored by a user in a tangential application (e.g., Google Buzz) that feeds to the social networking service), and a privacy setting assigned to the post by the author.

By clicking, hovering over, or otherwise selecting the information bar 1454, the visibility inspector window 1460 is presented to provide the non-author reader with a breakdown of those contacts in the non-author reader's social network that overlap with contacts that can also view the post. In some implementations, the visibility inspector window 1460 is presented as a pop-out window (e.g., a cartoon bubble) that provides additional detail about who is able to see the associated post.

The visibility inspector window 1460 includes a tally region 1462 that displays general information about the number of contacts in the author's social network that are able to view the post. A breakdown region 1464 provides a breakdown of the number of contacts in the non-author reader's social network that can also view the post. In the illustrated example, the breakdown region 1464 indicates that, of the 1399 people in the author's social network that are able to view the post, eight are in the non-author reader's "friends" social circle, twenty four are in the reader's "business" social circle, and one hundred and forty five other contacts are in the non-author reader's social network, but not assigned to a particular social circle. Accordingly, the breakdown region 1464 informs the non-author reader of overlap between the permitted audience indicated by the author of the post and the social network of the non-author reader, with a further breakdown into specific social circles established by the non-author reader. A "view all" link 1466, when selected, causes a collection of all the individuals who can see the post to be displayed.

FIG. 15A depicts a screen-shot 1500 of a visibility inspector window 1510 from the point of view of an author (e.g., Irene) of a post. FIG. 15B depicts a screen-shot 1550 of a visibility inspector window 1560 from the point of view of a non-author user viewing the post. With particular reference to FIG. 15A, an information bar 1504 includes the approximate time of the post was made (e.g., 20 minutes ago), through which application the post originated (e.g., authored by a user in a tangential application (e.g., Google Buzz) that feeds to the social networking service), and a privacy setting assigned to the post by the author. In the illustrated example, the privacy setting of the post is "My circles," and is visible to any user that is a member of the author's (e.g., Irene's) social circles in the social networking service.

By clicking, hovering over, or otherwise selecting the information bar 1504, the visibility inspector window 1510 is presented to inform the author that the post is visible to members of the social circles defined by the author. In some implementations, the visibility inspector window 1510 is presented as a pop-out window (e.g., a cartoon bubble) that provides additional detail about who is able to see the post.

The visibility inspector window 1510 includes a tally region 1512 that displays information about the number of people in the author's social network that are able to view the associated post. A breakdown region 1514 provides a breakdown of the contacts of the author's social network that can view the associated post as it relates to the author's defined social circles. In the example of FIGS. 15A and 15B, only contacts that are members of one or more of the author-defined social circles (i.e., "My Circles") can view the post. For example, if a contact is in the author's social network, but is not a member of a particular social circle defined by the author, that contact cannot view the post. A "view all" link 1516, when selected, causes a collection of all the individuals who can see the post to be displayed.

FIG. 15B depicts a screen-shot 1550 of the visibility inspector window 1560 from the non-author user's point of view. An information bar 1554 includes the approximate time of the post was made (e.g., 20 minutes ago), through which application the post originated (e.g., authored by a user in a tangential application (e.g., Google Buzz) that feeds to the social networking service), and a privacy setting assigned to the post by the author. In comparison to the information bar 1504 of FIG. 15A, the information bar 1554 of FIG. 15B indicates that the privacy setting is "Private." In this manner, a non-author user viewing the post is unable to determine that the author had distributed, or otherwise made the post available for viewing to the members of the author's social circles, as discussed above.

By clicking, hovering over, or otherwise selecting the information bar 1554, the visibility inspector window 1560 is presented to provide the non-author reader with a breakdown of those contacts in the non-author reader's social network that overlap with contacts that can also view the post. In some implementations, the visibility inspector window 1560 is presented as a pop-out window (e.g., a cartoon bubble) that provides additional detail about who is able to see the associated post.

The visibility inspector window 1560 includes a tally region 1562 that displays general information about the number of contacts in the author's social network that are able to view the post. A breakdown region 1564 provides a breakdown of the number of contacts in the non-author reader's social network that can also view the post. In the illustrated example, the breakdown region 1564 indicates that, of the seventy four people in the author's social network that are able to view the post, sixteen are in the non-author reader's "friends" social circle, five are in the reader's "business" social circle, and nineteen other contacts are in the non-author reader's social network, but not assigned to a particular social circle. Accordingly, the breakdown region 1564 informs the non-author reader of an overlap between the permitted audience indicated by the author of the post and the social network of the non-author reader, with a further breakdown into specific social circles established by the non-author reader. A "view all" link 1566, when selected, causes a collection of all the individuals who can see the post to be displayed.

FIG. 16A depicts a screen-shot 1600 of a visibility inspector window 1610 from the point of view of an author (e.g., Irene) of a post. FIG. 16B depicts a screen-shot 1650 of a visibility inspector window 1660 from the point of view of a non-author user viewing the post. With particular reference to FIG. 16A, an information bar 1604 includes the approximate time of the post was made (e.g., 20 minutes ago), through which application the post originated (e.g., authored by a user in a tangential application (e.g., Google Buzz) that feeds to the social networking service), and a privacy setting assigned to the post by the author. In the illustrated example, the privacy setting of the post is "3 Circles+more," and is visible to any user that is a member of the particular three circles selected by the author (e.g., Irene) as well as contacts that may not be participants in the particular social networking service.

By clicking, hovering over, or otherwise selecting the information bar 1604, the visibility inspector window 1610 is presented to inform the author that the post is visible to particular members of their social network. In some implementations, the visibility inspector window 1610 is presented as a pop-out window (e.g., a cartoon bubble) that provides additional detail about who is able to see the post.

The visibility inspector window 1610 includes a tally region 1612 that displays general information about the number of people in the author's social network that are able to view the associated post. A breakdown region 1614 provides a breakdown of the contacts of the author's social network that can view the associated post as it relates to the author's defined social circles or otherwise. In the example of FIGS. 16A and 16B, only contacts that are members of one or more of the author-defined and selected social circles can view the post, as well as particular contacts identified by the author. In the example of FIG. 16A, of the forty three people that are able to view the author's post, twenty three are members of the author's "Friends" social circle, ten are members of the author's "College Buddies" social circle, eight are members of the author's "Cycling" social circle, two others are designated by the author to be able to view the post (e.g., via email), but are not members of a particular social circle.

FIG. 16B depicts a screen-shot 1650 of the visibility inspector window 1660 from the non-author user's point of view. An information bar 1654 includes the approximate time of the post was made (e.g., 20 minutes ago), through which application the post originated (e.g., authored by a user in a tangential application (e.g., Google Buzz) that feeds to the social networking service), and a privacy setting assigned to the post by the author. In comparison to the information bar 1604 of FIG. 16A, the information bar 1654 of FIG. 16B indicates that the privacy setting is "Private." In this manner, a non-author user viewing the post is unable to determine that the author had distributed, or otherwise made the post available for viewing to the members of the author's social circles, as discussed above.

By clicking, hovering over, or otherwise selecting the information bar 1654, the visibility inspector window 1660 is presented to provide the non-author reader with a breakdown of those contacts in the non-author reader's social network that overlap with contacts that can also view the post. In some implementations, the visibility inspector window 1660 is presented as a pop-out window (e.g., a cartoon bubble) that provides additional detail about who is able to see the associated post.

The visibility inspector window 1660 includes a tally region 1662 that displays general information about the number of contacts in the author's social network that are able to view the post. A breakdown region 1664 provides a breakdown of the number of contacts in the non-author reader's social network that can also view the post. In the illustrated example, the breakdown region 1664 indicates that, of the forty three people in the author's social network that are able to view the post, seven are in the non-author reader's "Friends" social circle, three are in the non-author reader's "Business" social circle, and thirteen other contacts are in the non-author reader's social network, but not assigned to a particular social circle defined by the non-author reader. Accordingly, the breakdown region 1664 informs the non-author reader of an overlap between the permitted audience indicated by the author of the post and the social network of the non-author reader, with a further breakdown into specific social circles established by the non-author reader. A "view all" link 1666, when selected, causes a collection of all the individuals who can see the post to be displayed.

Figures 17A, 17B:
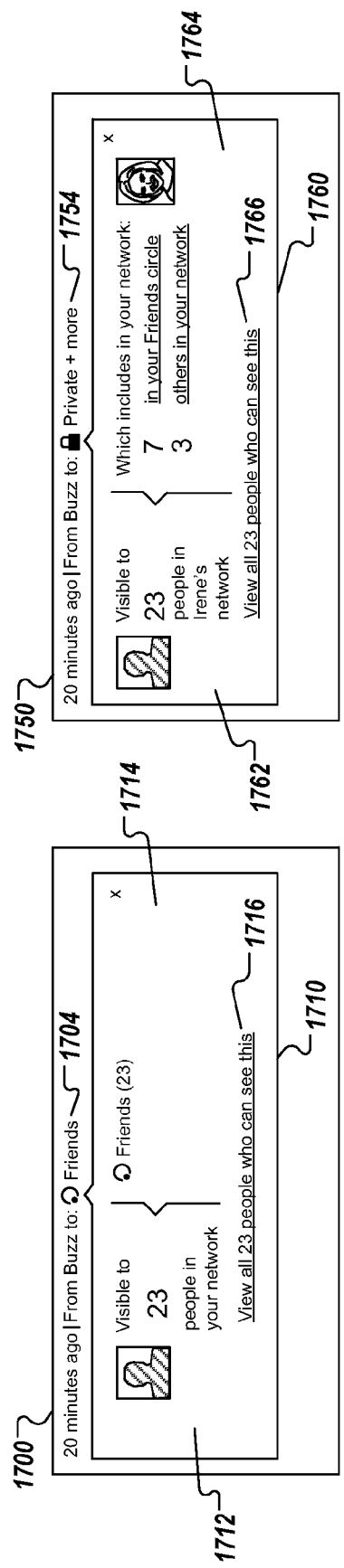

FIG. 17A depicts a screen-shot 1700 of a visibility inspector window 1710 from the point of view of an author (e.g., Irene) of a post. FIG. 17B depicts a screen-shot 1750 of a visibility inspector window 1760 from the point of view of a non-author user viewing the post. With particular reference to FIG. 17A, an information bar 1704 includes the approximate time of the post was made (e.g., 20 minutes ago), through which application the post originated (e.g., authored by a user in a tangential application (e.g., Google Buzz) that feeds to the social networking service), and a privacy setting assigned to the post by the author. In the illustrated example, the privacy setting of the post is "Friends," and is visible to any user that is a member of the particular social circle (e.g., Friends) selected by the author (e.g., Irene).

By clicking, hovering over, or otherwise selecting the information bar 1704, the visibility inspector window 1710 is presented to inform the author that the post is visible to particular members of their social network. In some implementations, the visibility inspector window 1710 is presented as a pop-out window (e.g., a cartoon bubble) that provides additional detail about who is able to see the post.

The visibility inspector window 1710 includes a tally region 1712 that displays general information about the number of people in the author's social network that are able to view the associated post. A breakdown region 1714 provides a breakdown of the contacts of the author's social network that can view the associated post as it relates to the author's defined social circles or otherwise. In the example of FIGS. 17A and 17B, only contacts that are members of the author-defined and selected social circle (e.g., Friends) can view the post. In the example of FIG. 17A, of the twenty three people that are able to view the author's post, all are members of the author's "Friends" social circle.

FIG. 17B depicts a screen-shot 1750 of the visibility inspector window 1760 from the non-author user's point of view. An information bar 1754 includes the approximate time of the post was made (e.g., 20 minutes ago), through which application the post originated (e.g., authored by a user in a tangential application (e.g., Google Buzz) that feeds to the social networking service), and a privacy setting assigned to the post by the author. In comparison to the information bar 1704 of FIG. 17A, the information bar 1754 of FIG. 17B indicates that the privacy setting is "Private." In this manner, a non-author user viewing the post is unable to determine that the author had distributed, or otherwise made the post available for viewing to the members of the author's social circles, as discussed above.

By clicking, hovering over, or otherwise selecting the information bar 1754, the visibility inspector window 1760 is presented to provide the non-author reader with a breakdown of those contacts in the non-author reader's social network that overlap with contacts that can also view the post. In some implementations, the visibility inspector window 1760 is presented as a pop-out window (e.g., a cartoon bubble) that provides additional detail about who is able to see the associated post.

The visibility inspector window 1760 includes a tally region 1762 that displays general information about the number of contacts in the author's social network that are able to view the post. A breakdown region 1764 provides a breakdown of the number of contacts in the non-author reader's social network that can also view the post. In the illustrated example, the breakdown region 1764 indicates that, of the twenty three people in the author's social network that are able to view the post, seven are in the non-author reader's "Friends" social circle and three other contacts are in the non-author reader's social network, but not assigned to a particular social circle defined by the non-author reader. Accordingly, the breakdown region 1764 informs the non-author reader of an overlap between the permitted audience indicated by the author of the post and the social network of the non-author reader, with a further breakdown into specific social circles established by the non-author reader. A "view "all" link 1766, when selected, causes a collection of all the individuals who can see the post to be displayed.

In some implementations, by providing information that describes the range and scope of visibility of a post from the author's point of view, an author can become informed about his target audience. For example, the author may discover that his post was unintentionally made visible to people in a group to which he'd rather not publish to. Using such information, the user can choose to modify the audience (e.g., social circles) targeted by the post after the post has already been published. In some implementations, by providing information that describes the range and scope of visibility of a post, a non-author reader of the post can become informed about the audience that is able to see any comments or responses the reader may make with regard to a post. For example, the reader may decide to refrain from making a low-brow reply to a post if members of his "family" circle would be able to see the reply.

In some implementations, users of social networks can create so-called "anti-circles." In general, an anti-circle can include a personal circle that helps the user avoid posting certain selected types of information to contacts that are members of the particular circle. For example, the user may create a "no cursing" personal social circle, into which he can add people who are easily offended by cursing (e.g., his best customer, his grandmother, members of his church). By implementing such an anti-circle, the user can open a visibility inspector (e.g., the visibility inspector 1350, 1450, 1550, 1650, 1750) to quickly determine whether members of the "no cursing" anti-circle are among the contacts that are able to view a post. If a member of the "no cursing" anti-circle is among the contacts that are able to view a particular post, the user may modify a response or comment to the post to avoid crude language, for example.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present disclosure have been described. Other implementations are within the scope of the following claims. For example, the actions recited in the claims can be performed in a different order and still achieve desirable results.

What is claimed is:

1. A system, comprising:
   one or more computing devices; and
   one or more computer-readable media coupled to the one or more computing devices and having instructions stored thereon which, when executed by the one or more computing devices, cause the one or more computing devices to perform operations comprising:
     transmitting a content data set to a computing device for displaying a post to an author user in a stream page of a social networking service, the post including a privacy setting that is displayed with the post, the author user having authored the post;
     receiving user input from the author user, the user input being associated with the privacy setting;
     in response to receiving the user input;
     identifying a distribution of the post, the distribution including one or more first contacts that have access to the post and are associated with the author user;
     identifying, for each first contact of the one or more first contacts, one or more second contacts associated with the first contact;
     comparing, for each second contact of the one or more second contacts, the second contact with each of the first contacts;
     based on the comparing, identifying one or more overlapping contacts;
     transmitting first data and second data to the computing device for display to the author user, the first data comprising a number of the one or more first contacts that are able to access the post and the second data indicating one or more relationships between the author user and the one or more overlapping contacts;
   receiving first user input, the first user input indicating creation of a first social circle;
   in response to receiving the first user input, providing one or more social networking contacts of the social network service for display to the author user, the one or more social networking contacts comprising social networking contacts associated with the author user;
   receiving second user input, the second user input indicating a selection of the one or more social networking contacts to define a first group of contacts and a second group of contacts; and
   generating the first social circle, the first group of contacts populating the first social circle, wherein one of the second data corresponds to the first social circle.

2. The system of claim 1, wherein the first data further comprises a general classification of the one or more first contacts associated with the author user within the social networking service.

3. The system of claim 1, wherein the second data further comprises one or more classifications of the one or more first contacts associated with the author user, each of the one or more classifications having been defined by the author user using the social networking service.

4. The system of claim 3, wherein at least one of the classifications comprises a particular social circle defined by the author user.

5. The system of claim 1, wherein the second data comprises a first sub-set and a second sub-set, the first sub-set corresponding to a third social circle and the second sub-set corresponding to a fourth social circle, the third and fourth social circles having been defined by the author user using the social networking service.

6. The system of claim 5, wherein the first sub-set indicates a first number of the one or more first contacts associated with the third social circle and an identifier of the third social circle.

7. The system of claim 5, wherein the second sub-set indicates a first number of the one or more first contacts associated with the fourth social circle and an identifier of the fourth social circle.

8. The system of claim 1, wherein the first data further comprises an image associated with the author user.

9. The system of claim 1, wherein the operations further comprise:
   receiving third user input from the author user, the second user input corresponding to the second data; and
   in response to receiving the third user input, transmitting additional data to the computing device, the additional data providing detailed information regarding one or more of the one or more first contacts associated with the author user.

10. The system of claim 1, wherein the post is generated by the author user using the social networking service.

11. A non-transitory computer storage medium encoded with a computer program, the program comprising instructions that when executed by data processing apparatus cause the data processing apparatus to perform operations comprising:
- transmitting a content data set to a computing device for displaying a post to an author user in a stream page of a social networking service, the post including a privacy setting that is displayed with the post, the author user having authored the post;
- receiving user input from the author user, the user input being associated with the privacy setting;
- in response to receiving the user input:
  - identifying a distribution of the post, the distribution including one or more first contacts that have access to the post and are associated with the author user;
  - identifying, for each first contact of the one or more first contacts, one or more second contacts associated with the first contact;
  - comparing, for each second contact of the one or more second contacts, the second contact with each of the first contacts;
  - based on the comparing, identifying one or more overlapping contacts;
- transmitting first data and second data to the computing device for display to the author user, the first data comprising a number of the one or more first contacts that are able to access the post and the second data indicating one or more relationships between the author user and the one or more overlapping contacts;
- receiving first user input, the first user input indicating creation of a first social circle;
- in response to receiving the first user input, providing one or more social networking contacts of the social network service for display to the author user, the one or more social networking contacts comprising social networking contacts associated with the author user;
- receiving second user input, the second user input indicating a selection of the one or more social networking contacts to define a first group of contacts and a second group of contacts; and
- generating the first social circle, the first group of contacts populating the first social circle, wherein one of the second data corresponds to the first social circle.

12. A computer-implemented method comprising:
- transmitting a content data set to a computing device for displaying a post to an author user in a stream page of a social networking service, the post including a privacy setting that is displayed with the post, the author user having authored the post;
- receiving user input from the author user, the user input being associated with the privacy setting;
- in response to receiving the user input:
  - identifying a distribution of the post, the distribution including one or more first contacts that have access to the post and are associated with the author user;
  - identifying, for each first contact of the one or more first contacts, one or more second contacts associated with the first contact;
  - comparing, for each second contact of the one or more second contacts, the second contact with each of the first contacts;
  - based on the comparing, identifying one or more overlapping contacts;
- transmitting first data and second data to the computing device for display to the author user, the first data comprising a number of the one or more first contacts that are able to access the post and the second data indicating one or more relationships between the author user and the one or more overlapping contacts;
- receiving first user input, the first user input indicating creation of a first social circle;
- in response to receiving the first user input, providing one or more social networking contacts of the social network service for display to the author user, the one or more social networking contacts comprising social networking contacts associated with the author user;
- receiving second user input, the second user input indicating a selection of the one or more social networking contacts to define a first group of contacts and a second group of contacts; and
- generating the first social circle, the first group of contacts populating the first social circle, wherein one of the second data corresponds to the first social circle.

13. The system of claim 1, wherein each overlapping contact of the one or more overlapping contacts is a common contact for the author and the non-author user.

* * * * *